US011054988B2

(12) United States Patent
Wang

(10) Patent No.: US 11,054,988 B2
(45) Date of Patent: Jul. 6, 2021

(54) GRAPHICAL USER INTERFACE DISPLAY METHOD AND ELECTRONIC DEVICE

(71) Applicant: Huawei Technologies Co., Ltd., Shenzhen (CN)

(72) Inventor: Yanzhao Wang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/627,618

(22) PCT Filed: Jun. 30, 2017

(86) PCT No.: PCT/CN2017/091284
§ 371 (c)(1),
(2) Date: Dec. 30, 2019

(87) PCT Pub. No.: WO2019/000438
PCT Pub. Date: Jan. 3, 2019

(65) Prior Publication Data
US 2020/0371685 A1    Nov. 26, 2020

(51) Int. Cl.
*G06F 3/0488*    (2013.01)
*G06F 3/0482*    (2013.01)
*G06F 3/0484*    (2013.01)

(52) U.S. Cl.
CPC ........ *G06F 3/04886* (2013.01); *G06F 3/0482* (2013.01); *G06F 3/04845* (2013.01); *G06F 2203/04803* (2013.01)

(58) Field of Classification Search
CPC .............. G06F 3/04886; G06F 3/0482; G06F 3/04845; G06F 2203/04803
See application file for complete search history.

(56) References Cited

U.S. PATENT DOCUMENTS 9,430,120 B2 *  8/2016  Cranfill ............... G06F 3/04817
10,509,551 B2 * 12/2019  Huang .................. G06F 3/0482
10,642,483 B2 *  5/2020  Wang ................... G06F 3/04883
(Continued)

FOREIGN PATENT DOCUMENTS

| CN | 102929558 A | 2/2013 |
| CN | 103677556 A | 3/2014 |

(Continued)

OTHER PUBLICATIONS

Netflix, "Netflix Quick Guide: Getting Started on Android | Netflix," retrieved https://www.youtube.com/watch?v=2f6DvjFipTU, XP054980360, May 24, 2013, 1 pages.

(Continued)

*Primary Examiner* — Shen Shiau
(74) *Attorney, Agent, or Firm* — Conley Rose, P.C.

(57) ABSTRACT

A graphical user interface display method includes displaying a first subscreen of a home screen on a touchscreen of an electronic device, where the first subscreen includes a first area and a second area. The method further includes detecting, by the electronic device, a first gesture of a user on the touchscreen, and displaying, on the touchscreen, the second area of the first subscreen and a first area of a second subscreen of the home screen in response to the first gesture, where the first area of the first subscreen has a same size as the first area of the second subscreen.

20 Claims, 39 Drawing Sheets

(56) References Cited

U.S. PATENT DOCUMENTS

| | | | |
|---|---|---|---|
| 2009/0178008 | A1 | 7/2009 | Herz et al. |
| 2012/0174026 | A1* | 7/2012 | Shim ..................... G06F 3/0488 715/784 |
| 2013/0055160 | A1* | 2/2013 | Yamada .............. G06F 3/04883 715/810 |
| 2013/0125043 | A1* | 5/2013 | Jeon ...................... G06F 3/0488 715/782 |
| 2013/0145316 | A1 | 6/2013 | Heo |
| 2013/0167078 | A1* | 6/2013 | Monnig ................ G06F 3/0484 715/800 |
| 2013/0227464 | A1* | 8/2013 | Jin ...................... G06F 3/04886 715/784 |
| 2013/0268883 | A1* | 10/2013 | Kim ................... G06F 3/04847 715/784 |
| 2014/0109022 | A1 | 4/2014 | Wei et al. |
| 2014/0164907 | A1* | 6/2014 | Jung ..................... G06F 3/0483 715/234 |
| 2014/0191986 | A1* | 7/2014 | Kim ...................... G06F 3/0488 345/173 |
| 2014/0213318 | A1* | 7/2014 | Leem ................... H04L 51/046 455/556.1 |
| 2014/0320425 | A1* | 10/2014 | Jeong .................. G06F 3/04883 345/173 |
| 2014/0351748 | A1 | 11/2014 | Xia et al. |
| 2015/0116218 | A1* | 4/2015 | Yang .................... G06F 3/0486 345/158 |
| 2015/0264169 | A1* | 9/2015 | Yim .................. H04M 1/72448 455/411 |
| 2015/0365306 | A1* | 12/2015 | Chaudhri .............. G06F 3/0484 715/736 |
| 2016/0357368 | A1* | 12/2016 | Federighi ................ G06F 9/451 |
| 2017/0010780 | A1 | 1/2017 | Waldron, Jr. et al. |
| 2017/0344329 | A1* | 11/2017 | Oh .......................... G06T 11/60 |
| 2018/0329550 | A1* | 11/2018 | Dellinger ............ G06F 3/04886 |
| 2018/0335939 | A1* | 11/2018 | Karunamuni .............. G06F 8/38 |
| 2019/0369830 | A1* | 12/2019 | Alonso Ruiz ....... G06F 3/04883 |

FOREIGN PATENT DOCUMENTS

| | | |
|---|---|---|
| CN | 103838456 A | 6/2014 |
| CN | 103873679 A | 6/2014 |
| CN | 104516673 A | 4/2015 |
| CN | 105323360 A | 2/2016 |
| CN | 103218110 B | 6/2016 |
| CN | 105630369 A | 6/2016 |
| CN | 105630371 A | 6/2016 |
| CN | 105718190 A | 6/2016 |
| CN | 106445304 A | 2/2017 |
| CN | 106598529 A | 4/2017 |
| CN | 103635873 B | 6/2017 |
| EP | 2790096 A2 | 10/2014 |
| EP | 3113008 A1 | 1/2017 |

OTHER PUBLICATIONS

Machine Translation and Abstract of Chinese Publication No. CN102929558, Feb. 13, 2013, 11 pages.
Machine Translation and Abstract of Chinese Publication No. CN103677556, Mar. 26, 2014, 22 pages.
Machine Translation and Abstract of Chinese Publication No. CN103838456, Jun. 4, 2014, 10 pages.
Machine Translation and Abstract of Chinese Publication No. CN104516673, Apr. 15, 2015, 27 pages.
Machine Translation and Abstract of Chinese Publication No. CN105323360, Feb. 10, 2016, 10 pages.
Machine Translation and Abstract of Chinese Publication No. CN105630369, Jun. 1, 2016, 10 pages.
Machine Translation and Abstract of Chinese Publication No. CN105630371, Jun. 1, 2016, 15 pages.
Machine Translation and Abstract of Chinese Publication No. CN105718190, Jun. 29, 2016, 12 pages.
Machine Translation and Abstract of Chinese Publication No. CN106445304, Feb. 22, 2017, 28 pages.
Machine Translation and Abstract of Chinese Publication No. CN106598529, Apr. 26, 2017, 27 pages.
Foreign Communication From a Counterpart Application, Chinese Application No. 201780010736.9, Chinese Office Action dated Dec. 4, 2019, 12 pages.
Foreign Communication From a Counterpart Application, PCT Application No. PCT/CN2017/091284, English Translation of International Search Report dated Mar. 27, 2018, 2 pages.
Foreign Communication From a Counterpart Application, PCT Application No. PCT/CN2017/091284, English Translation of Written Opinion dated Mar. 27, 2018, 5 pages.

* cited by examiner

GRAPHICAL USER INTERFACE DISPLAY METHOD AND ELECTRONIC DEVICE

CROSS-REFERENCE TO RELATED APPLICATIONS

This application is a U.S. National Stage application of International Patent Application No. PCT/CN2017/091284 filed on Jun. 30, 2017, which is hereby incorporated by reference in its entirety.

TECHNICAL FIELD

Embodiments of this application relate to the field of man-machine interaction, and in particular, to a graphical user interface display method and an electronic device.

BACKGROUND

In recent years, with rapid development of a screen touch technology, electronic devices (for example, a mobile phone and a tablet computer) using a touchscreen are widely used. In addition, to improve user experience, a screen of a touchscreen of an electronic device is becoming larger, so that a user can browse more information by using a larger screen. In the prior art, most users are accustomed to hold such a large-screen electronic device by using one hand to perform a one-hand operation. For example, a user may hold a mobile phone by using one hand, and use a thumb of the hand to tap an application icon, a video, a web page link, or the like displayed on a screen. In addition, to perform a one-hand operation more conveniently, in the patent disclosure document CN201280003346.6, a graphical user interface displayed on a touchscreen is zoomed out by using a slide gesture of a user, and the zoomed-out interface is displayed in an area that one hand can touch on the touchscreen, for example, an area close to a thumb. Then, the user may perform an operation, such as tap, on the zoomed-out interface. It can be learned that a solution of interaction between the electronic device and the user is very complex. Consequently, a user learning difficulty is increased, and processing efficiency of the electronic device is reduced.

SUMMARY

To resolve the foregoing technical problems, embodiments of this application provide a plurality of graphical user interface display methods and an electronic device, to greatly improve a man-machine interaction capability of an electronic device, improve processing efficiency of the electronic device, simplify user operation steps, and further improve user experience.

According to a first aspect, an embodiment of this application provides a graphical user interface display method. The method may be implemented on an electronic device with a touchscreen. The method may specifically include: displaying a first subscreen of a home screen on the touchscreen, where the home screen includes at least two subscreens, for example, the first subscreen and a second subscreen, and the first subscreen includes a first area and a second area; detecting, by the electronic device, a first gesture of a user on the touchscreen; and in response to the first gesture, displaying, on the touchscreen, the second area of the first subscreen and a first area of the second subscreen of the home screen, where the first area of the first subscreen has a same size as the first area of the second subscreen. In the foregoing technical solution, different areas of a sub-screen are switched, instead of switching one subscreen in the prior art. In this way, a user operates a control element (for example, an app icon, a widget, or a button) on a subscreen more flexibly and conveniently, processing efficiency of an electronic device is improved, and user experience is also improved.

In a possible implementation, the second area of the first subscreen is displayed on a left-half part of the touchscreen, and the first area of the second subscreen is displayed on a right-half part of the touchscreen.

In a possible implementation, the method may further include: detecting, by the electronic device, a second gesture of the user on the touchscreen; and in response to the second gesture, displaying the second area of the first subscreen and the first area of the second subscreen on the touchscreen. A control element layout in the second area of the first subscreen is changed. A control element in the second area of the first subscreen after the layout change is more easily operated by the user. Therefore, user experience is improved. In addition, although the control element layout in the second area of the first subscreen is changed, a control element layout in the first area of the second subscreen may remain unchanged, so that visual interference to the user can be avoided. Certainly, the control element layout in the first area of the second subscreen may alternatively be changed based on the second gesture.

In another possible implementation, the method may further include: detecting, by the electronic device, a touch event of the user on an application icon in the second area of the first subscreen; and in response to the touch event, starting, by the electronic device, an application corresponding to the application icon and displaying a graphical user interface of the application on the touchscreen. Because the control element layout in the second area of the first subscreen is changed, the user can operate (for example, tap or heavily press) an application icon in this area very conveniently particularly when the user holds the electronic device by using one hand.

In another possible implementation, the graphical user interface of the application is displayed in the first area of the second subscreen, so that the user can preview a main screen of the application, and then the user determines whether the graphical user interface of the application needs to be displayed in a zoom-in mode or displayed on the entire touchscreen in a fill-screen mode.

In another possible implementation, the graphical user interface of the application may be a preview screen of the application, and the preview screen may include a shortcut menu of the application, so that the user taps the shortcut menu to quickly perform an operation. For example, the shortcut menu may be a menu indicating whether the application is allowed to use a cellular network.

In another possible implementation, both the first gesture and the second gesture may be slide gestures, but directions of the first gesture and the second gesture are different.

In another possible implementation, the electronic device detects a third gesture of the user on the touchscreen; and in response to the third gesture, moves a control element in the second area of the first subscreen out of the touchscreen, in other words, skips displaying the control element on the touchscreen, moves a preview screen of the application to an original display position of the second area of the first subscreen, and displays a control element in the first area of the second subscreen. This is more beneficial to an operation performed by the user on the preview screen, and in particular, on a shortcut menu on the preview screen, thereby improving user experience.

In another possible implementation, before the first subscreen is displayed on the touchscreen, the method may further include: receiving user input to enable a one-hand operation function. The user input may be specifically that a user taps a virtual button in a settings menu; may be that a finger of a user touches and holds a blank on the home screen or touches and holds an icon for a time longer than a predetermined time; may be a gesture of drawing a predetermined track in any position on the touchscreen; or may be another case. In this way, the user can flexibly use the foregoing function, thereby simplifying operation steps.

In another possible implementation, a control element used to exit the one-hand operation function is further displayed on the touchscreen. In this way, the user can exit the one-hand operation function at any time in an operation process.

In another possible implementation, there are five rows and four columns of icons on the first subscreen, there are five rows and two columns of icons in the first area of the first subscreen, and there are five rows and two columns of icons in the second area of the first subscreen; or there are five rows and four columns of icons on the first subscreen, there are five rows and three columns of icons in the first area of the first subscreen, and there are five rows and one column of icons in the second area of the first subscreen.

In another possible implementation, the second area of the first subscreen may have a same size as the first area of the second subscreen. The two areas have the same size, and therefore, visual consistency is ensured, and user experience is further improved.

According to a second aspect, an embodiment of this application provides an electronic device, including a touchscreen, a memory, one or more processors, at least one application, and one or more computer programs. The one or more computer programs are stored in the memory, and the electronic device may be configured to execute the foregoing method.

According to a third aspect, an embodiment of this application provides an electronic device, including a touchscreen, one or more processors, a memory, a plurality of applications, and one or more computer programs. The touchscreen includes a touch-sensitive surface and a display, the one or more computer programs are stored in the memory, the one or more computer programs include an instruction, and when the instruction is executed by the electronic device, the electronic device performs the foregoing method.

According to a fourth aspect, an embodiment of this application provides a graphical user interface. The graphical user interface is stored in an electronic device, and the electronic device includes a touchscreen, a memory, and one or more processors. The one or more processors are configured to execute one or more computer programs stored in the memory. The graphical user interface (GUI for short) may include: a first GUI displayed on the touchscreen, where the first GUI includes a first subscreen of a home screen, and the first subscreen includes a first area and a second area; a detected first gesture of a user on the touchscreen; and a second GUI displayed on the touchscreen in response to the first gesture, where the second GU includes the second area of the first subscreen and a first area of a second subscreen of the home screen, and the first area of the first subscreen has a same size as the first area of the second subscreen.

In a possible implementation, the second area of the first subscreen is displayed on a left-half part of the touchscreen, and the first area of the second subscreen is displayed on a right-half part of the touchscreen.

In a possible implementation, the graphical user interface may further include: a detected second gesture corresponding to the second area of the first subscreen; and a third GUI displayed on the touchscreen in response to the second gesture, where the third GUI includes the second area of the first subscreen and the first area of the second subscreen, and a control element layout in the second area of the first subscreen is changed.

In another possible implementation, the graphical user interface may further include: a detected touch event of the user on an application icon in the second area of the first subscreen, an application that is corresponding to the application icon and that is started by the electronic device in response to the touch event, and a graphical user interface, displayed on the touchscreen, of the application. Because the control element layout in the second area of the first subscreen is changed, the user can operate (for example, tap or heavily press) an application icon in this area very conveniently particularly when the user holds the electronic device by using one hand.

In another possible implementation, the graphical user interface of the application is displayed in the first area of the second subscreen, so that the user can preview a main screen of the application, and then the user determines whether the graphical user interface of the application needs to be displayed in a zoom-in mode or displayed on the entire touchscreen in a full-screen mode.

In another possible implementation, the graphical user interface of the application may be a preview screen of the application, and the preview screen may include a shortcut menu of the application, so that the user taps the shortcut menu to quickly perform an operation. For example, the shortcut menu may be a menu indicating whether the application is allowed to use a cellular network.

In another possible implementation, the graphical user interface may further include a detected third gesture of the user on the touchscreen. In response to the third gesture, a control element in the second area of the first subscreen is moved out of the touchscreen to skip displaying the control element, a preview screen of the application is moved to an original display position of the second area of the first subscreen, and a control element in the first area of the second subscreen is displayed. This is more beneficial to an operation performed by the user on the preview screen, and in particular, on a shortcut menu on the preview screen, thereby improving user experience.

In another possible implementation, a control element used to exit a one-hand operation function is further displayed on the touchscreen. In this way, the user can exit the one-hand operation function at any time in an operation process.

In another possible implementation, the graphical user interface may further include: a detected touch event of the user on the touchscreen, and the first GUI displayed on the touchscreen in response to the touch event, where the third GUI is no longer displayed.

According to a fifth aspect, an embodiment of this application provides an electronic device. The electronic device includes a display module, a detection module, a processing module, and a storage module. The display module is configured to display a first graphical user interface (GUI) stored in the storage module. The first GUI includes a first subscreen of a home screen, and the first subscreen includes a first area and a second area. The detection module is configured to detect a first gesture of a user on the display module. In response to the first gesture, the display module displays a second GUI stored in the storage module. The second GUI includes the second area of the first subscreen and a first area of a second subscreen of the home screen. The first area of the first subscreen has a same size as the first area of the second subscreen.

In a possible implementation, the detection module is further configured to detect a second gesture of the user on the display module; and in response to the second gesture, the display module is further configured to display a third GUI stored in the storage module. The third GUI includes the second area of the first subscreen and the first area of the second subscreen, and a control element layout in the second area of the first subscreen is changed.

In another possible implementation, the detection module is further configured to detect a touch event of the user on an application icon in the second area of the first subscreen; and in response to the touch event, the processing module starts an application corresponding to the application icon and displays a GUI of the application on the display module. The GUI of the application is displayed in the first area of the second subscreen.

In another possible implementation, the detection module is further configured to display a control element used to exit a one-hand operation function.

According to a sixth aspect, an embodiment of this application further provides a computer readable storage medium. The computer readable storage medium stores an instruction, and when the instruction runs on a computer, the computer performs the method according to the foregoing aspects.

According to a seventh aspect, an embodiment of this application further provides a computer program product including an instruction, and when the computer program product runs on a computer, the computer performs the method according to the foregoing aspects.

It should be understood that technical features, technical solutions, beneficial effects, or similar descriptions in this application do not imply that all features and advantages can be implemented in any individual embodiment. Conversely, it may be understood that descriptions of the features or beneficial effects mean that at least one embodiment includes a specific technical feature, technical solution, or beneficial effect. Therefore, the technical features, technical solutions, or beneficial effects in this specification are not necessarily specific to a same embodiment. The technical features, technical solutions, or beneficial effects described in the embodiments may be further combined in any proper manner. A person skilled in the art understands that a specific embodiment may be implemented without requiring one or more specific technical features, technical solutions, or beneficial effects of the embodiments. In other embodiments, an additional technical feature and beneficial effect may be further identified in a specific embodiment that does not reflect all embodiments.

DESCRIPTION OF EMBODIMENTS

Terms used in the embodiments of this application are merely for the purpose of describing specific embodiments, but are not intended to limit this application. Terms "one", "a", "the", "the foregoing", "this", and "the one" of singular forms used in this specification and the appended claims of this application are also intended to include a plural form, unless otherwise specified in the context clearly. It should also be understood that a term "and/or" used in this application indicates and includes any or all possible combinations of one or more bound listed items.

The following describes embodiments of an electronic device, a graphical user interface (GUI for short below) applied to such an electronic device, and a related process of using such an electronic device. In some embodiments of this application, the electronic device may be a portable electronic device that further includes other functions such as functions of a personal digital assistant and/or a music player, for example, a mobile phone, a tablet computer, or a wearable electronic device (for example, a smartwatch) having a wireless communication function. An example embodiment of the portable electronic device includes but is not limited to a portable electronic device that runs iOS®, Android®, or Microsoft®, or another operating system. The portable electronic device may alternatively be another portable electronic device, for example, a laptop computer (Laptop) with a touch-sensitive surface (for example, a touch panel). It should be further understood that in other embodiments of this application, the electronic device may not be a portable electronic device, but a desktop computer with a touch-sensitive surface (for example, a touch panel).

Figure 1:
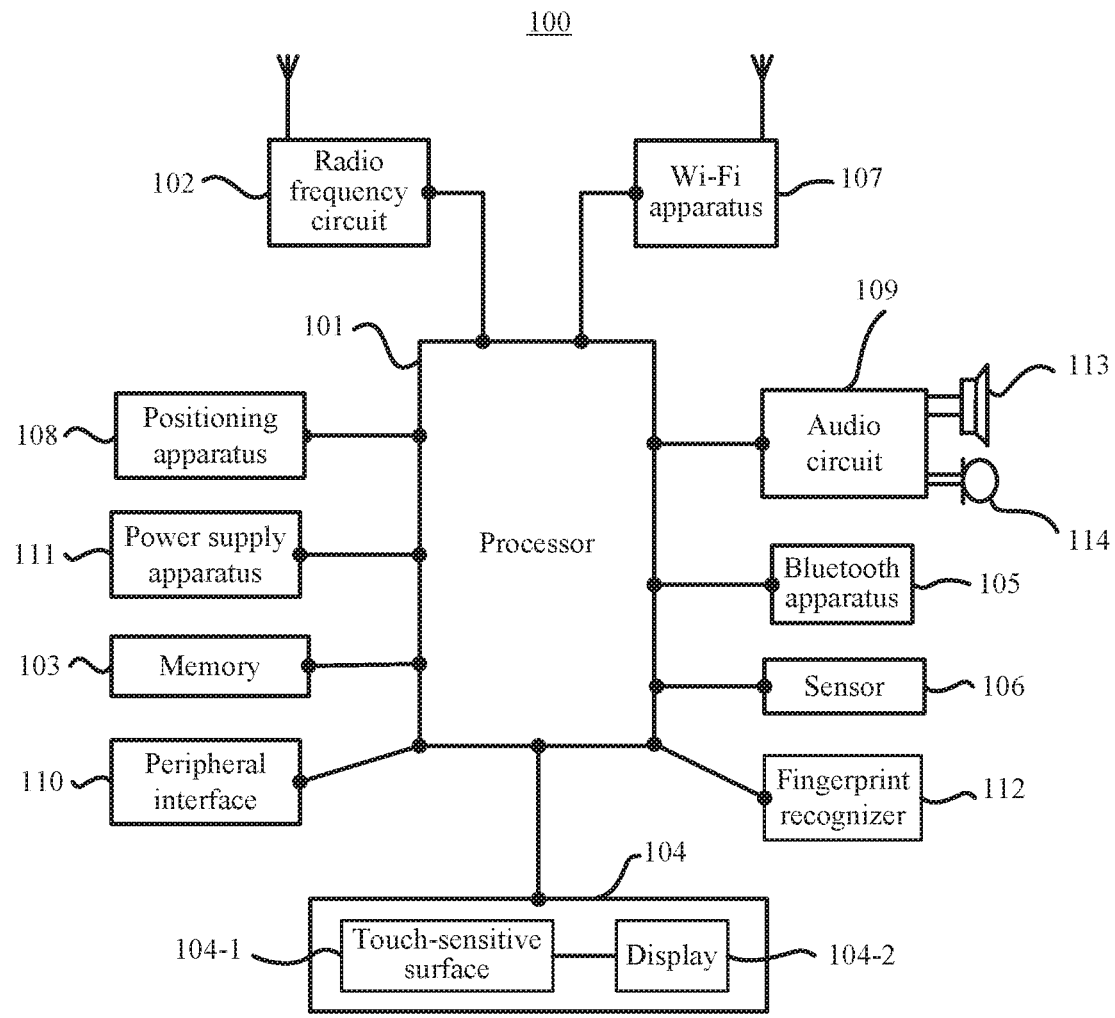
FIG. 1 is a schematic structural diagram of hardware of a mobile phone 100 according to some embodiments.

As shown in FIG. 1, the electronic device in the embodiments of this application may be a mobile phone 100. The following describes an embodiment in detail by using the mobile phone 100 as an example. It should be understood that the mobile phone 100 shown in the figure is merely an example of the electronic device, and the mobile phone 100 may include more or fewer components than those shown in the figure, a combination of two or more components, or components disposed differently. Various components shown in the figure may be implemented by using hardware including one or more signal processors and/or application-specific integrated circuits, software, or a combination of hardware and software.

As shown in FIG. 1, the mobile phone 100 may specifically include components such as a processor 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power system 111. These components may perform communication by using one or more communications buses or signal buses (not shown in FIG. 1). A person skilled in the art may understand that the hardware structure shown in FIG. 1 constitutes no limitation on the mobile phone 100, and the mobile phone 100 may include more or fewer components than those shown in the figure, a combination of some components, or components disposed differently.

The following describes each component of the mobile phone 100 in detail with reference to FIG. 1.

The processor 101 is a control center of the mobile phone 100, and connects to various parts of the mobile phone 100 by using various interfaces and lines. The processor 101 executes various functions of the mobile phone 100 and processes data, by running or executing an application (application, App for short) stored in the memory 103 and invoking data and an instruction that are stored in the memory 103. In some embodiments, the processor 101 may include one or more processing units. An application processor and a modem processor may alternatively be integrated into the processor 101. The application processor mainly processes an operating system, a user interface, an application, and the like, and the modem processor mainly processes wireless communication. It may be understood that the modem processor may alternatively not be integrated into the processor 101. For example, the processor 101 may be a Kirin 960 chip made by Huawei Technologies Co., Ltd. In sonic embodiments of this application, the processor 101 may further include a fingerprint verification chip configured to verify a collected fingerprint.

The radio frequency circuit 102 may be configured to receive and send a radio signal during an information receiving and sending process or a call process. Specifically, the radio frequency circuit 102 may receive downlink data from a base station and then send the downlink data to the processor 101 for processing, and in addition, send related uplink data to the base station. The radio frequency circuit usually includes but is not limited to an antenna, at least one amplifier, a transceiver, a coupler, a low noise amplifier, a duplexer, or the like. In addition, the radio frequency circuit 102 may further communicate with another device through radio communication. Any communications standard or protocol may be used for the radio communication, including but not limited to Global System for Mobile Communications, a general packet radio service, code division multiple access, wideband code division multiple access, Long Term Evolution, an email, a short messaging service, or the like.

The memory 103 is configured to store an application and data. The processor 101 executes various functions of the mobile phone 100 and processes data, by running the application and data that are stored in the memory 103. The memory 103 mainly includes a program storage area and a data storage area. The program storage area may store an operating system and an application required for at least one function (for example, an audio play function or an image play function). The data storage area may store data (for example, audio data or a phone book) created during use of the mobile phone 100. In addition, the memory 103 may include a high-speed random access memory, and may further include a non-volatile memory such as a magnetic disk storage device or a flash memory device, or another volatile solid-state storage device. The memory 103 may store various operating systems, for example, an iOS® operating system developed by Apple Inc., and an Android® operating system developed by Google Inc.

The touchscreen 104 may include a touch-sensitive surface 104-1 and a display 104-2. The touch-sensitive surface 104-1 (for example, a touch panel) may collect a touch event (for example, an operation performed by a user of the mobile phone 100 on or near the touch-sensitive surface 104-1 by using a finger or any proper object such as a stylus) performed by the user on or near the touch-sensitive surface 104-1, and send collected touch information to another component, for example, the processor 101. The touch event performed by the user near the touch-sensitive surface 104-1 may be referred to as a floating touch. The floating touch may mean that the user merely needs to approach an electronic device to execute a desired function, not requiring direct contact with a touch panel to select, move, or drag a target (for example, an icon). In an application scenario of the floating touch, terms such as "touch" and "contact" do not imply direct contact with the touchscreen, but contact near or close to the touchscreen. The touch-sensitive surface 104-1 that can support the floating touch may be implemented in a capacitive, infrared light sensing, or ultrasonic wave manner, or the like. The touch-sensitive surface 104-1 may include two parts: a touch detection apparatus and a touch controller. The touch detection apparatus detects a touch orientation of a user, detects a signal caused by a touch operation, and transfers the signal to the touch controller. The touch controller receives the touch information from the touch detection apparatus, converts the touch information to contact coordinates, and sends the contact coordinates to the processor 101. The touch controller may further receive and execute an instruction sent by the processor 101. In addition, the touch-sensitive surface 104-1 may be implemented in a plurality of types such as a resistive type, a capacitive type, an infrared type, and a surface acoustic wave type. The display (also referred to as a display screen) 104-2 may be configured to display information entered by the user or information provided for the user, and various menus of the mobile phone 100. The display 104-2 may be configured in a form such as a liquid crystal display or an organic light-emitting diode. The touch-sensitive surface 104-1 may cover the display 104-2. After detecting the touch event on or near the touch-sensitive surface 104-1, the touch-sensitive surface 104-1 transfers the touch event to the processor 101 to determine a type of the touch event, and then the processor 101 may provide corresponding visual output on the display 104-2 based on the type of the touch event. In FIG. 1, the touch-sensitive surface 104-1 and the display screen 104-2 are used as two independent components to implement input and output functions of the mobile phone 100. However, in some embodiments, the touch-sensitive surface 104-1 and the display screen 104-2 may be integrated to implement the input and output functions of the mobile phone 100. It may be understood that the touchscreen 104 is formed by stacking a plurality of layers of materials. Only the touch-sensitive surface (layer) and the display screen (layer) are displayed in this embodiment of this application, and other layers are not recorded in this embodiment of this application. In addition, in other embodiments of this application, the touch-sensitive surface 104-1 may cover the display 104-2, and a size of the touch-sensitive surface 104-1 is greater than a size of the display screen 104-2, so that the display screen 104-2 is all covered by the touch-sensitive surface 104-1, or the touch-sensitive surface 104-1 may be disposed on a front surface of the mobile phone 100 in a full-panel form, in other words, all touches of the user on the front surface of the mobile phone 100 can be sensed by the mobile phone. In this way, all-touch experience on the front surface of the mobile phone may be achieved. In other embodiments, the touch-sensitive surface 104-1 is disposed on the front surface of the mobile phone 100 in a full-panel form, and the display screen 104-2 may also be disposed on the front surface of the mobile phone 100 in a full-panel form. In this way, a bezel-less structure can be implemented on the front surface of the mobile phone.

In the embodiments of this application, the mobile phone 100 may further have a fingerprint recognition function. For example, a fingerprint recognizer 112 may be disposed on a back surface of the mobile phone 100 (for example, below a rear-facing camera), or a fingerprint recognizer 112 is disposed on the front surface of the mobile phone 100 (for example, below the touchscreen 104). In addition, the fingerprint recognition function may alternatively be implemented by disposing the fingerprint recognizer 112 on the touchscreen 104. To be specific, the fingerprint recognizer 112 may be integrated with the touchscreen 104 to implement the fingerprint recognition function of the mobile phone 100. In this case, the fingerprint recognizer 112 may be disposed on the touchscreen 104, may be a part of the touchscreen 104, or may be disposed on the touchscreen 104 in another manner. In addition, the fingerprint recognizer 112 may alternatively be implemented as a full-panel fingerprint recognizer. Therefore, the touchscreen 104 may be considered as a panel supporting fingerprint collection in any position. The fingerprint recognizer 112 may send a collected fingerprint to the processor 101, so that the processor 101 processes the fingerprint (for example, verifying the fingerprint). A main component of the fingerprint recognizer 112 in this embodiment of this application is a fingerprint sensor. The fingerprint sensor may use any type of sensing technology, including but not limited to an optical technology, a capacitive technology, a piezoelectric technology, an acoustic wave sensing technology, or the like.

In addition, for a specific technical solution of integrating a fingerprint collection device into the touchscreen in the embodiments of this application, refer to Patent Application No. US 2015/0036065 A1, filed with the United States Patent and Trademark Office and entitled "FINGERPRINT SENSOR OF ELECTRONIC DEVICE", of which all control elements are incorporated in the embodiments of this application by reference in its entirety.

The mobile phone 100 may further include a Bluetooth apparatus 105 configured to implement data exchange between the mobile phone 100 and another short-distance electronic device (for example, a mobile phone or a smartwatch). The Bluetooth apparatus in this embodiment of this application may be an integrated circuit, a Bluetooth chip, or the like.

The mobile phone 100 may further include at least one sensor 106 such as a light sensor, a motion sensor, or another sensor. Specifically, the light sensor may include an ambient light sensor and a proximity sensor. The ambient light sensor may adjust luminance of the display of the touchscreen 104 based on brightness of ambient light. The proximity sensor may power off the display when the mobile phone 100 is moved close to an ear. As one type of motion sensors, an accelerometer sensor can detect magnitudes of acceleration in all directions (which are usually three axes), and can detect a magnitude and a direction of gravity at rest. The accelerometer sensor may be used in an application for identifying a posture (for example, screen switching between landscape and portrait, a related game, and magnetometer posture calibration) of the mobile phone, vibration identification-related functions (for example, a pedometer and a knock), and the like. For other sensors such as a gyroscope, a barometer, a hygrometer, a thermometer, and an infrared sensor that may be configured for the mobile phone 100. Details are not described herein.

The Wi-Fi apparatus 107 is configured to provide, for the mobile phone 100, network access that complies with Wi-Fi related standard protocols. The mobile phone 100 may access a Wi-Fi access point by using the apparatus 107, to help a user receive and send an email, browse a web page, and access streaming media, and the Wi-Fi apparatus provides wireless broadband Internet access for the user. In other embodiments, the Wi-Fi apparatus 107 may alternatively be used as a Wi-Fi wireless access point and may provide Wi-Fi network access for another electronic device.

The positioning apparatus 108 is configured to provide a geographic location for the mobile phone 100. It may be understood that the positioning apparatus 108 may be specifically a receiver of a positioning system such as a global positioning system (global positioning system, GPS) or a Beidou navigation satellite system. After receiving a geographic location sent by the foregoing positioning system, the positioning apparatus 108 sends the information to the processor 101 for processing, or sends the information to the memory 103 for storage. In other embodiments, the positioning apparatus 108 may be a receiver of an assisted global positioning system (assisted global positioning system, AGPS). An AGPS is a running manner in which GPS positioning is performed with specific assistance. By using a signal of a base station together with a GPS satellite signal, the AGPS can enable a positioning speed of the mobile phone 100 to be higher. In the AGPS system, the positioning apparatus 108 may communicate with an assisted positioning server (for example, a mobile phone positioning server) to obtain positioning assistance. The AGPS system acts as an assisted server to assist the positioning apparatus 108 in completing ranging and positioning services. In this case, the assisted positioning server communicates with the positioning apparatus 108 (a GPS receiver) of the electronic device such as the mobile phone 100 by using a wireless communications network, to provide positioning assistance. In other embodiments, the positioning apparatus 108 may alternatively be a positioning technology based on a Wi-Fi access point. Each Wi-Fi access point has a globally unique MAC address, and an electronic device can scan and collect a broadcast signal of a surrounding Wi-Fi access point when Wi-Fi is enabled. Therefore, the electronic device can obtain a MAC address broadcast by the Wi-Fi access point. The electronic device sends data (for example, the MAC address) that can identify the Wi-Fi access point to a position server by using a wireless communications network, and the position server retrieves a geographic location of each Wi-Fi access point, calculates a geographic location of the electronic device with reference to strength of the Wi-Fi broadcast signal, and sends the geographic location of the electronic device to the positioning apparatus 108 of the electronic device.

The audio circuit 109, a loudspeaker 113, and a microphone 114 may provide an audio interface between the user and the mobile phone 100. The audio circuit 109 may transmit, to the loudspeaker 113, an electrical signal that is converted from received audio data, and the loudspeaker 113 converts the electrical signal into a sound signal for output. In addition, the microphone 114 converts a collected sound signal into an electrical signal, and the audio circuit 109 receives the electrical signal and converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an externally connected display, an external memory, or a subscriber identity module card). For example, a universal serial bus interface is used to connect to a mouse, or a metal contact on a slot of a subscriber identity module card is used to connect to the subscriber identity module (subscriber identity module, SIM) card provided by a telecommunications operator. The peripheral interface 110 may be used to couple the external input/output peripheral device to the processor 101 and the memory 103.

The mobile phone 100 may further include a power supply apparatus 111 (for example, a battery and a power management chip) that supplies power to various components. The battery may be logically connected to the processor 101 by using the power management chip, to implement functions such as charge management, discharge management, and power consumption management by using the power supply apparatus 111.

Although not shown in FIG. 1, the mobile phone 100 may further include a camera (a front-facing camera and/or a rear-facing camera), a flashlight, a micro projection apparatus, a near field communication (near field communication, NFC) apparatus, and the like. Details are not described herein.

All of the following embodiments may be implemented in the electronic device (for example, the mobile phone 100) having the foregoing hardware.

Figure 2A:
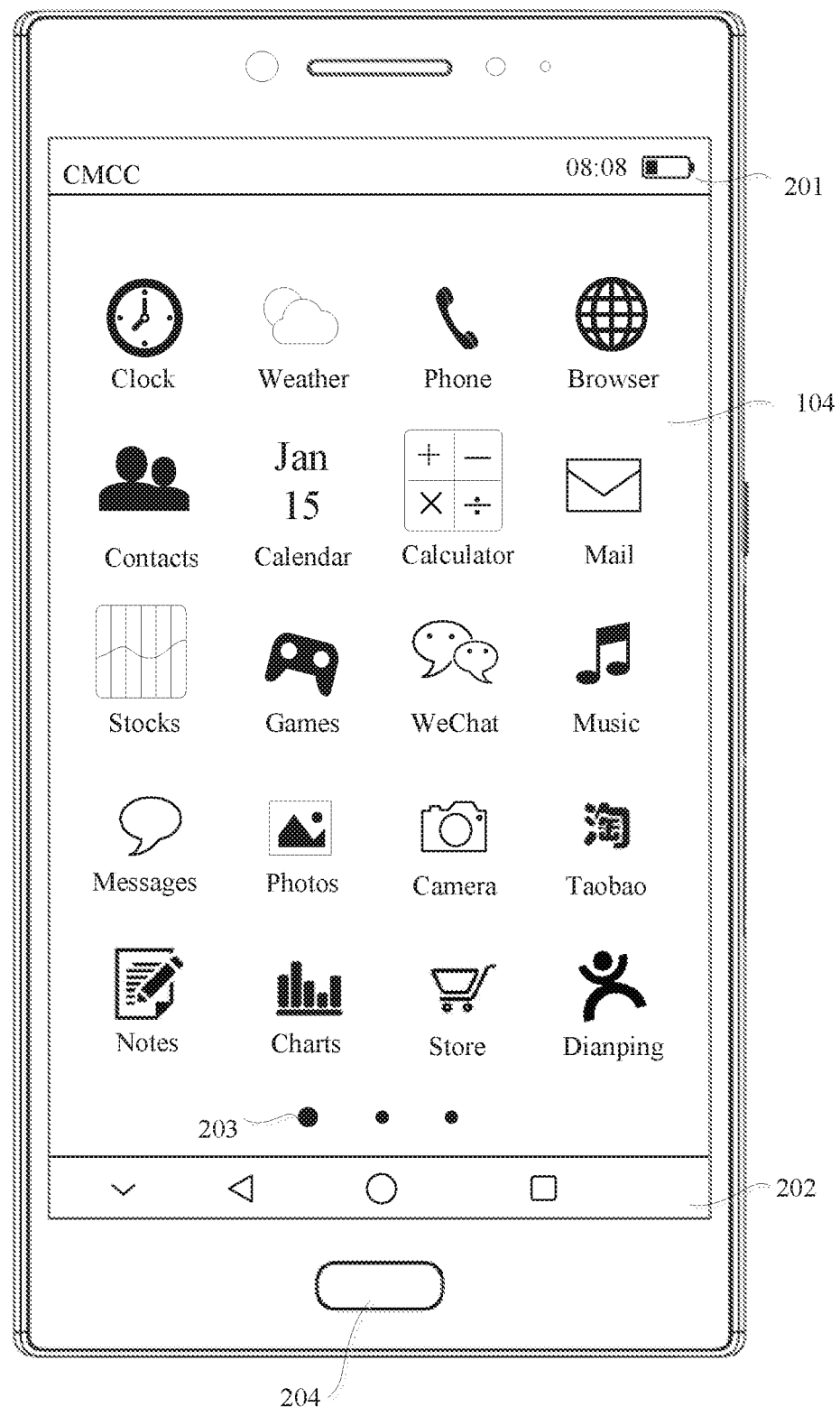
FIG. 2A to FIG. 2C are schematic diagrams of graphical user interfaces of subscreens of a home screen according to some embodiments.
Figure 2B:
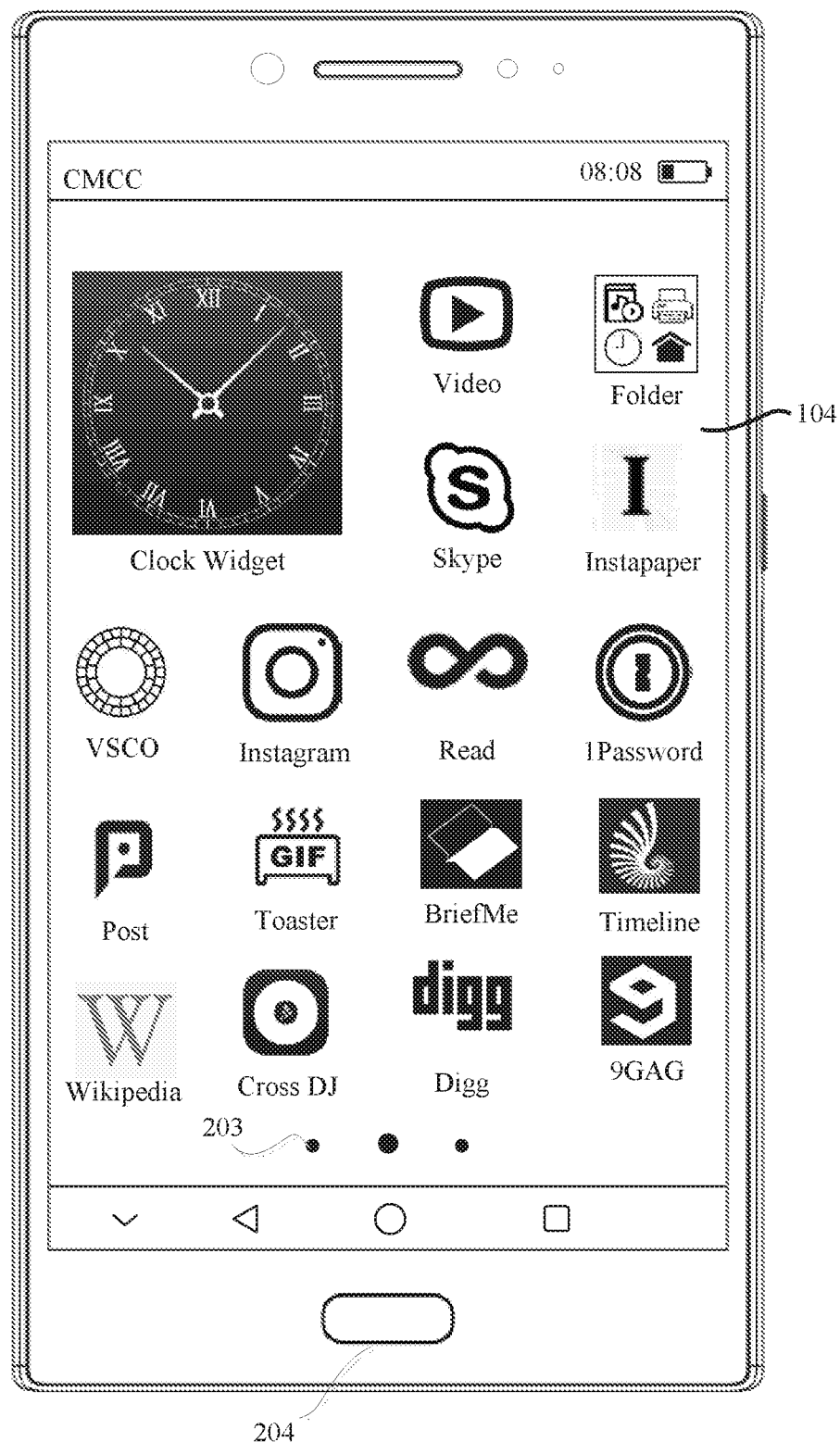
Figure 2C:
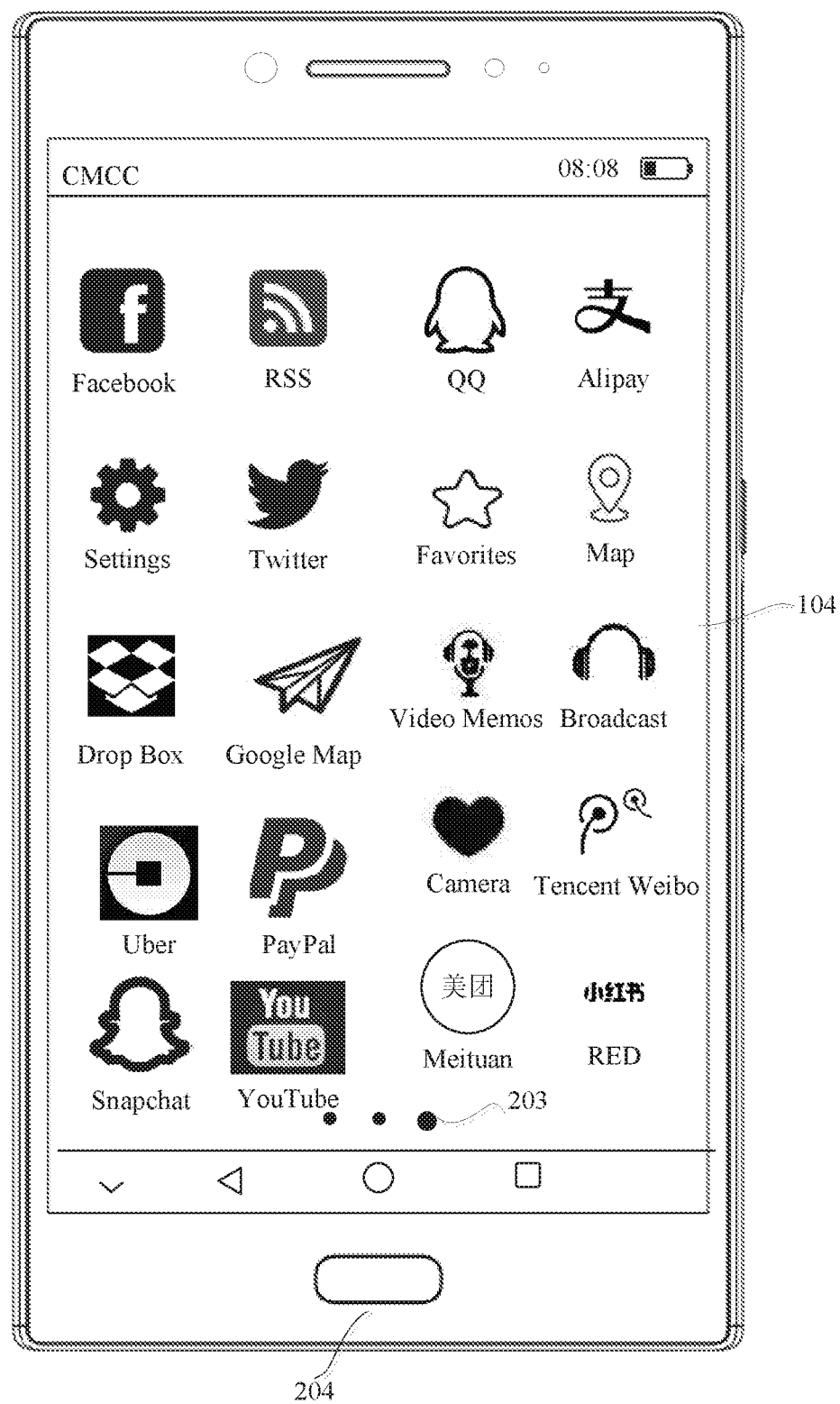

FIG. 2A to FIG. 2C show a series of example graphical user interfaces (graphical user interface, GUI) displayed on a touchscreen of an electronic device. All of these GUIs are on a home screen (Home screen) of the electronic device. Because a size of the touchscreen of the electronic device is fixed, usually, only a limited quantity of control elements (control element) can be displayed on the touchscreen of the electronic device. A control element is a GUI element. The control element is a software component that is included in an application, and controls all data processed by the application and controls an interaction operation related to the data. A user may interact with the control element through direct manipulation (direct manipulation), to read or edit related information of the app. The control element may usually include visible interface elements such as an icon, a button, a menu, a tab bar, a text box, a dialog box, a status bar, a navigation bar, and a widget. Therefore, when there are excessive control elements on the home screen of the electronic device, the home screen of the electronic device may be divided into a plurality of subscreens. For example, a GUI shown in FIG. 2A may be referred to as a first subscreen (the first sub-screen) of the home screen, a GUI shown in FIG. 2B may be referred to as a second subscreen (the second sub-screen) of the home screen, and a GUI shown in FIG. 2C may be referred to as a third subscreen (the third sub-screen) of the home screen. Each subscreen includes different control elements. FIG. 2A is used as an example for description. The GUI may be the first subscreen of the home screen of the electronic device. The first subscreen is displayed on the touchscreen of the electronic device and specifically includes a status bar 201, a collapsible navigation bar 202, a home screen indicator 203, and various icons. The home screen indicator 203 is used to indicate, to a user, a specific subscreen that is currently displayed. For example, the first subscreen includes five rows and four columns of icons, namely, 20 icons. When a finger (or a stylus) of a user touches a position on the touchscreen, in response to the touch event, the electronic device may open a graphical user interface of an app corresponding to an app icon. It may be understood that in other embodiments, the home screen may further include a dock bar. The dock bar may include frequently-used app icons, or the like.

In other embodiments, as shown in FIG. 2A to FIG. 2C, the electronic device may further include a home button 204. The home button 204 may be a physical button or a virtual button. The home button 204 is configured to receive a user instruction to return to the home screen from a currently displayed GUI, to display a specific subscreen of the home screen, so that a user can view the home screen at any time. The instruction may be specifically an operation instruction of pressing the home button 204 once by the user, or may be an operation instruction of successively pressing the home button 204 twice within a short time by the user, or may be an operation instruction of touching and holding the home button 204 within a predetermined time by the user. In other embodiments of this application, a fingerprint recognizer 112 may be further integrated into the home button 204, so that a fingerprint is collected and recognized when the home button 204 is pressed.

Figure 3:
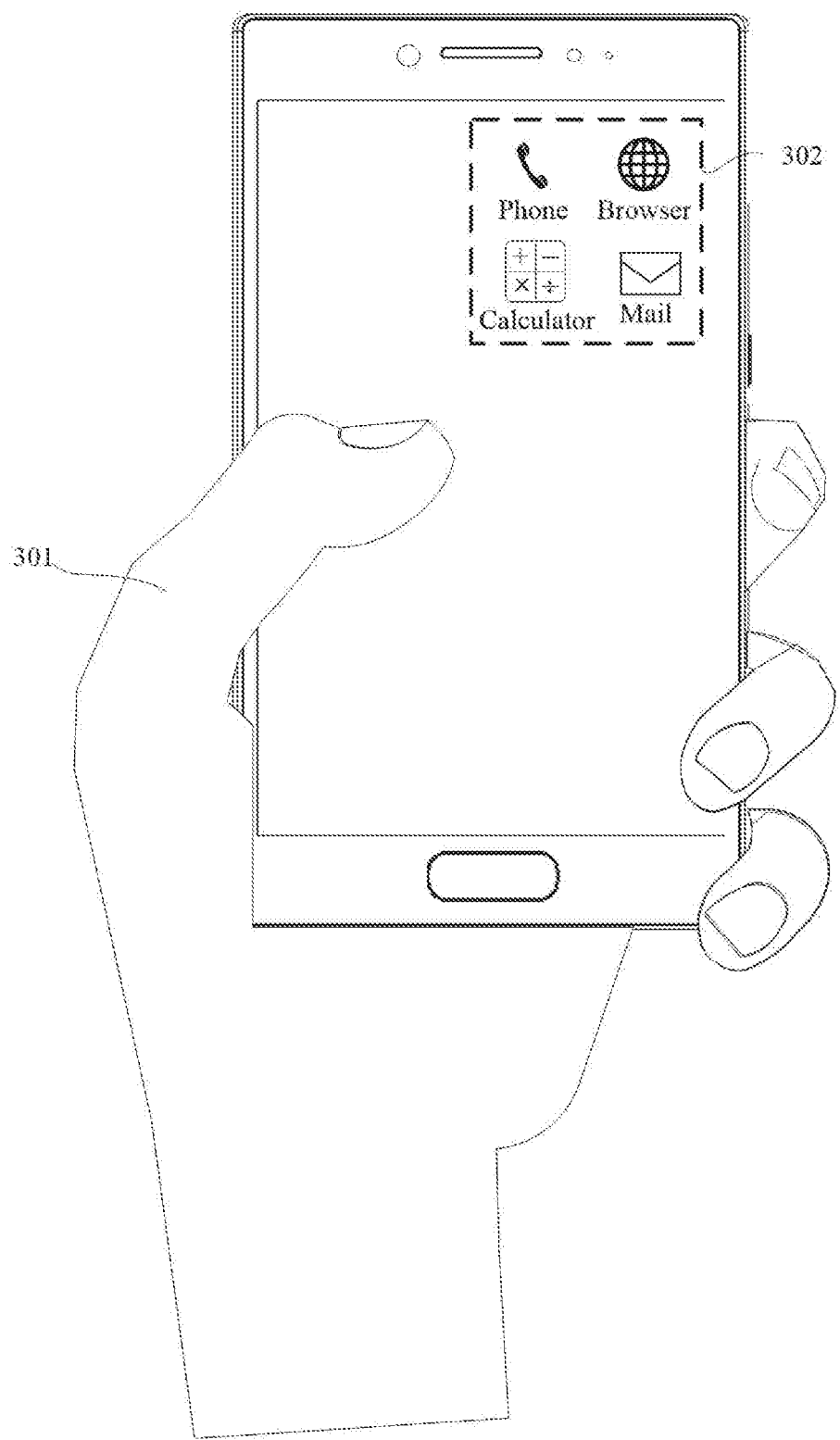
FIG. 3 is a schematic diagram of a one-hand operation scenario in the prior art.

As shown in FIG. 3, When a user performs a one-hand operation, if an icon that the user wants to operate (for example, the icon that the user wants to operate is in an area 302 shown in FIG. 3) is in an area that a thumb 301 of the user cannot reach, and the home screen of the electronic device is switched at a granularity of one subscreen, to be specific, a user finger slides leftwards or rightwards on the home screen to switch to a control element on a next subscreen or a previous subscreen, the user cannot operate a control element (for example, an app icon) in the area 302 conveniently by using a slide gesture by using one hand. Therefore, when the one-hand operation is performed, the foregoing technical problem needs to be resolved urgently.

To resolve the foregoing technical problem, the embodiments of this application provide a plurality of graphical user interface display methods, so that during a one-hand operation, a user quickly reaches an app, a widget, or the like that the user wants to operate. This improves processing efficiency of an electronic device and further improves user experience.

Figure 4A:
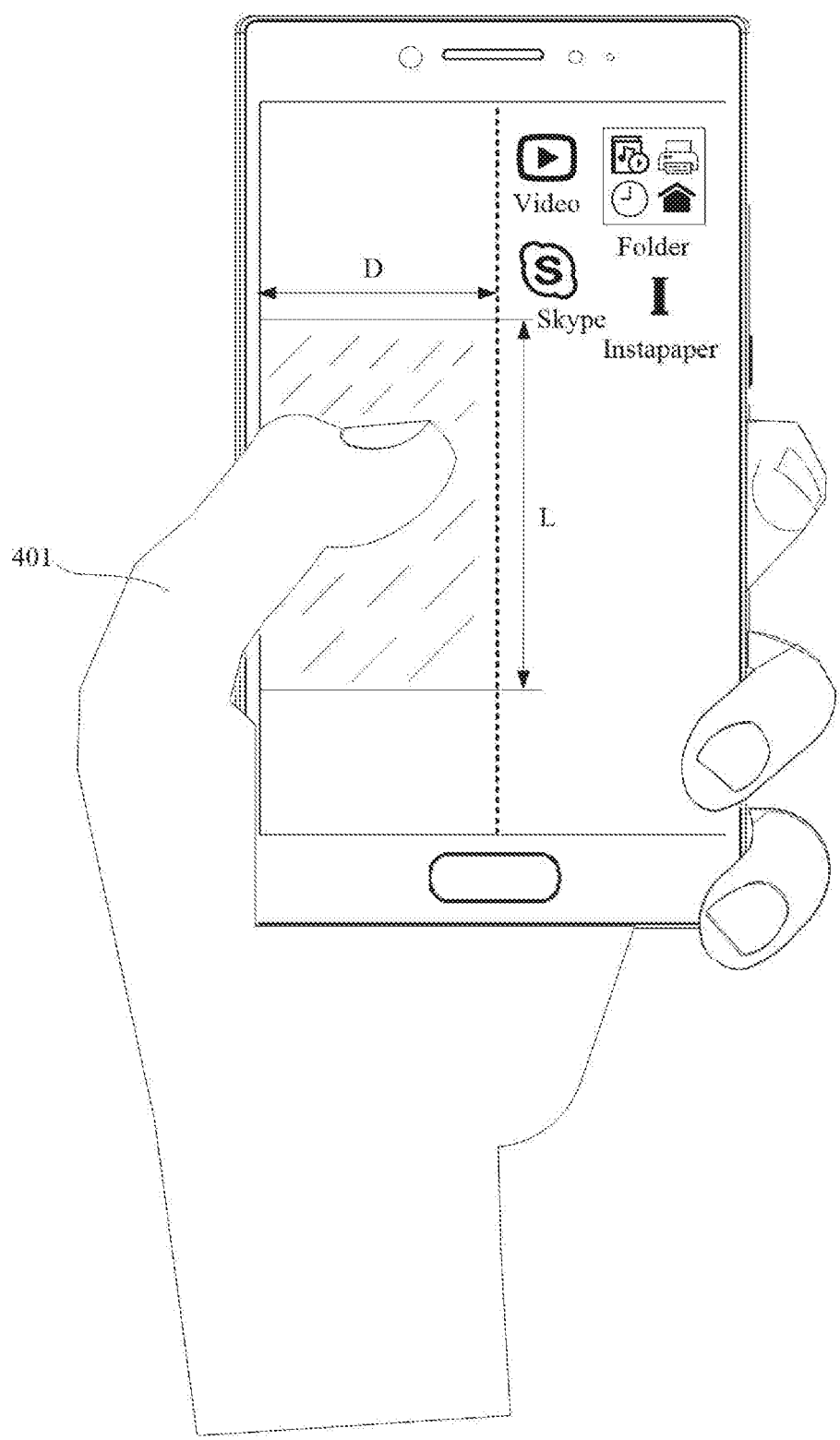
FIG. 4A and FIG. 4B are schematic diagrams of one-hand operation scenarios according to some embodiments of this application.
Figure 4B:
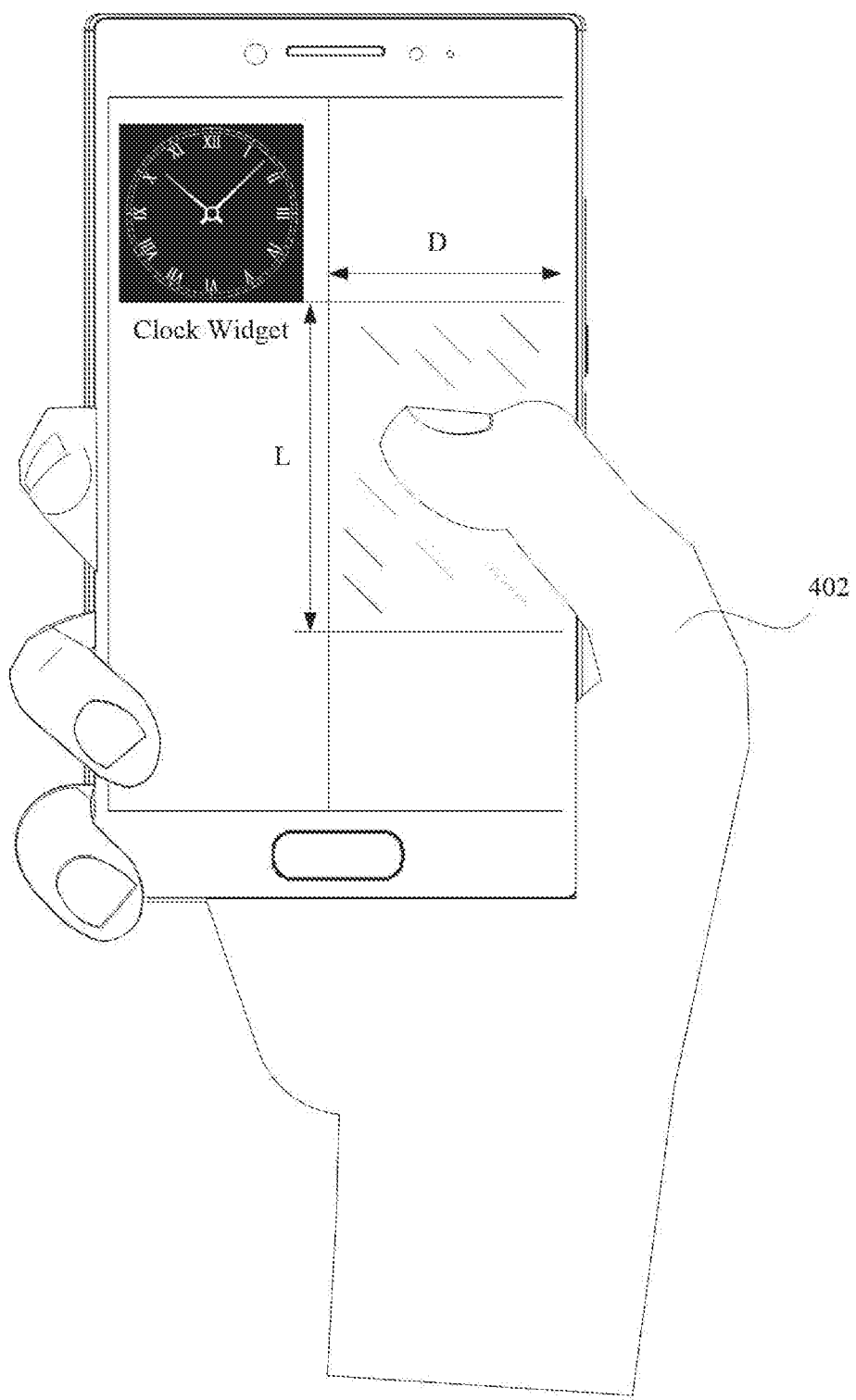
Figure 5A:
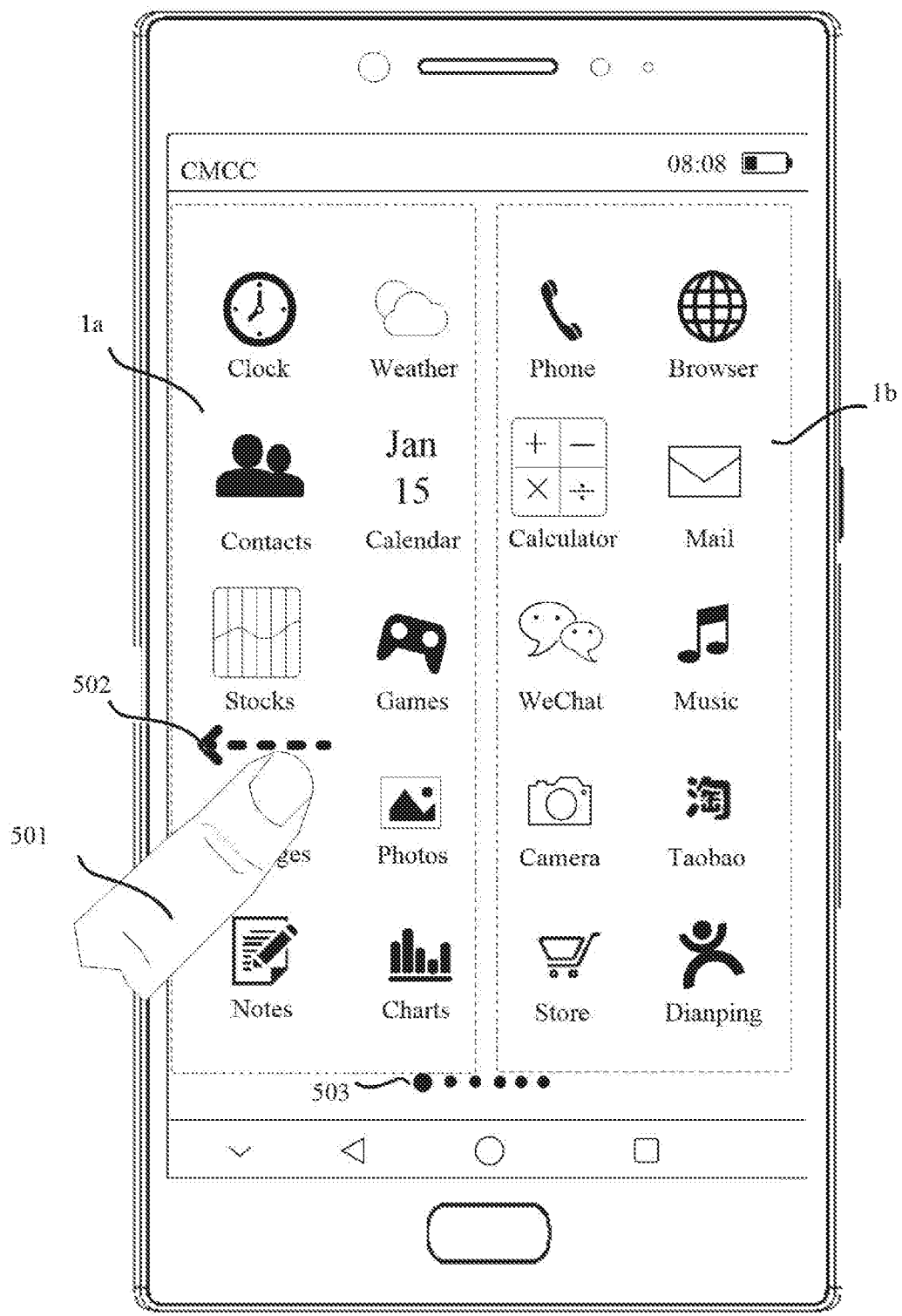
FIG. 5A to FIG. 5I are schematic diagrams of some graphical user interfaces displayed on an electronic device according to some embodiments of this application.
Figure 5B:
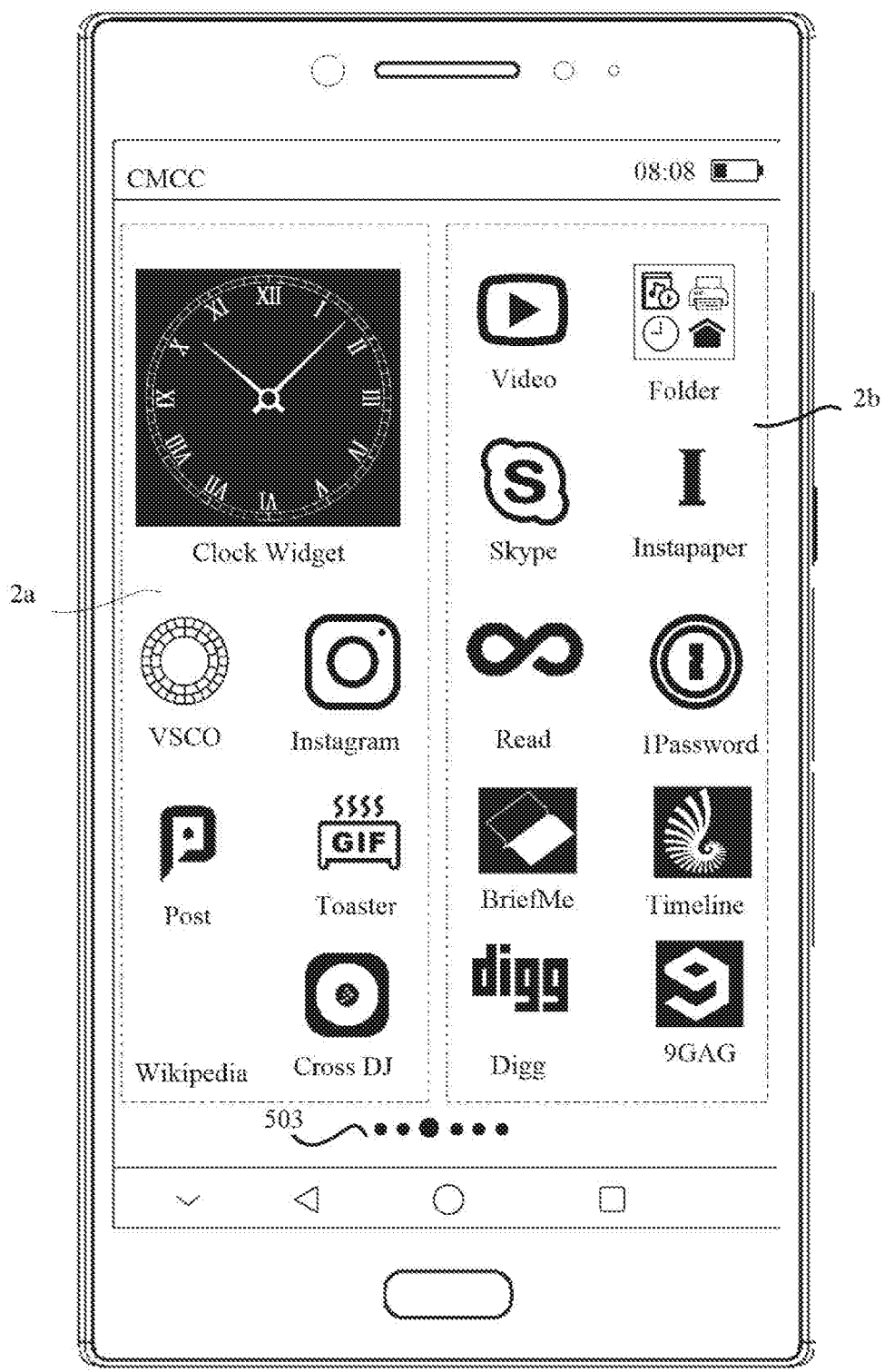
Figure 5C:
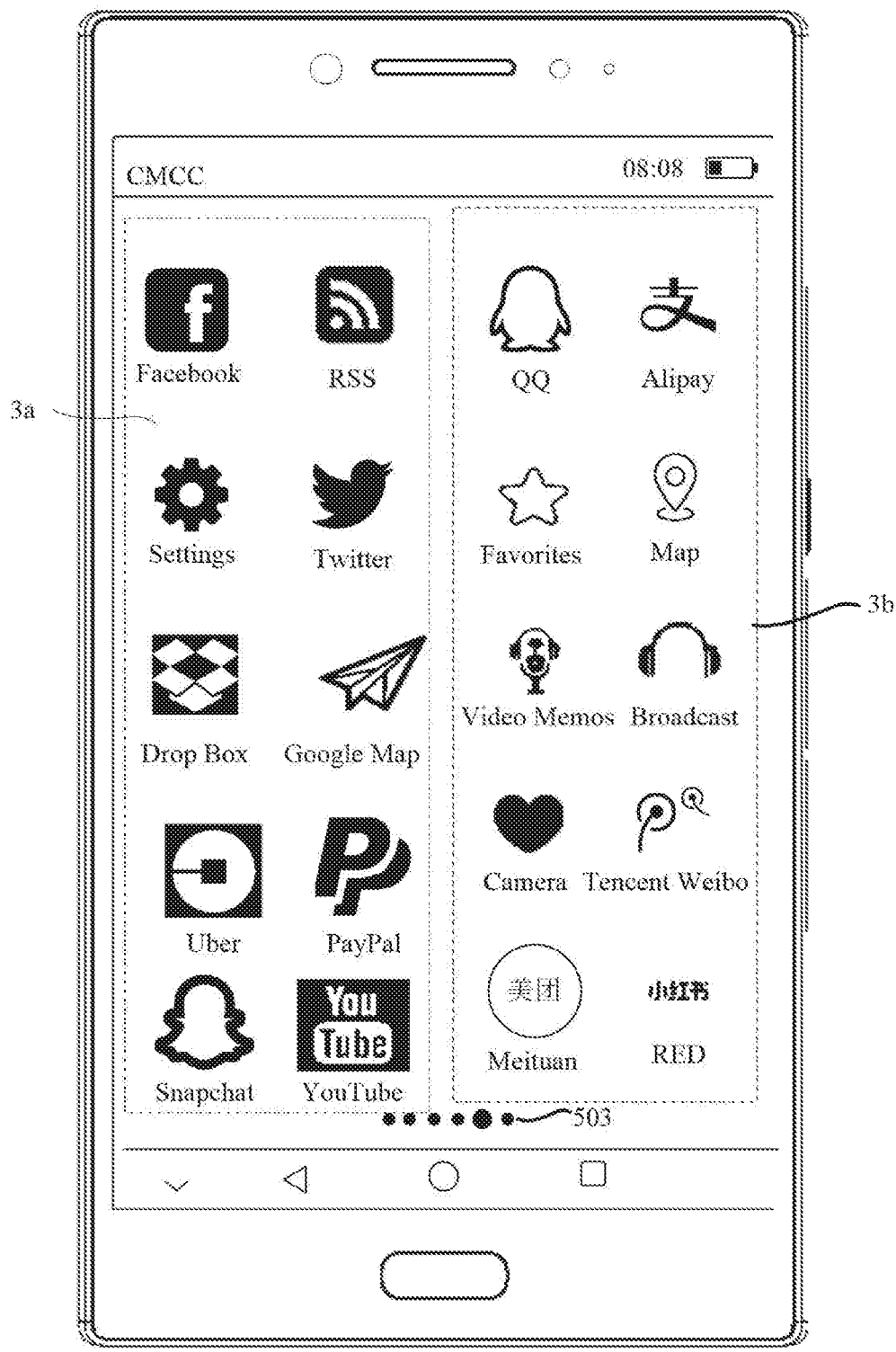
Figure 5D:
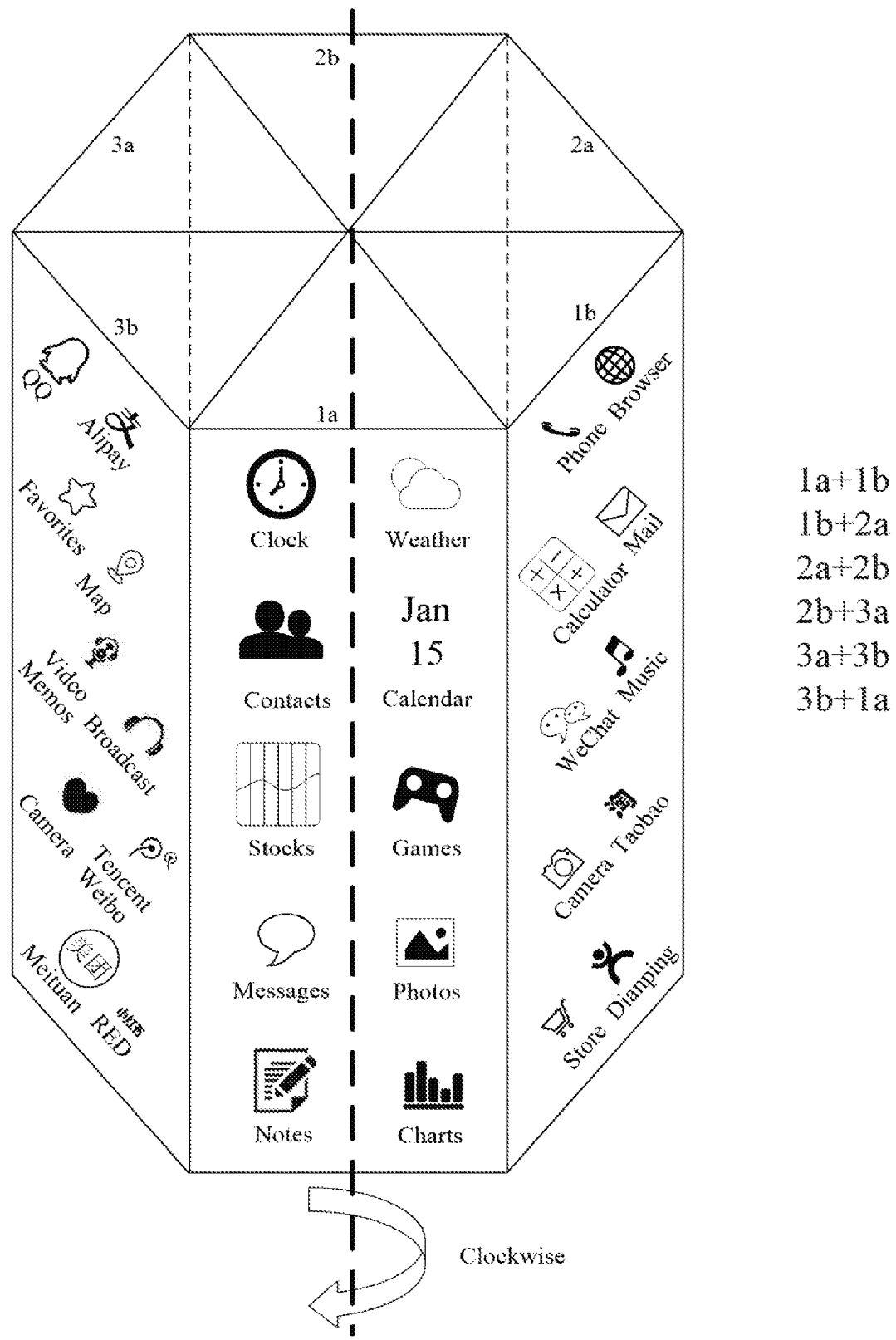

In an embodiment of this application, as shown in FIG. 4A and FIG. 4B, when a user performs a one-hand operation on an electronic device (for example, a mobile phone or a tablet computer), an area, marked by a slash shadow in the figure, on a touchscreen may be defined as a comfortable operation area, to be specific, an area whose width is d and whose length is l on the touchscreen. The comfortable operation area may be an area that can hold three rows and two columns of (six in total) icons, and the user easily performs a one-hand operation on control elements in this area Certainly, this area may alternatively be an area (for example, an arc-shaped area) that a thumb 401 of a user can actually reach on the touchscreen. If an app icon that the user wants to operate is in this area, the user can conveniently operate (for example, tap, touch and hold, or heavily press) the app icon by using one hand. For example, the width d may be specifically defined as a "one-hand width", to be specific, a half of a width D of the touchscreen, namely, d=½D. A mobile phone is used as an example. As shown in FIG. 5A, a one-hand width of a home screen may be set to a half of a width D of a touchscreen, as shown by a dashed line. An area 1a shown by a dashed-line box is a left-half area of a first subscreen of the home screen, and an area 1b shown in a dashed-line box is a right-half area of the first subscreen. When a finger 501 of a user performs a leftward-slide gesture 502 (in other words, the user switches the home screen), the home screen is switched at a granularity of an occupied touchscreen area of a one-hand width, which may be referred to as a half-screen switch function or a one-hand mode. It may be understood that the user may alternatively perform a rightward-slide gesture to perform a half-screen switch. The half-screen switch may alternatively be understood as switching a half subscreen. A second subscreen may also be divided into two areas, for example, 2a and 2b, by using the same method, and a third subscreen may also be divided into two areas, for example, 3a and 3b, as shown in FIG. 5B and FIG. 5C. Due to a half-screen switch, a change caused during each switch of the home screen of the electronic device is different from that caused by a home screen switch in the prior art. As shown in FIG. 5D, when a user performs a half-screen switch by using a slide gesture, the home screen displayed on the touchscreen may be a subscreen (1a+1b), a subscreen (1b+2a), a subscreen (2a+2b), a subscreen (2b+3a), a subscreen (3a+3b), or a subscreen (3b+1a). In other embodiments of this application, to ensure that a user quickly identifies various different subscreens or different areas thereof, different colors or different wallpapers may be used to distinguish between backgrounds of the subscreens, or different colors or different wallpapers may alternatively be used to distinguish between backgrounds of different areas of the subscreens. For example, a second area of the first subscreen has a green background, a first area of the second subscreen has a blue background, and a second area of the second subscreen has a yellow background. Alternatively, a wallpaper of the first subscreen is a picture 1, and a wallpaper of the second subscreen is a picture 2. Alternatively, the first subscreen has a blue background (to be specific, both the area 1a and the area 1b have a blue background), and the second subscreen has a green background (to be specific, both the area 2a and the area 2b have a blue background).

Figure 5E:
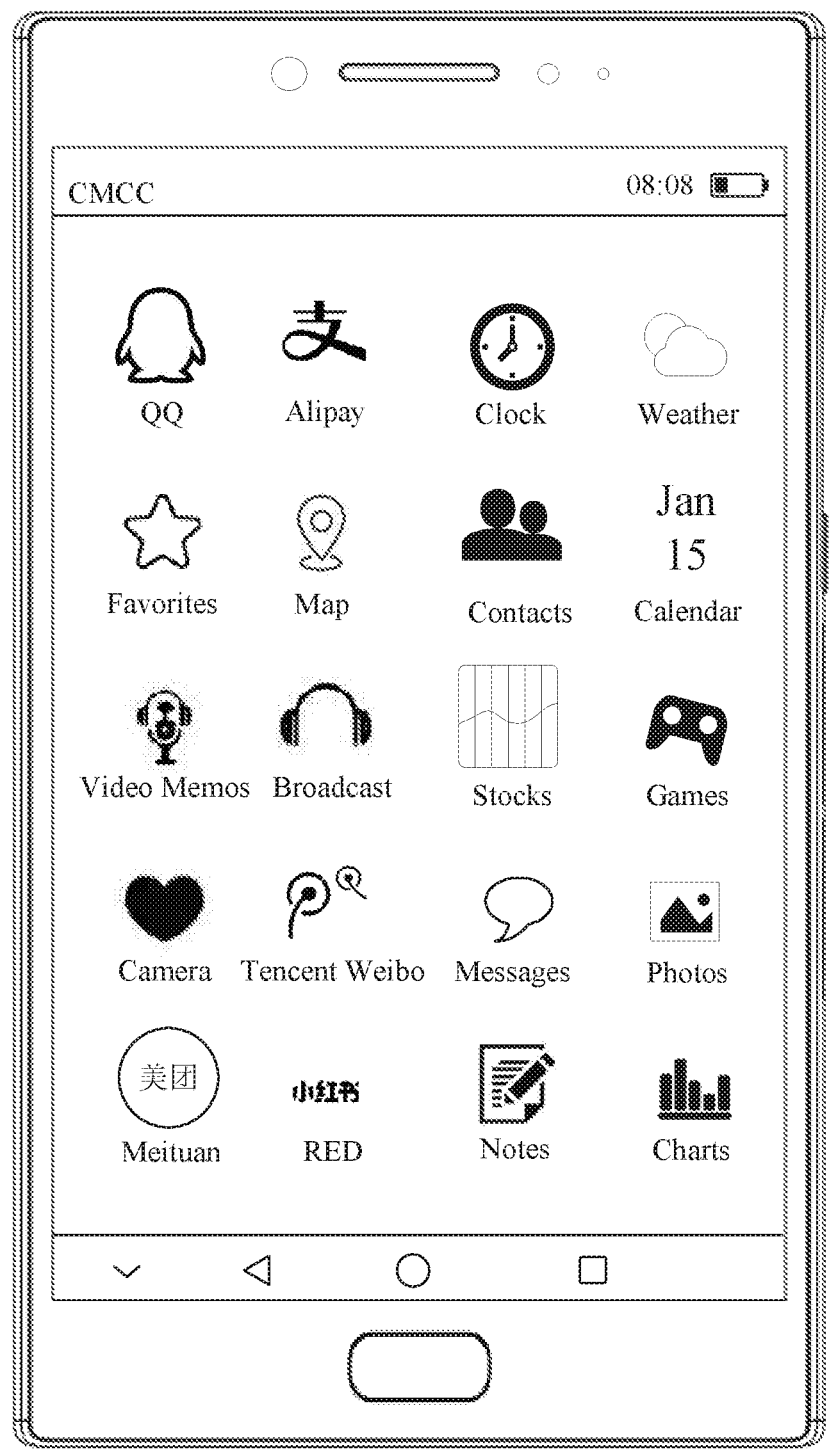

It may be understood that the subscreens may be subscreens displayed on the touchscreen after the slide gestures are completed, instead of intermediate-process screens displayed on the touchscreen in slide processes. For example, when a user switches a home screen, after a slide gesture is completed, in one case, a subscreen shown in FIG. 5E may be displayed. The subscreen may include the area 3b of the third subscreen and the area 1a of the first subscreen. Therefore, a quantity of subscreens of the home screen is changed from 3 to 6. This greatly enhances flexibility and operability of a home screen on an electronic device and also improves user experience.

Figure 5F:
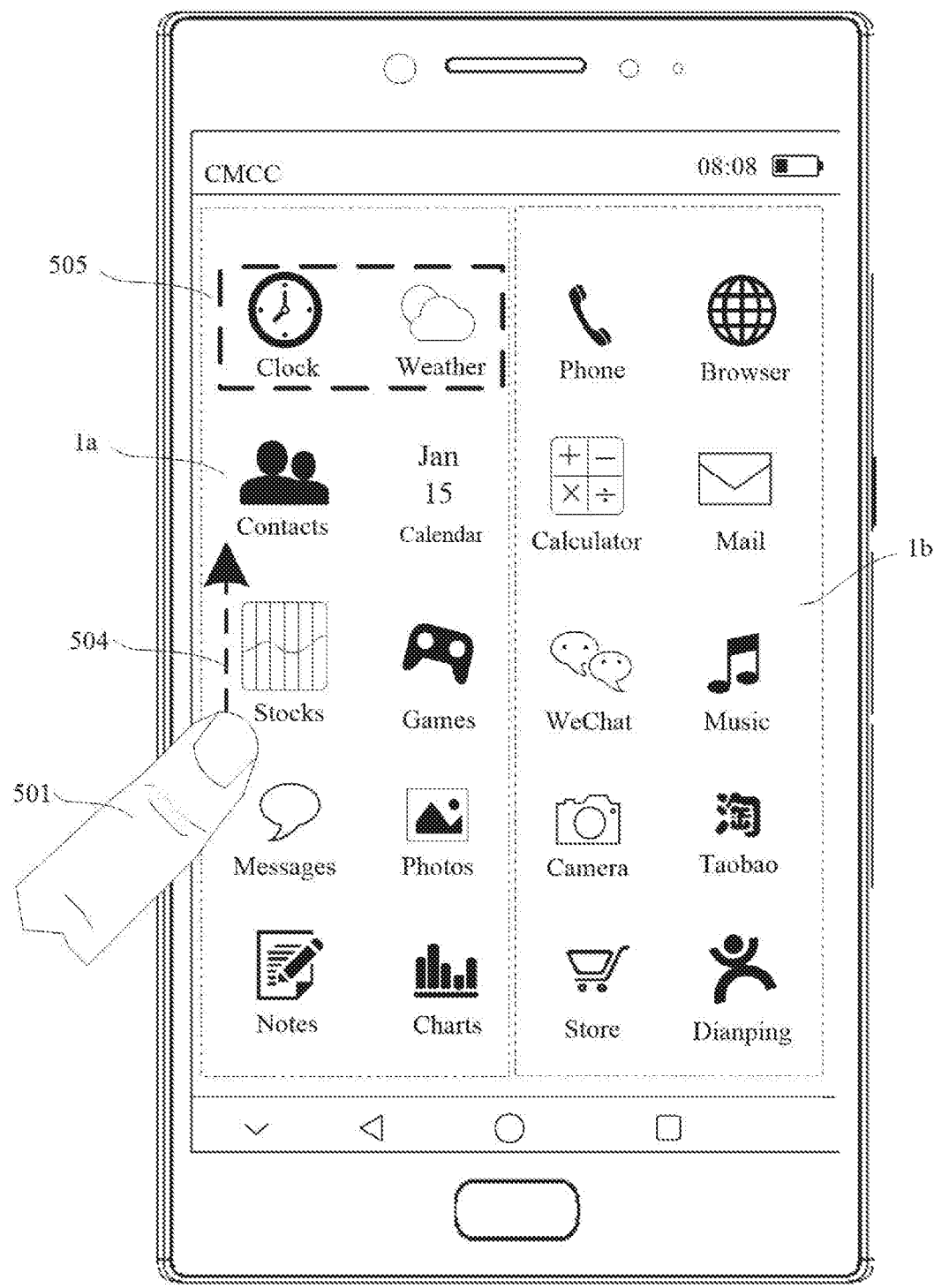
Figure 5G:
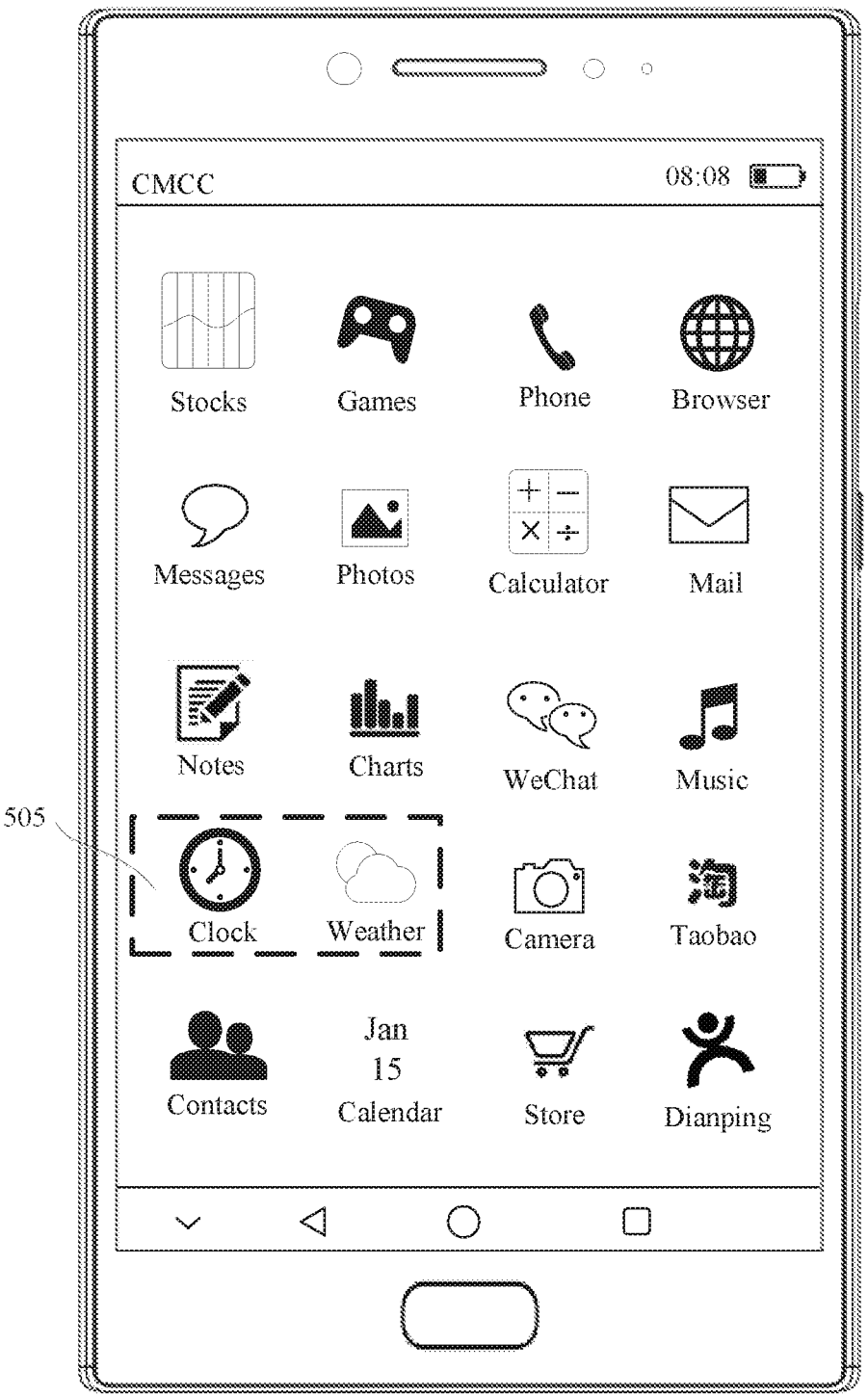

During a half-screen switch, the user may perform further processing on a control element in a specific area on a subscreen without affecting a control element in another area. FIG. 5F shows a GUI of a first subscreen (1a+1b). A finger 501 of the user performs an upward-slide gesture 504 on the touchscreen. In response to the gesture 504, icons in the area 1a of the first subscreen on the touchscreen are slid/scrolled upwards in an animation form, but a control element layout (for example, an app icon layout) in the area 1b of the first subscreen may remain unchanged. Certainly, control elements in the area 1b of the first subscreen may alternatively be slid/scrolled upwards synchronously along with control elements in the area 1a, in other embodiments, control elements in the area 1b of the first subscreen may alternatively not be slid/scrolled upwards synchronously along with control elements in the area 1a, in other words, the control element layout in the area 1b remains unchanged. After the electronic device detects that the gesture 504 stops, sliding/scrolling of the icons in the area 1a is also stopped, and a GUI shown in FIG. 5G is displayed. In FIG. 5G the icons in the area 1a are re-arranged due to the slide gesture 504 of the user. For example, a subarea 505 (including a clock icon and a weather icon) originally displayed in a first row in FIG. 5F is displayed in a fourth row in FIG. 5G, but the icon layout in the area 1b may not change at this time.

Figure 5H:
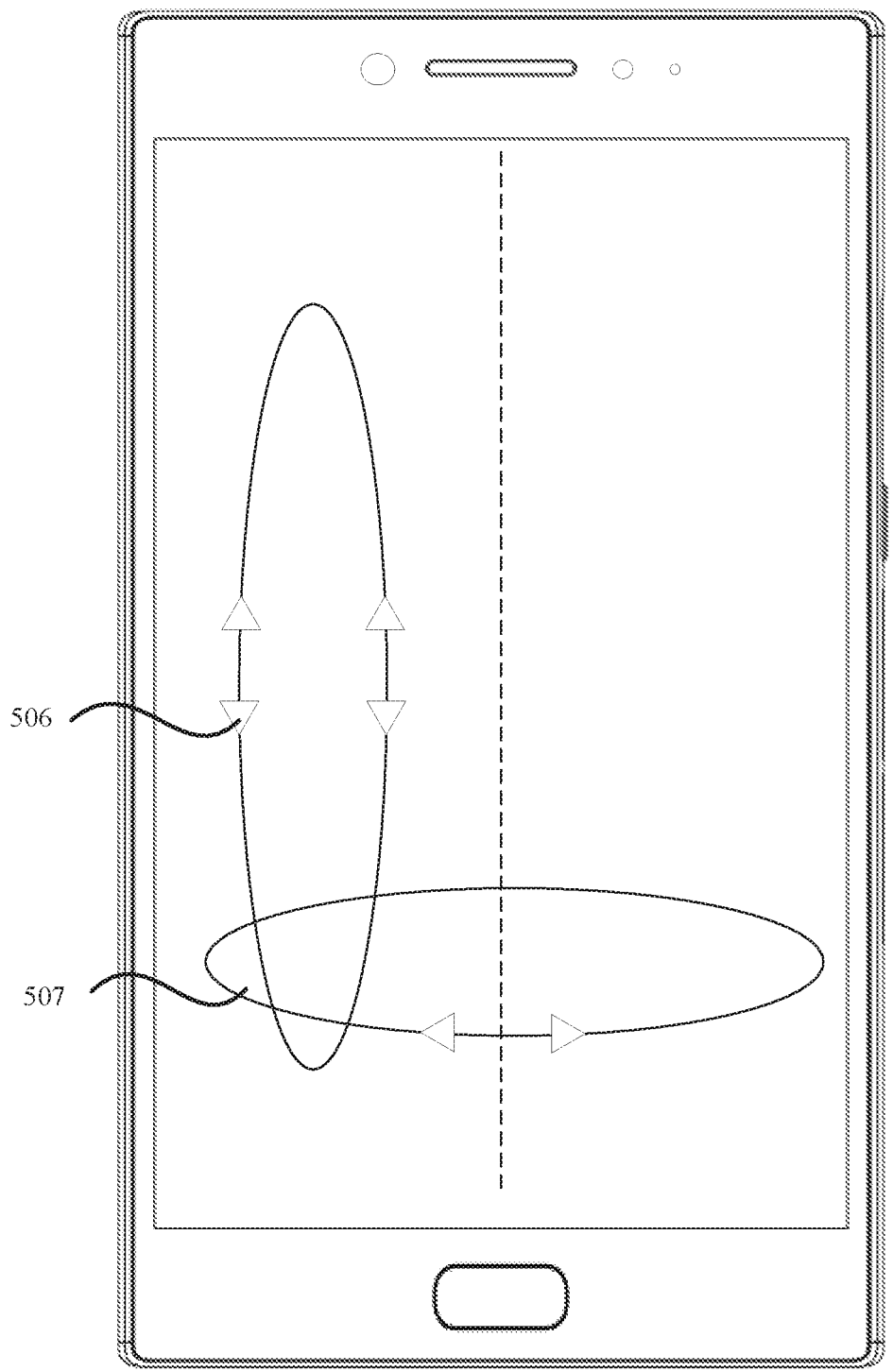
Figure 5I:
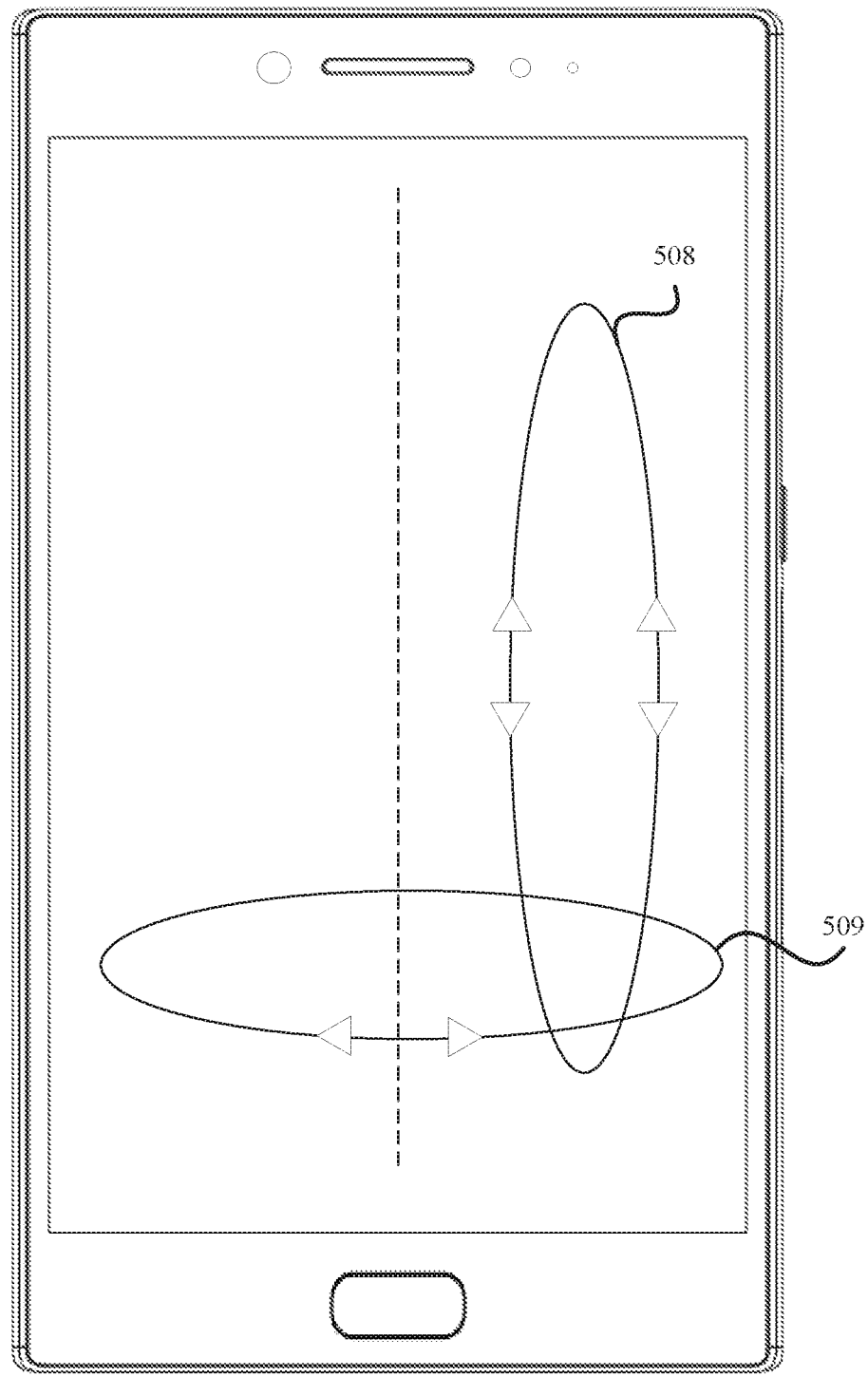

As shown in FIG. 5H, when the user holds the electronic device by using a left hand, the electronic device may perform a half-screen switch, and all subscreens of the home screen may be displayed in a horizontal cyclic manner (shown by a reference numeral 507) through a user operation (for example, a leftward or rightward slide), For example, when the user performs a rightward-slide gesture in the area 1a of the first subscreen, in response to the gesture, the area 3b of the third subscreen and the area 1a of the first subscreen may be displayed on the touchscreen of the electronic device. In addition, control elements in a left-half screen area of a subscreen may be displayed in a vertical cyclic manner through a user operation (for example, an upward or downward slide) (as shown by a reference numeral 506). Similarly, when the user holds the electronic device by using a right hand, as shown in FIG. 5I, all subscreens of the home screen may be displayed in a horizontal cyclic manner through a user operation (for example, a leftward or rightward slide) (as shown by a reference numeral 509). In addition, control elements in a right-half screen area of a subscreen may be displayed in a vertical cyclic manner through a user operation (for example, an upward or downward slide) (as shown by a reference numeral 508).

According to the foregoing embodiments, a technical solution of man-machine interaction that is based on a half-screen switch and supplemented with half-screen scroll is established in this application. This technical solution can ensure that a user performs a one-hand operation very conveniently when an electronic device is held by using one hand. This simplifies prior-art complex operations, and further improves user experience when a user performs a one-hand operation. The following describes the technical solutions of this application in detail by using specific examples.

Figure 6A:
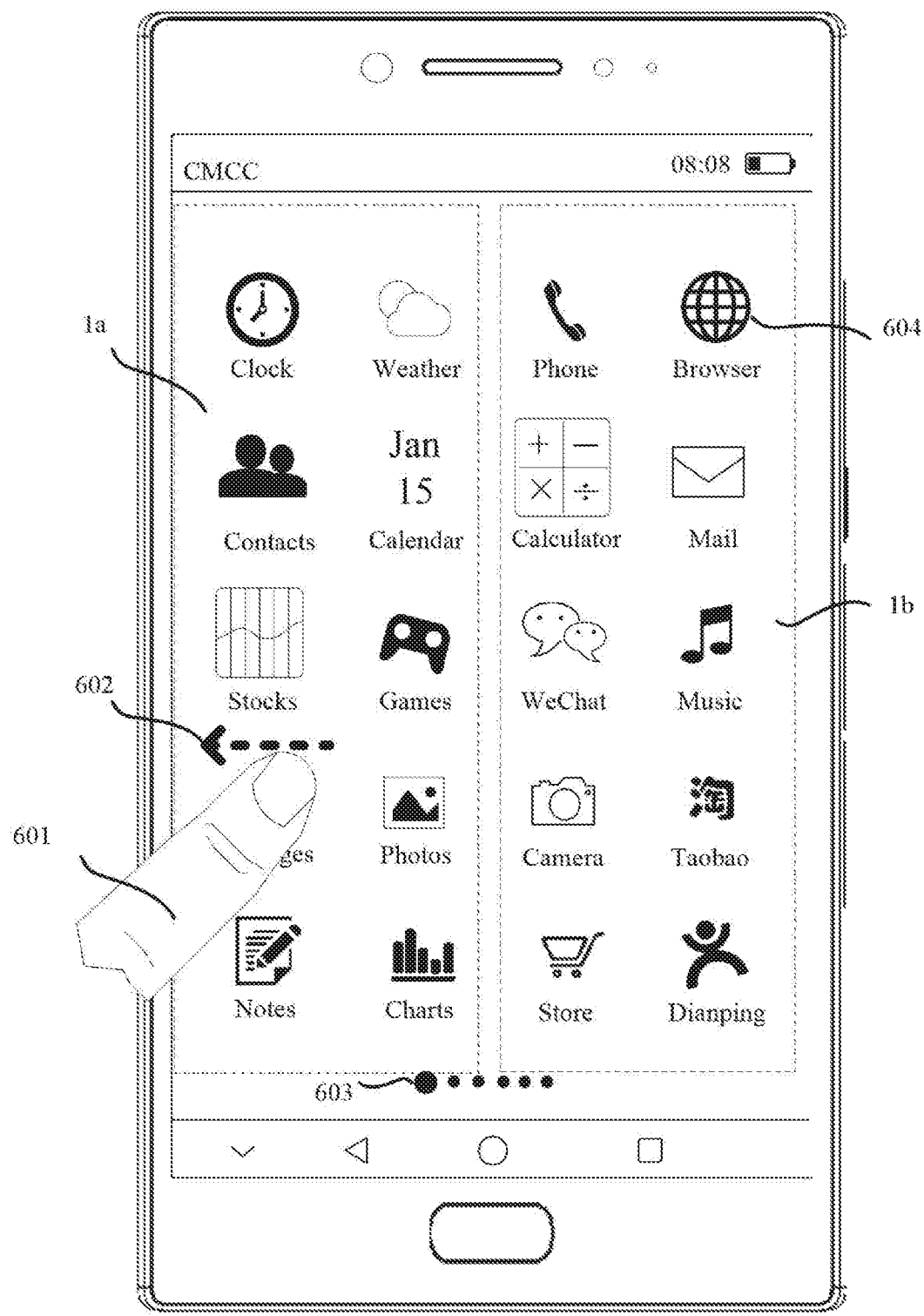
FIG. 6A to FIG. 6I are schematic diagrams of some graphical user interfaces displayed on an electronic device according to some other embodiments of this application.

As shown in FIG. 6A, a currently displayed home screen is a first subscreen. When a finger 601 (which is usually a thumb) of a user performs a leftward-slide gesture 602 on a touchscreen, in response to the gesture 602, an electronic device switches the first subscreen displayed on the touchscreen to another subscreen shown in FIG. 6B. The subscreen includes an area 1b of the first subscreen and an area 2a of a second subscreen. A home screen indicator 603 indicates that the current subscreen (1b+2a) is located in a second position of the home screen. In other embodiments of this application, when a one-hand mode function of the electronic device is enabled, the home screen indicator may be changed from a status shown in FIG. 2A to a status shown in FIG. 6A, to adapt to a switch of the current home screen. It may be understood that after the finger 601 of the user performs another leftward-slide gesture on the subscreen (1b+2a) shown in FIG. 6B, in response to the gesture, the electronic device may continue to perform a half-screen switch. In this case, the home screen displayed on the touchscreen is a subscreen (2a+2b), namely, the second subscreen. It may be understood that the subscreens may be subscreens displayed on the touchscreen after the slide gestures are completed, instead of intermediate-process screens displayed on the touchscreen in slide processes.

In an embodiment of this application, when a user holds an electronic device by using a left hand, and the user wants to operate (for example, tap or touch and hold) a target app icon displayed on an upper right corner of a touchscreen, the technical solutions in this application can be used. As shown in FIG. 6A, the user wants to use a browser (which may be referred to as a target app) on the first subscreen to open a web page. In this case, when the user holds the electronic device by using the left hand and the electronic device detects the leftward-slide gesture 602 of the user in an area 1a of the first subscreen, in response to the gesture 602, the electronic device displays a GUI shown in FIG. 6B. The GUI includes the area 1b of the first subscreen and the area 2a of the second subscreen. In this case, a browser icon 604 is moved from a position of the browser icon 604 in FIG. 6A to a position of the browser icon 604 in FIG. 6B. Then the electronic device detects a downward-slide gesture 605 of the user in the area 1b of the first subscreen. In response to the gesture 605, control elements (for example, an app icon, a widget, and a folder) in the area 1b are scrolled/slid downwards correspondingly, and a control element layout in the area 2a may remain unchanged. The downward scroll/slide in the area 1b may be specifically as follows: scrolling/sliding downwards at a granularity of each row of app icons in the area, or correspondingly scrolling app icons in the area 1b at a speed of the gesture 605; and cyclically scrolling the app icons in the area 1b. After the electronic device detects that the gesture 605 stops or the electronic device receives a user instruction for stopping scrolling/sliding, the electronic device displays a GUI shown in FIG. 6C. In the GUI, the browser icon 604 is scrolled to a middle position in the area 1b, and the position is in a comfortable operation area for a one-hand operation of the user. When the user holds the electronic device by using one hand, a thumb may be used to tap the browser icon. In response to the tap operation, the electronic device can start a browser application and display a main screen 606 of the app on the touchscreen, as shown in FIG. 6D. This facilitates a one-hand operation of a user, improves processing efficiency of an electronic device, and further improves user experience.

For example, the gestures (for example, the gestures 602 and 605) in the foregoing embodiments may be different types of slide gestures. For example, the gesture may be as follows: A finger (which is usually a thumb) of the user taps the touchscreen, quickly slides, and then quickly leaves the touchscreen (in other words, lifting the finger). Alternatively, the gesture may be as follows: A finger of the user taps the touchscreen, and keeps touching and moving. The second touch event may be as follows: A finger of the user taps the touchscreen, and slowly moves without leaving the touchscreen. It may be understood that in addition to the listed gestures, the gesture may alternatively be another type of gesture. No limitation is imposed on the type of the gesture in this embodiment of this application.

Figure 6B:
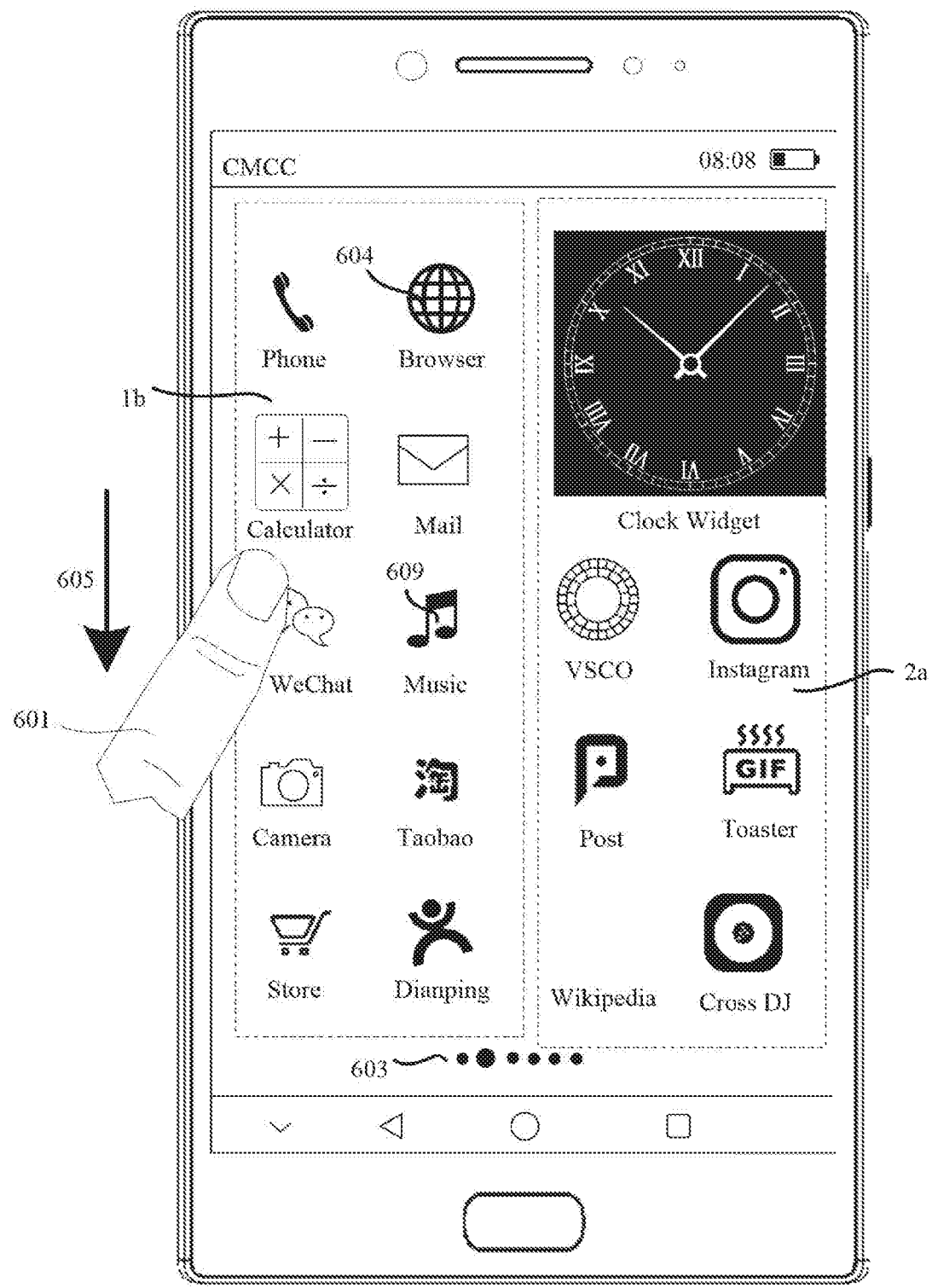
Figure 6C:
Figure 6D:
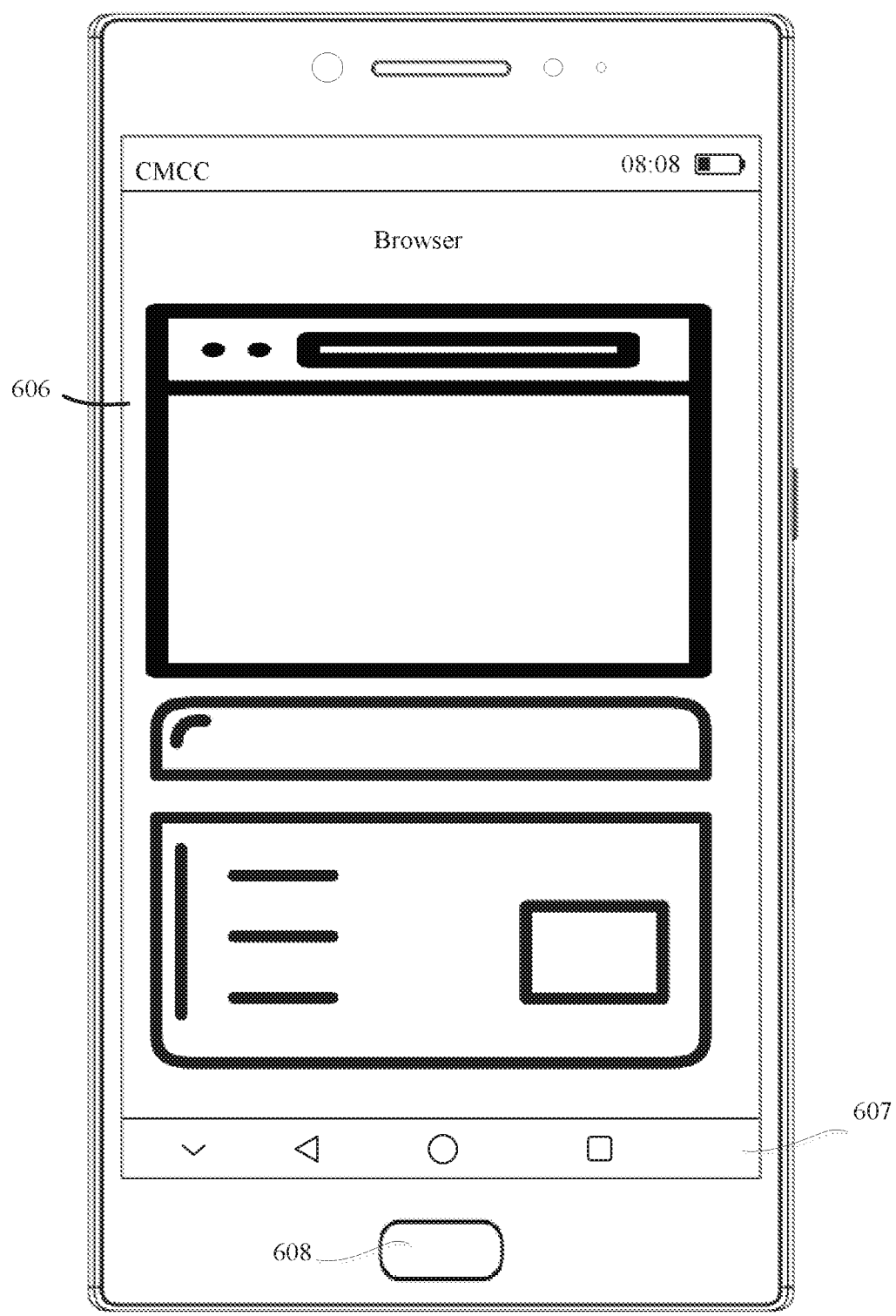

In other embodiments of this application, for example, when the user presses a home button 608 in FIG. 6D or taps a navigation bar 607, the electronic device may exit a related GUI of the browser application and display a GUI shown in FIG. 6A or FIG. 6B. To be specific, after the user completes a related operation on an app in a one-hand mode, the electronic device may receive user input, so that an original icon layout is displayed in the area 1b on the touchscreen. In this way, an icon that the user wants to operate can be quickly found without changing an original habit of the user, thereby avoiding increasing a user learning difficulty caused by icon re-arrangement.

In other embodiments of this application, when the user presses a home button 608 in FIG. 6D or taps a navigation bar 607, the electronic device may exit a related GUI of the browser application and display a GUI shown in FIG. 6C. To be specific, after the user completes a related operation on an app in a one-hand mode, the electronic device may receive user input, so that re-arranged icons are displayed on the touchscreen. An advantage of this practice is that when the user wants to operate an app (for example, the browser application) next time, the app icon may be tapped in an area instead of looking for the app in a one-hand mode. This improves processing efficiency of an electronic device and also improves a man-machine interaction capability of the electronic device.

Figure 6E:
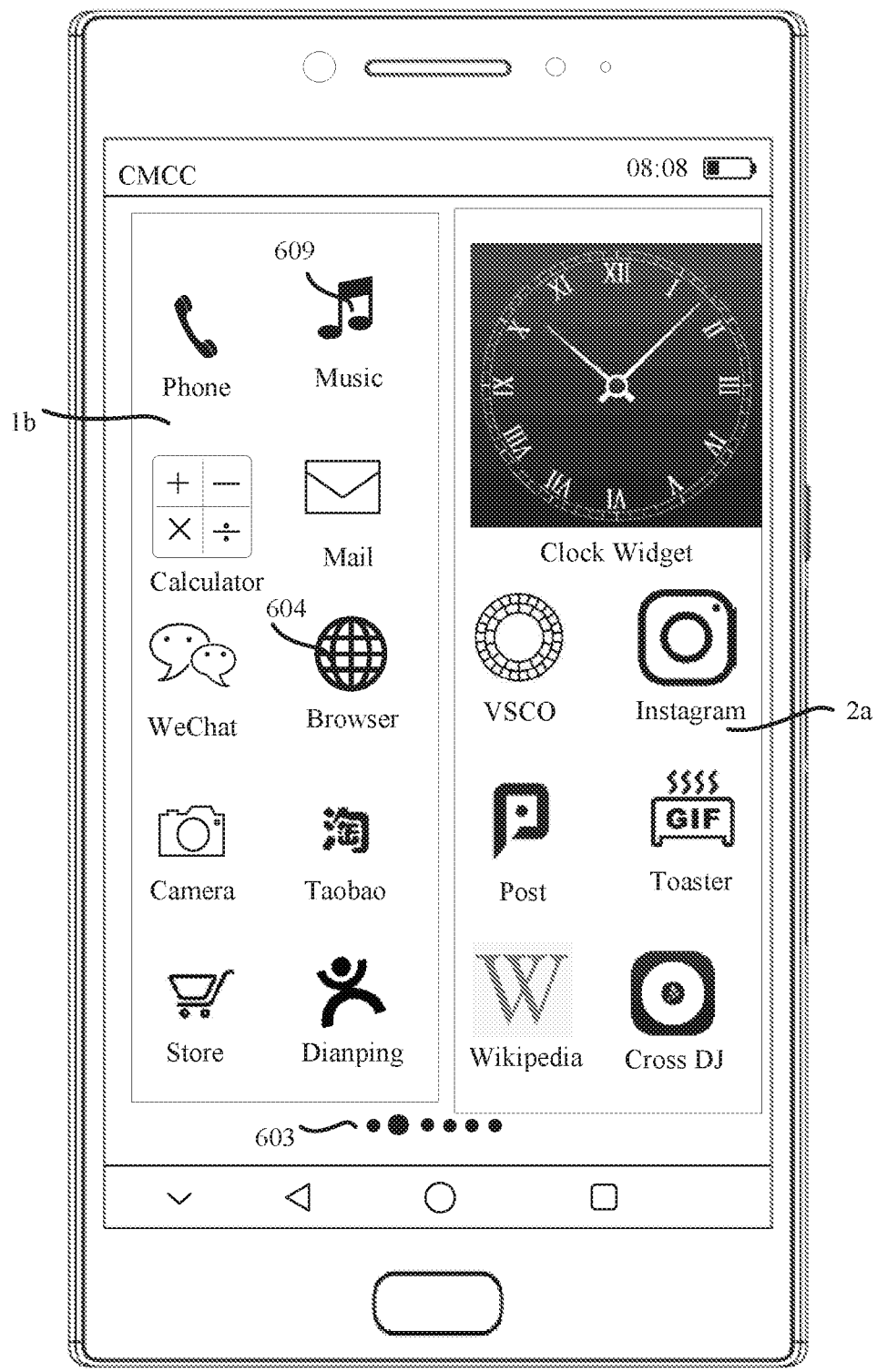

In other embodiments of this application, the electronic device may re-arrange only an icon of an app opened in a one-hand mode. For example, in FIG. 6B, a music icon 609 is located in a row 3 and a column 2, but the browser icon 604 is arranged in a row 1 and column 2. The electronic device may open a GUI of the browser application by using the method in the foregoing embodiments. After receiving user input and exiting the related. GUI of the browser application, the electronic device may display, on the touchscreen, a GUI shown in FIG. 6E. In the GUI, the browser icon 604 is arranged in an original position of the music icon, the music icon 609 originally displayed in the position is arranged in an original position of the browser icon 604, and positions of all other app icons may be the same as those in FIG. 6B. In other embodiments of this application, a phone icon that is originally in a same row as the browser icon may be displayed along with the browser icon in a position of a WeChat icon shown in FIG. 6E, and the WeChat icon may be displayed in a same row as the music icon. In this way, an app that a user needs to operate in a one-hand mode is placed in a proper position (for example, a comfortable operation area) without disrupting an original app icon layout. This further improves processing efficiency of an electronic device and further improves user experience.

In other embodiments of this application, after the user completes a related operation on the target app in a one-hand mode, the electronic device may collect statistics on a quantity of times or a frequency (for example, a quantity of times of opening an app in a day or a quantity of hours for using an app in a day) of using different apps by the user, and then the electronic device may re-arrange an app icon in the home screen based on the quantity of times or the frequency of using the apps that is obtained through statistics collection. For example, the electronic device may display several apps with high use frequency in the comfortable operation area, so that when performing a one-hand operation on the electronic device next time, the user operates an app in the comfortable operation area without performing a half-screen switch. This reduces a user learning difficulty and improves user experience.

In other embodiments of this application, after the user selects an icon of a target app in an area in a one-hand mode, a preview screen of the app may be displayed in another area on the touchscreen (or another display area on the touchscreen), to be specific, information related to the app is displayed. The related information may specifically include at least one of the following: a shortcut menu of the app, an attribute of the app (for example, an app type, an app capacity, and usage statistics), a file (for example, an image or a video) in the app, an unread message of the app, or other information related to the app. In other embodiments of this application, the GUI may alternatively be a main screen of the app.

For example, after the electronic device displays the GUI shown in FIG. 6C on the touchscreen by using the technical solutions of the foregoing embodiments, the electronic device may detect a touch event of the finger 601 (for example, a thumb) of the user on the touchscreen. In response to the touch event, the electronic device may display a GUI shown in FIG. 6F. Specifically, in the GUI, in response to the touch event of the user on a target app (the browser application), related information of the browser application may be displayed in an area 2a, and an app icon originally displayed in the area 2a is no longer displayed or is displayed after Gaussian blur processing. The related information in the area 2a may include a type and a capacity of the browser app, a file stored in the app, and the like. Some frequently-used shortcut menus may be further displayed, for example, a control element 610 indicates that the user may tap the icon to open a previously closed page, and a control element 611 indicates that the user may tap the icon for quick Google search. The area 2a may further include a control element 614 indicating whether the app is allowed to use a cellular network, a control element 615 indicating whether notifications are allowed, and the like. In other embodiments of this application, the GUI displayed in the area 2a may alternatively be a main screen of the app, so that the user quickly previews a specific control element of the app.

Figure 6F:
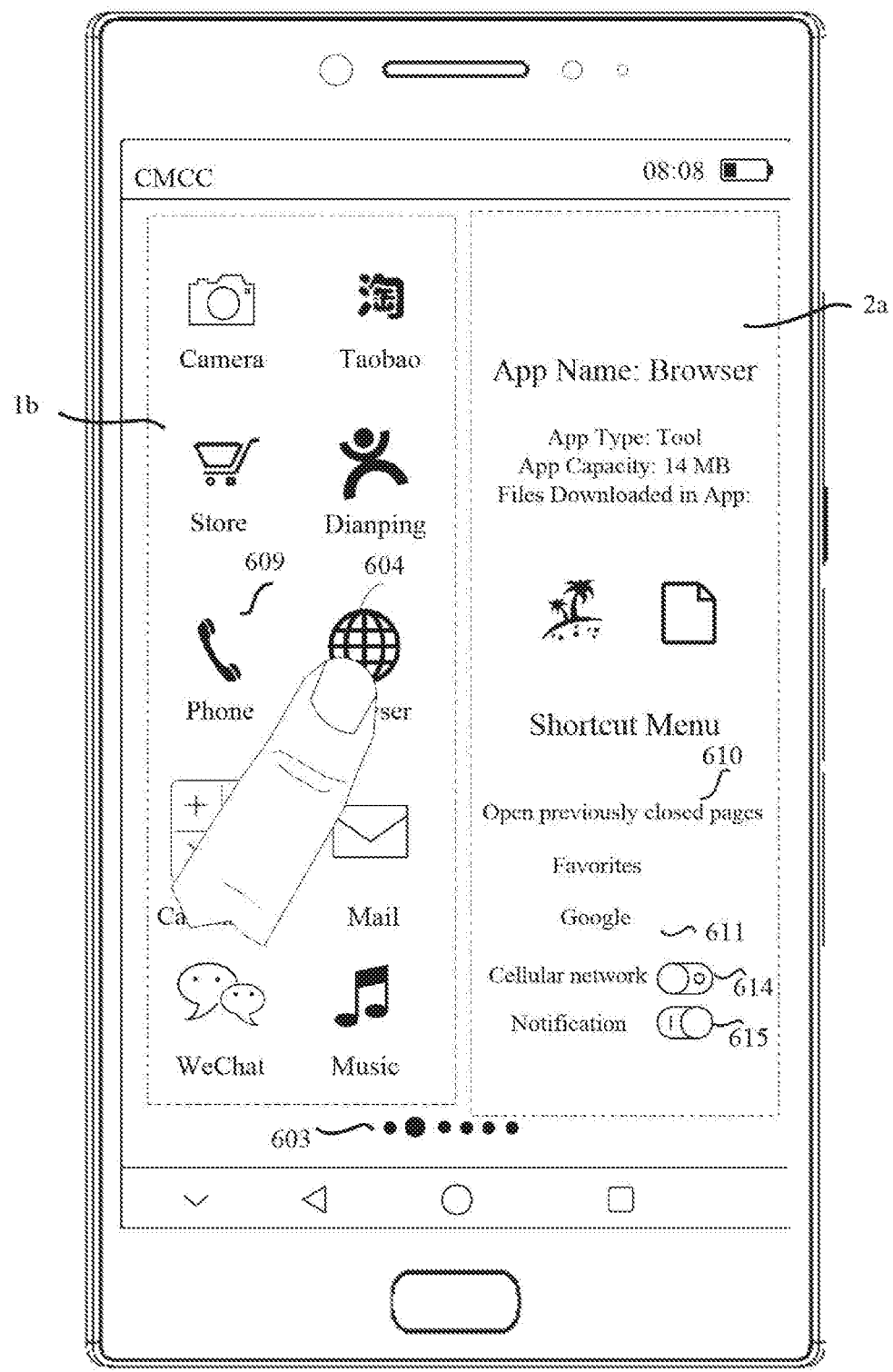

In other embodiments of this application, after the GUI shown in FIG. 6F is displayed, if it is detected that a finger of the user performs touch and hold for a time longer than a predetermined time or performs heavy press until a pressure value exceeds another predetermined pressure threshold, the app is opened and a main screen of the app in FIG. 6D is displayed in an entire display area on the touchscreen.

Figure 6G:
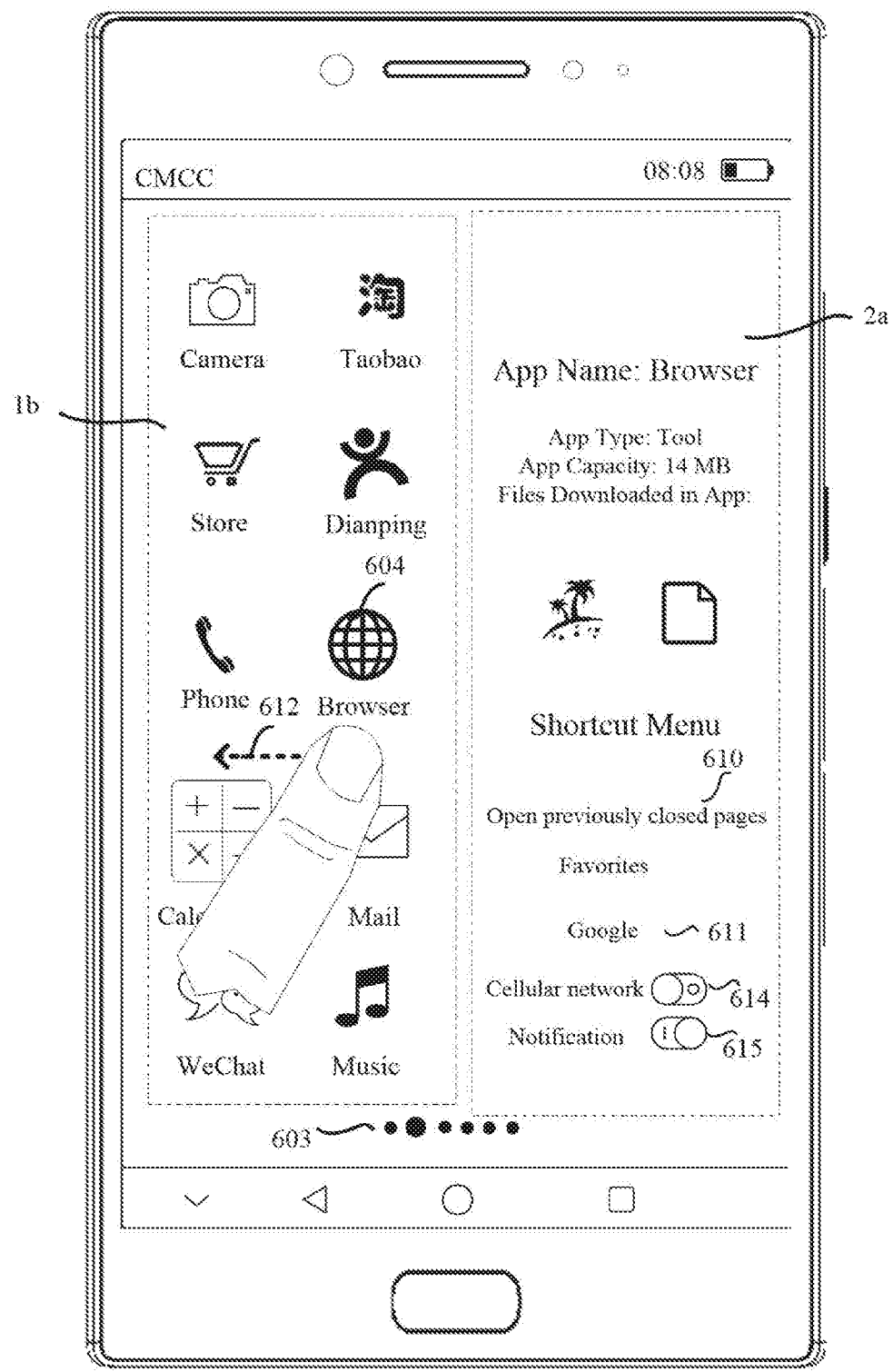
Figure 6H:
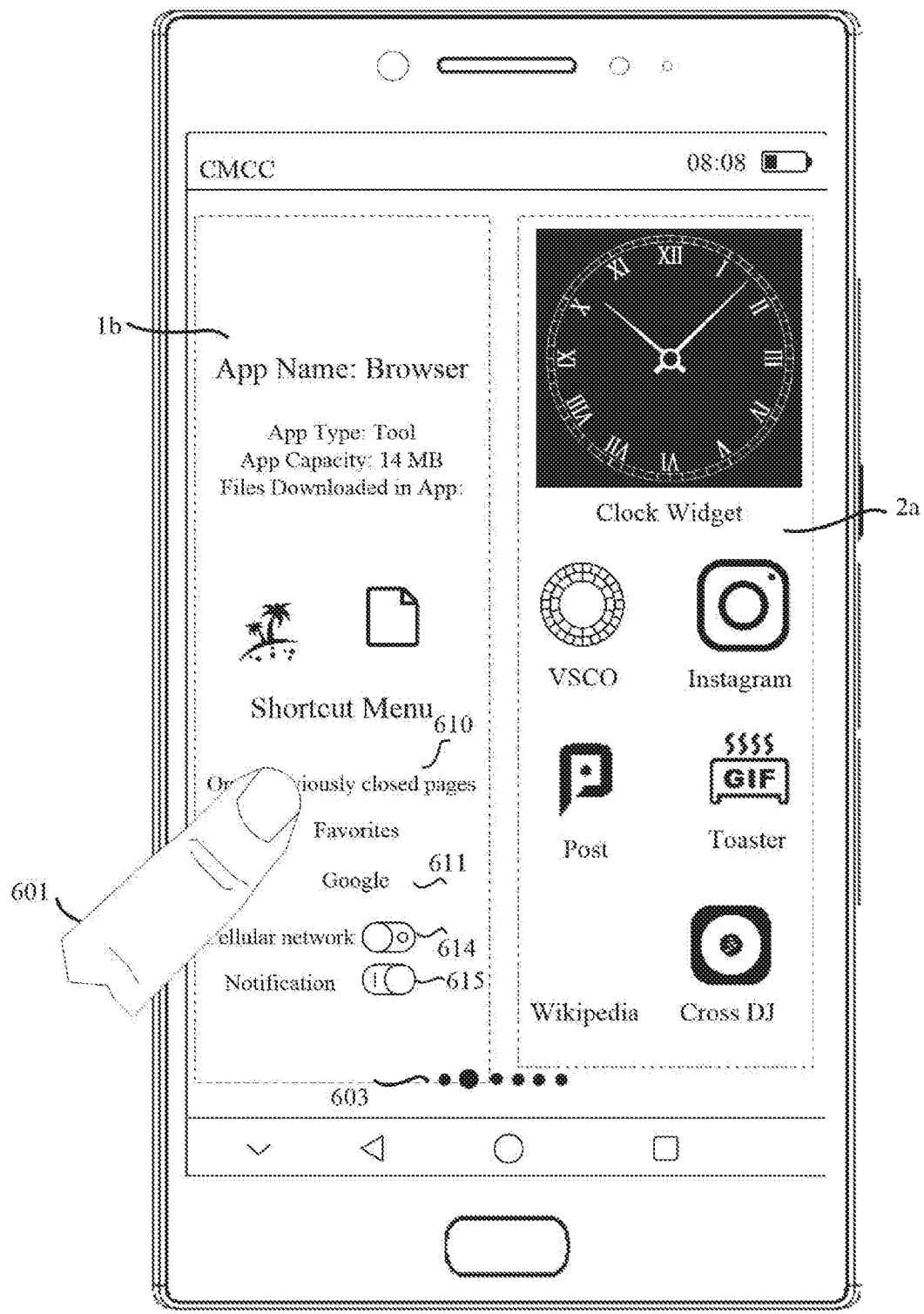

In other embodiments of this application, after the GUI in FIG. 6F is displayed on the touchscreen, as shown in FIG. 6G, when the electronic device detects a leftward-slide gesture 612 of the user in the area 1b on the touchscreen, in response to the gesture 612, the electronic device may display, in the area 1b, information that is related to the browser application and that is displayed in the area 2a, as shown in FIG. 6H. In addition, an app icon originally displayed in the area 2a is displayed again. Because the user holds the electronic device by using the left hand, the user easily performs some simple operations on a specific control element of a target app when performing a one-hand operation. For example, the finger 601 of the user may tap the control element 610 or the control element 611 to perform some operations on the browser application without entering a main screen of the browser application. This improves an interaction capability of an electronic device and improves user experience.

It may be understood that the touch event may be a gesture that a finger of the user taps the touchscreen and quickly leaves the touchscreen, or the touch event may be a gesture that a finger of the user taps and holds the touchscreen within a predetermined time; or the touch event may be heavily pressing the touchscreen by a finger of the user until a predetermined pressure threshold is exceeded. It may be understood that the touch event in this embodiment of this application includes but is not limited to the foregoing gesture examples.

It may be understood that in the foregoing embodiments of this application, the gesture 602 and the gesture 612 may alternatively be different types of slide gestures. For example, the gesture 602 may be a gesture that a finger of the user taps the touchscreen, quickly moves, and then leaves the touchscreen, and the gesture 612 may be a gesture that a finger of the user heavily presses the touchscreen, slowly moves, and then leaves the touchscreen. Alternatively, the gesture 602 may be a gesture that a finger of the user taps the touchscreen and moves for a distance on the touchscreen, where the distance is greater than a preset threshold, and the gesture 612 may be a gesture that a finger of the user taps the touchscreen and moves for a distance on the touchscreen, where the distance is less than the threshold.

Figure 6I:
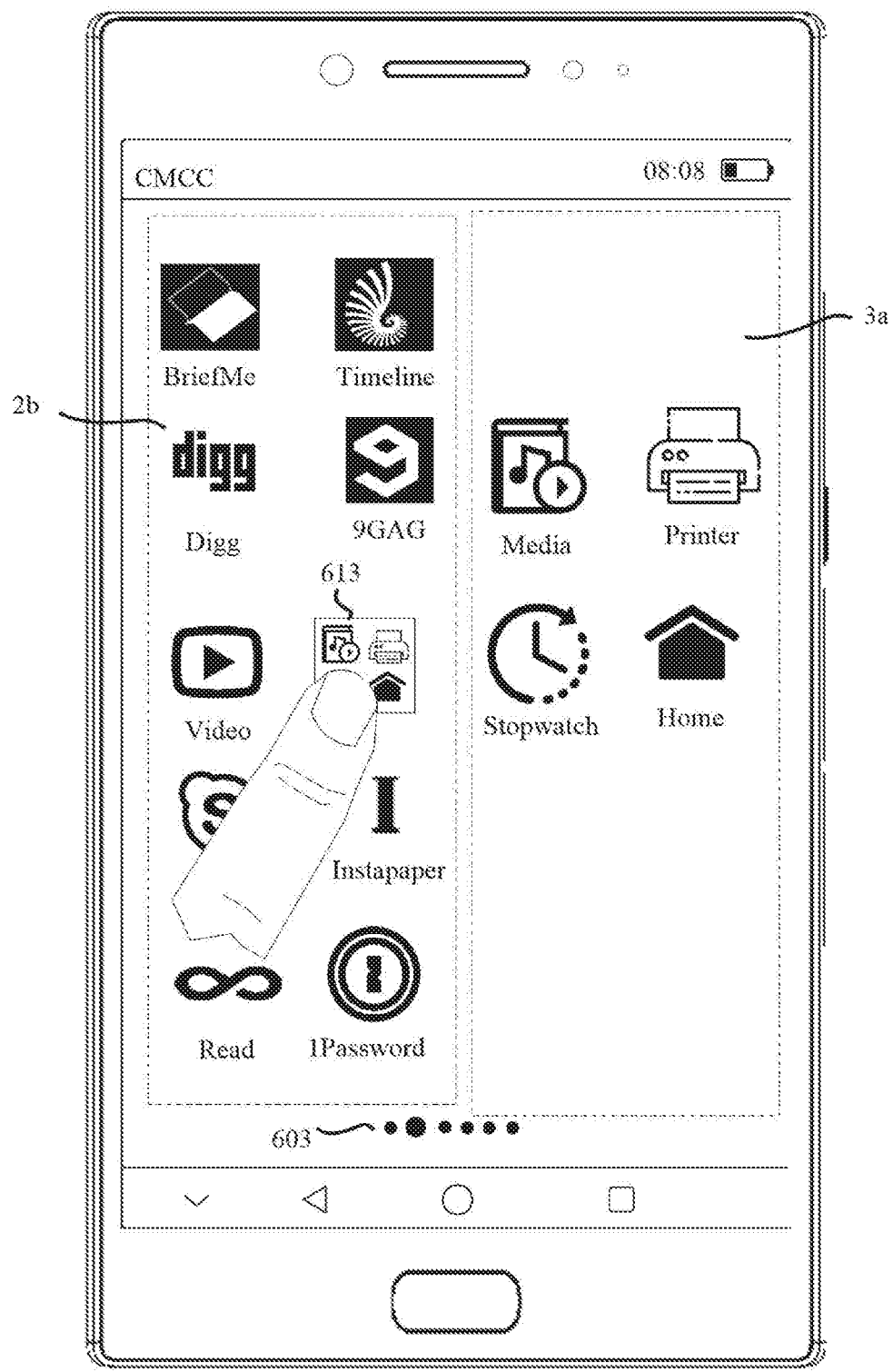

In some embodiments of this application, when the target app is in a folder, a one-hand operation may also be performed according to the foregoing embodiments. As shown in FIG. 6I, according to the technical solutions in the foregoing embodiments, the electronic device displays, in a position in FIG. 6I, a folder 613 on an upper right corner in FIG. 5B, and an app icon layout in an area 2b is changed. The electronic device detects a touch of the user on the touchscreen. In response to the touch, the electronic device may display app icons in the folder 613 in an area 3a. In addition, the user may perform a leftward-slide gesture in the area 2b, and the app icons in the area 3a may be displayed in the area 2b, so that a user can operate an app in a folder during one-hand holding, thereby improving user experience.

Figure 13A:
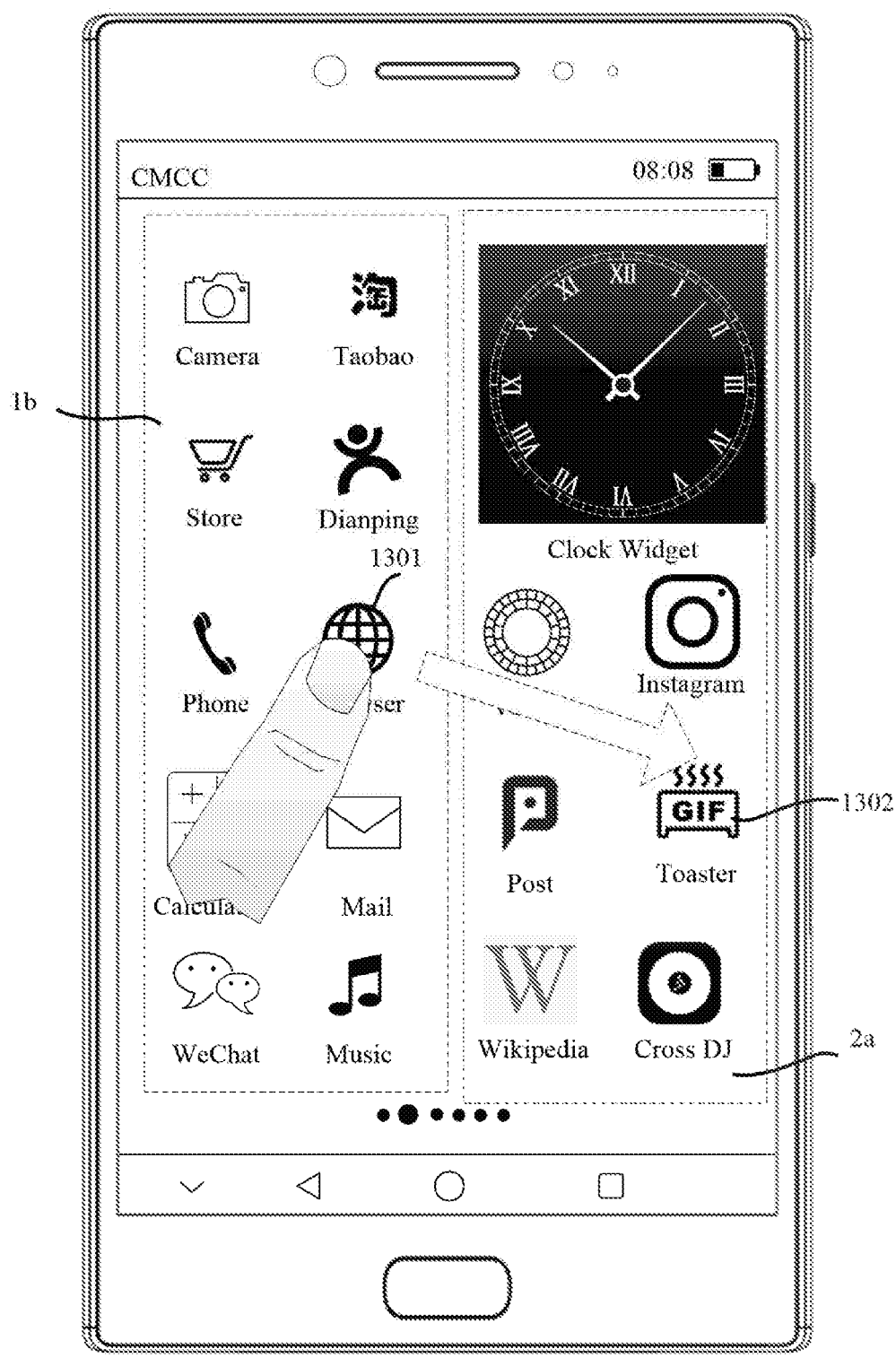
FIG. 13A to FIG. 13E are schematic diagrams of some graphical user interfaces displayed on an electronic device according to some embodiments.
Figure 13B:
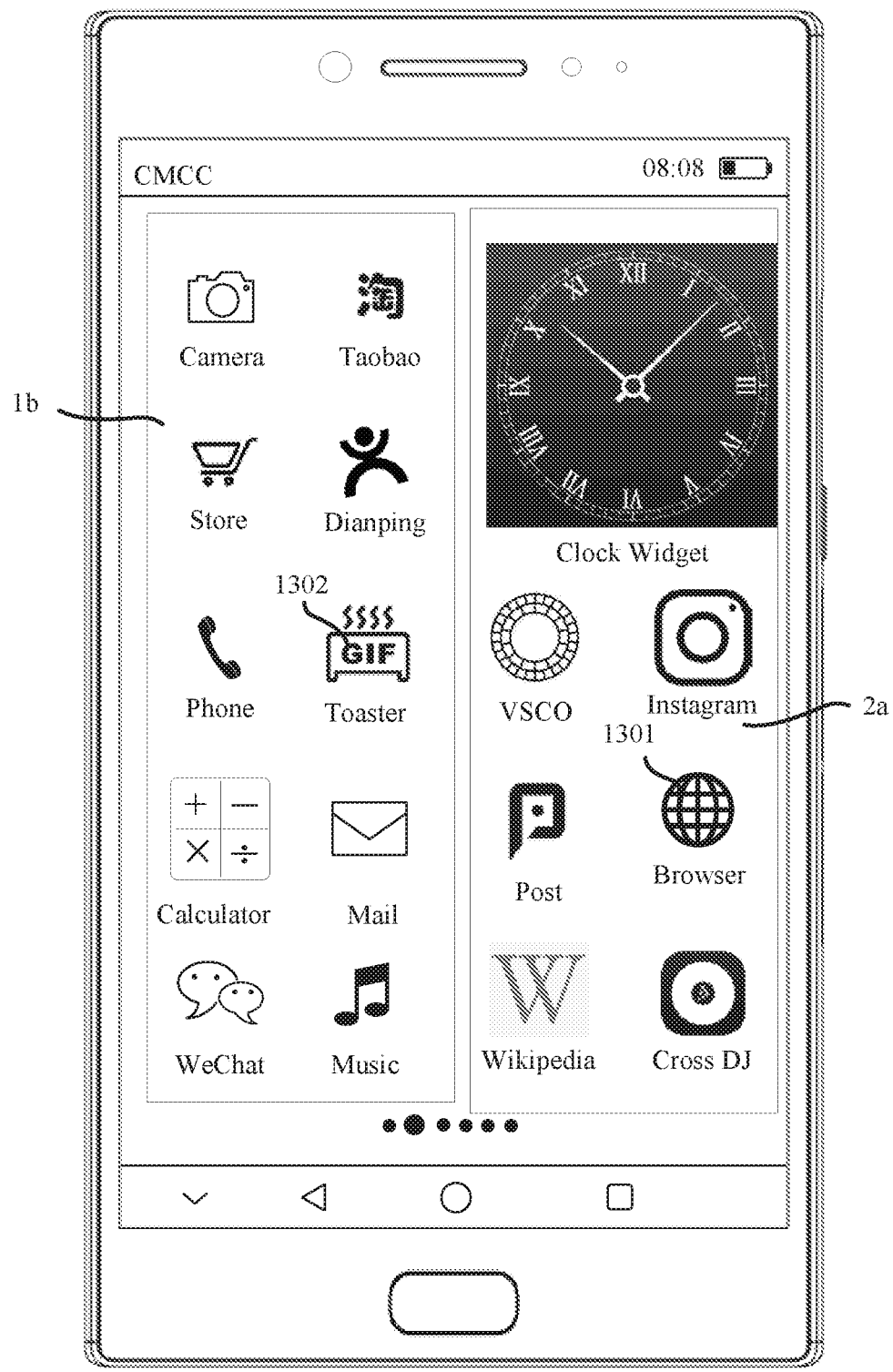

In other embodiments of this application, a user may re-arrange a control element in a home screen. For example, an app icon in a subscreen is arranged and adjusted so that an app icon desired by the user is placed in an area desired by the user, for example, a comfortable operation area. For example, as shown in FIG. 13A, an electronic device detects a slide gesture of a user on a touchscreen. In response to the slide gesture, a browser icon 1301 in an area 1b of a first subscreen is dragged to a position of a Toaster icon 1302 in an area 2a of a second subscreen, and the Toaster icon 1302 is displayed in an original display position of the browser icon, as shown in FIG. 13B. In this way, a control element can be quickly moved, a control element layout in a subscreen can be quickly adjusted, and a user can process an icon flexibly.

Figure 13C:
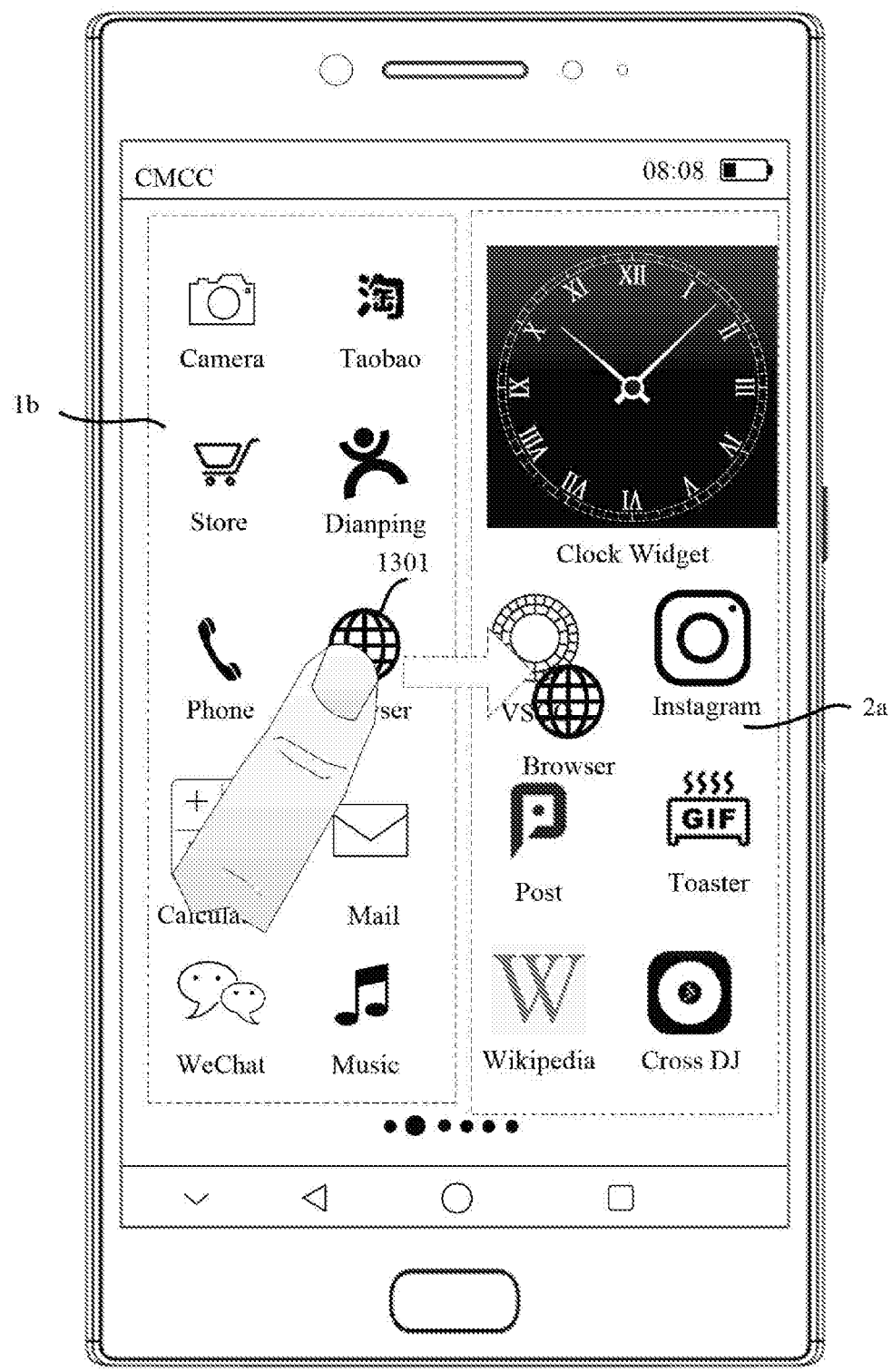
Figure 13D:
Figure 13E:

In other embodiments of this application, during placement of an app icon, if there is no enough space in an area or the user does not want to place an app icon in an area, the electronic device may display a next area. For example, as shown in FIG. 13C, the user wants to move the browser icon in the area 1b of the first subscreen, the user may tap and hold the browser icon, and then perform a rightward-slide gesture to move the browser icon to the area 2a of the second subscreen. After holding the icon for a predetermined time, the area 2a is moved out of the touchscreen and is no longer displayed, an area 2b of the second subscreen is displayed, and the area 1b of the first subscreen is still displayed in an original position. In other embodiments of this application, when moving the browser icon, the user may move the browser icon to an intersection of the area 1b and the area 2a and stay for a period of time. Then, the area 2a is moved out of the touchscreen and is no longer displayed, the area 2b of the second subscreen is displayed, and the area 1b of the first subscreen is still displayed in the original position, as shown in FIG. 13D. After a finger of the user is lifted (in other words, leaves the touchscreen), the browser icon 1301 is placed in a position shown in FIG. 13E. The position is an original display position of an Instapater icon 1303 in the area 2b of the second subscreen, and the Instapater icon 1303 is placed in the original display position of the browser icon 1301.

In other embodiments of this application, when the user holds the electronic device by using a right hand, a technical solution similar to that in the foregoing embodiments may alternatively be used to achieve an effect of performing a one-hand operation by a user.

Figure 8:
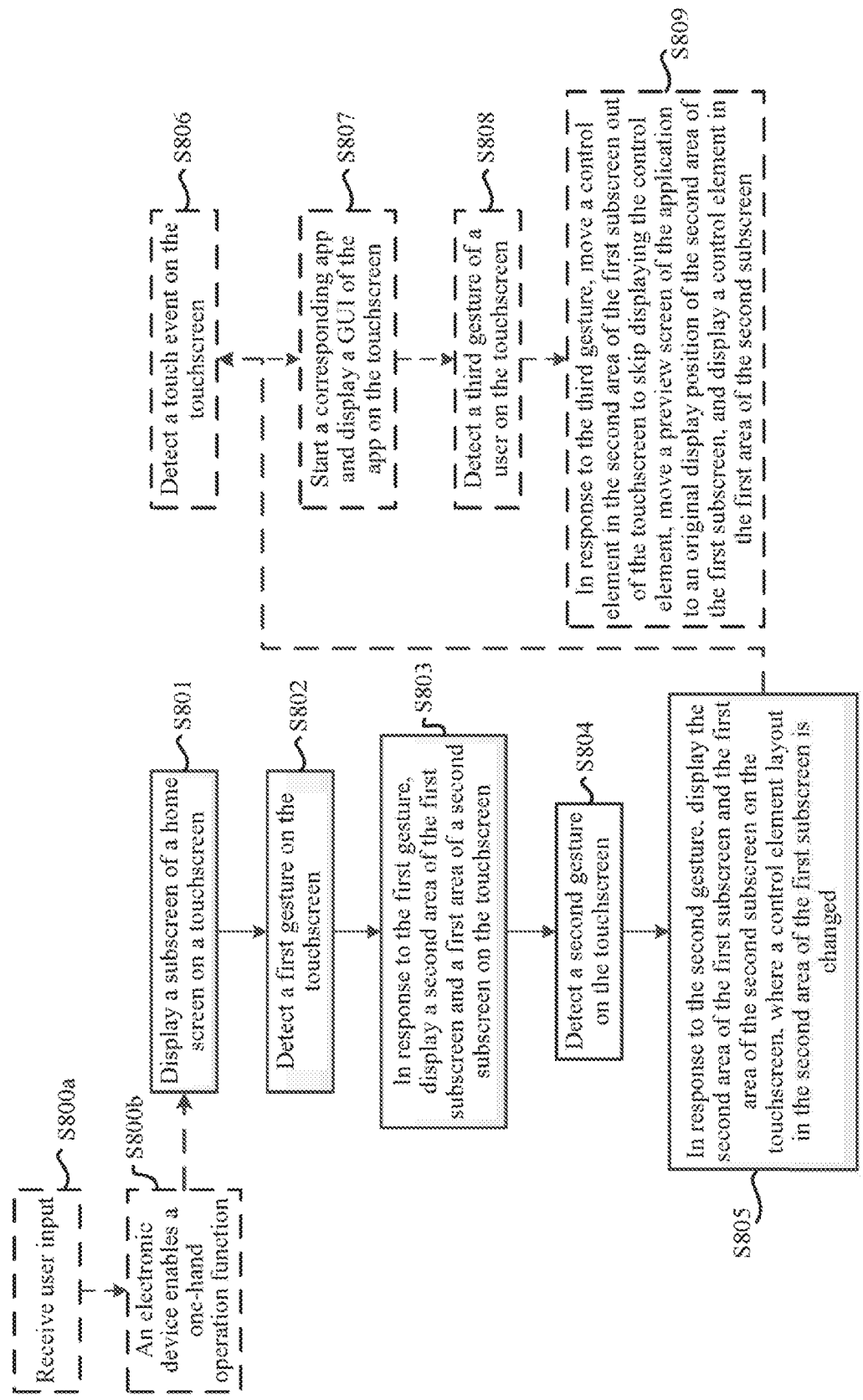
FIG. 8 is a schematic flowchart of a method according to some embodiments of this application.

With reference to the foregoing embodiments and the accompanying drawings thereof, an embodiment of this application provides a graphical user interface display method. The method may be implemented on an electronic device 100 with a touchscreen, a memory, and a processor. As shown in FIG. 8, the method may include the following steps.

S801. Display a first subscreen of a home screen (Home screen) on the touchscreen of the electronic device. The home screen may include at least two subscreens, a size of each subscreen may be the same as a size of a display area (a display screen) of the touchscreen, and the two subscreens may be named first subscreen and second subscreen. For example, as shown in FIG. A2 and FIG. 2B, the home screen may include two subscreens, and each subscreen includes different control elements (for example, an app icon, a folder, and a widget). Generally, only one subscreen can be displayed on the touchscreen at a time. In another case, for example, when the subscreens are edited (for example, a subscreen is deleted or set as a home page, or a widget is added to a subscreen), a plurality of subscreens may be all zoomed out in a same proportion and displayed simultaneously, so that a user edits the subscreens. The first subscreen may include a first area and a second area and the second subscreen may also include a first area and a second area. The second area of the first subscreen may have a same size as the first area of the second subscreen, and in addition, the first area of the first subscreen may also have the same size as the first area of the second subscreen. In other embodiments of this application, to ensure that a user quickly identifies various different subscreens or different areas thereof, different colors or different wallpapers may be used to distinguish between backgrounds of the subscreens, or different colors or different wallpapers may alternatively be used to distinguish between backgrounds of different areas of the subscreens. For example, the second area of the first subscreen has a green background, the first area of the second subscreen has a blue background, and the second area of the second subscreen has a yellow background. Alternatively, a wallpaper of the first subscreen is a picture 1, and a wallpaper of the second subscreen is a picture 2. Alternatively, the first subscreen has a blue background, and the second subscreen has a green background.

S802. The electronic device detects a first gesture of a user on the touchscreen.

S803. In response to the first gesture, display a second area of the first subscreen and a first area of a second subscreen on the touchscreen. For example, as shown in FIG. 6A and FIG. 6B, the first subscreen includes an area 1a and an area 1b, and each area includes two columns of app icons. When a user wants to open a browser on the first subscreen, the electronic device detects a leftward-slide gesture 602 in the area 1a of the first subscreen on the touchscreen when the user holds the electronic device by using a left hand; and in response to the gesture 602, the electronic device displays a GUI shown in FIG. 6B. The GUI includes the second area (the area 1b) of the first subscreen and the first area (an area 2a) of the second subscreen. To be specific, the first area of the first subscreen is no longer displayed, the second area of the first subscreen is moved to an original display position of the first area, and the first area of the second subscreen is displayed in an original position of the second area of the first subscreen. In this case, a browser icon 604 is moved from a position of the browser icon 604 in FIG. 6A to a position of the browser icon 604 in FIG. 6B.

S804. The electronic device detects a second gesture of the user on the touchscreen.

S805. In response to the second gesture, display the second area of the first subscreen and the first area of the second subscreen on the touchscreen, where compared with the second area of the first subscreen in step S803, in this step, a control element (for example, an app icon, a widget, and a folder) layout in the second area of the first subscreen is changed, and an app icon layout in the first area of the second subscreen may remain unchanged, or may alternatively be changed along with the second gesture.

For example, as shown in FIG. 6B and FIG. 6C, the electronic device detects a downward-slide gesture 605 in the second area on the touchscreen; and in response to the gesture 605, an app icon in the area 1b is scrolled/slid downwards correspondingly, and in addition, the area 2a of the second subscreen may remain unchanged. The downward scroll/slide in the area 1b may be specifically: scrolling/sliding downwards at a granularity of each row of app icons in the area, or correspondingly scrolling each row of app icons in the area 1b at a speed corresponding to a speed of the gesture 605; and cyclically scrolling the app icons in the area 1b upwards or downwards. After the electronic device detects that the gesture 605 stops or the electronic device receives a user instruction for stopping scrolling/sliding, the electronic device displays a GUI shown in FIG. 6C. In the GUI, a browser icon 604 is scrolled to a row 3 and a column 2 in the area 1b, and the position is in a comfortable operation area for a one-hand operation of the user. When the user holds the electronic device by using one hand, an app, a widget, or a folder slid/scrolled to the comfortable operation area may be operated very conveniently. This improves processing efficiency of an electronic device, and further improves user experience.

In other embodiments of this application, the method may further include the following steps.

S806. The electronic device detects a touch event of the user on the touchscreen.

S807. In response to the touch event, the electronic device starts a corresponding app and displays a GUI of the app on the touchscreen.

Still using the technical solutions in FIG. 6A to FIG. 6D and in the foregoing embodiments as an example, when a user holds the electronic device by using one hand, a thumb may be used to tap a browser icon on the touchscreen that is scrolled to a comfortable operation area, as shown in FIG. 6C. In response to the touch event, the electronic device may start a browser application and display a GUI 606 related to the browser application on the touchscreen. As shown in FIG. 6D, the GUI is displayed in a full-screen mode. The method further improves processing efficiency of an electronic device and further improves user experience. The touch event may be a gesture that a finger of the user taps the touchscreen and quickly leaves the touchscreen, or may be a gesture that a finger of the user taps and holds the touchscreen within a predetermined time. The touch event in this embodiment of this application includes but is not limited to the foregoing examples.

In other embodiments of this application, further, that the electronic device displays a GUI of the app on the touchscreen may be specifically: displaying the GUI of the app in the first area of the second subscreen, and skipping displaying an app icon, a control element, and the like that are originally displayed in the first area or performing displaying after Gaussian blur processing. For example, as shown in FIG. 6F, after a user taps a browser icon 604, a related GUI (which may be referred to as a preview screen) of the app is displayed in the area 2*a*, where the GUI may include information related to the app such as an attribute and a shortcut menu of the app. In other embodiments of this application, the GUI may alternatively be a main screen of the app. Therefore, step S807 may specifically include the following steps:

S807*a*. In response to the touch event, display the GUI of the app in the first area of the second subscreen.

S807*b*. Receive a user input.

S807*c*. In response to the input, display the GUI or a main screen of the app on the touchscreen in a full-screen mode.

According to step S807*a*, the related GUI of the app may be first displayed in the first area, so that a user can preview the GUI. For example, when a user wants to continue to operate (for example, browse) the app, for example, if the user heavily presses the app icon with a pressure value exceeding a predetermined threshold, in response to the operation, the electronic device can display the GUI on the touchscreen in a full-screen mode or displays the main screen of the app on the touchscreen.

In other embodiments of this application, after step S807, the method may further include the following steps:

S808. The electronic device detects a third gesture of the user on the touchscreen.

S809. In response to the third gesture, move a control element in the second area of the first subscreen out of the touchscreen to skip displaying the control element, move a preview screen of the application to an original display position of the second area of the first subscreen, and display a control element in the first area of the second subscreen. For example, FIG. 6G and FIG. 6H are used for description, a preview screen of a browser is displayed in an area 2*a* of the second subscreen. The electronic device detects a leftward-slide gesture 612 (the third gesture) of a user in the area 1*b* of the first subscreen. In response to the gesture 612, as shown in FIG. 6H, the preview screen of the browser is moved to the area 1*b* for display, a control element originally displayed in the area 1*b* is moved out and not displayed, and a control element in the area 2*a* of the second subscreen is re-displayed. This is more beneficial to an operation performed by the user on the preview screen, and in particular, on a shortcut menu on the preview screen, thereby improving user experience.

In other embodiments of this application, before step S801 or after step S801 and before step S802, the method may further include the following steps.

S800*a*. Receive user input.

S800*b*. In response to the input, the electronic device enables a one-hand operation function.

Figure 7A:
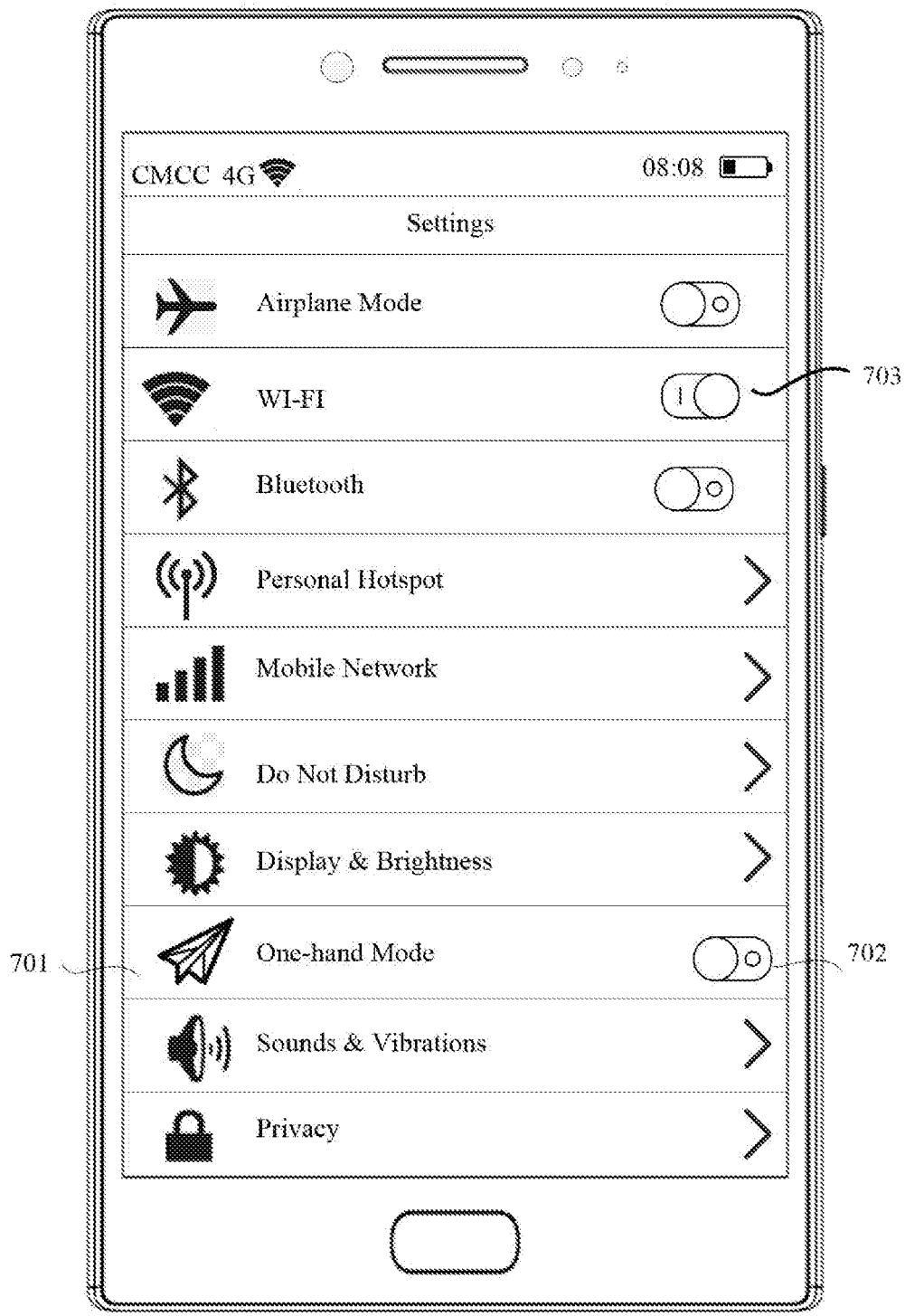
FIG. 7A and FIG. 7B are schematic diagrams of some graphical user interfaces displayed on an electronic device according to some other embodiments of this application.

The user input may be specifically that a user taps a virtual button in a settings menu, for example, a settings menu in FIG. 7A; may be that a finger of a user touches and holds a blank on the home screen or touches and holds an icon for a time longer than a predetermined time; may be a gesture of drawing a predetermined track in any position on the touchscreen; or may be another case. The electronic device may enable the one-hand operation function based on the input.

Figure 10A:
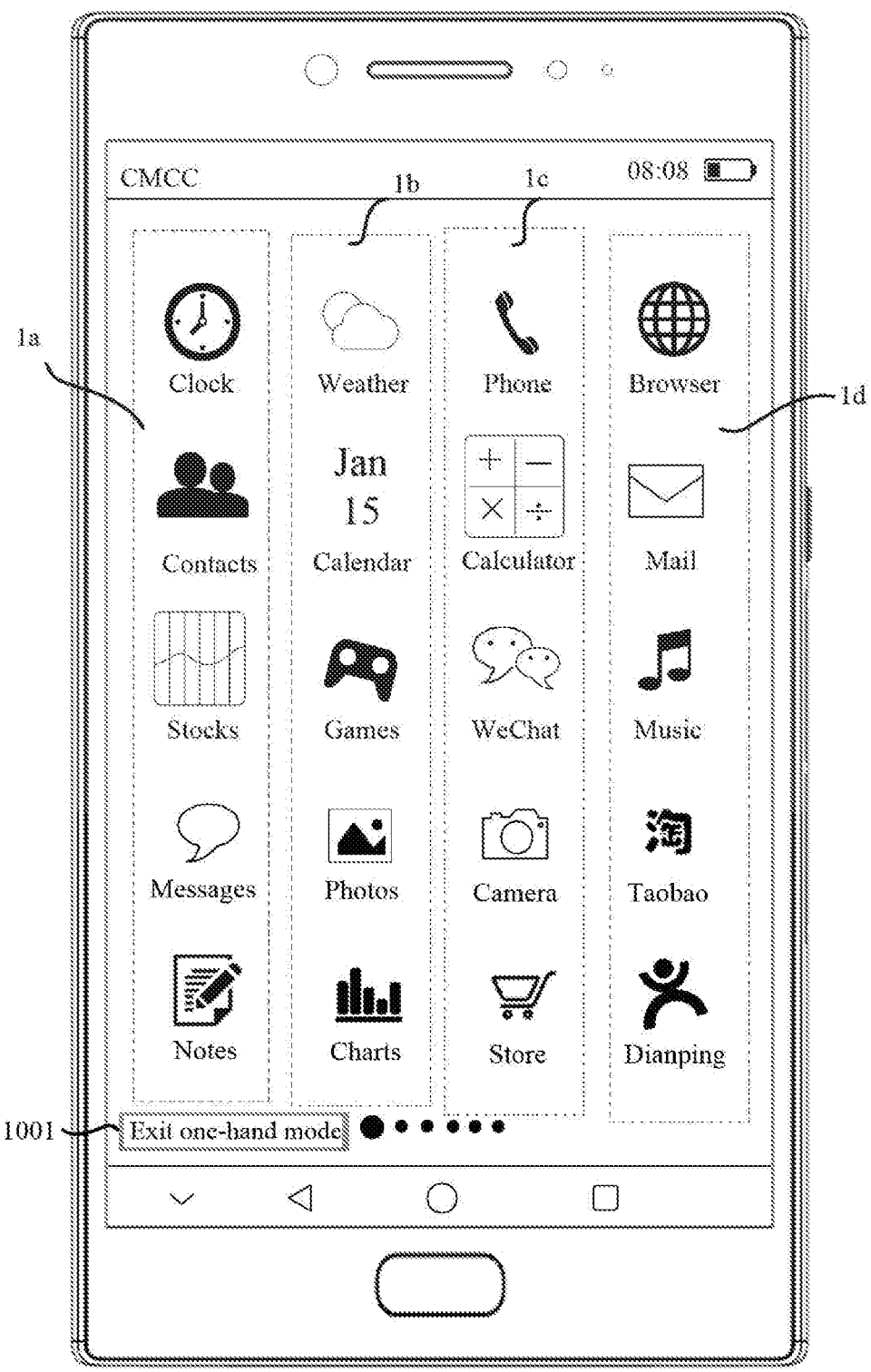
FIG. 10A and FIG. 10B are schematic diagrams of some graphical user interfaces displayed on an electronic device according to some other embodiments.
Figure 10B:
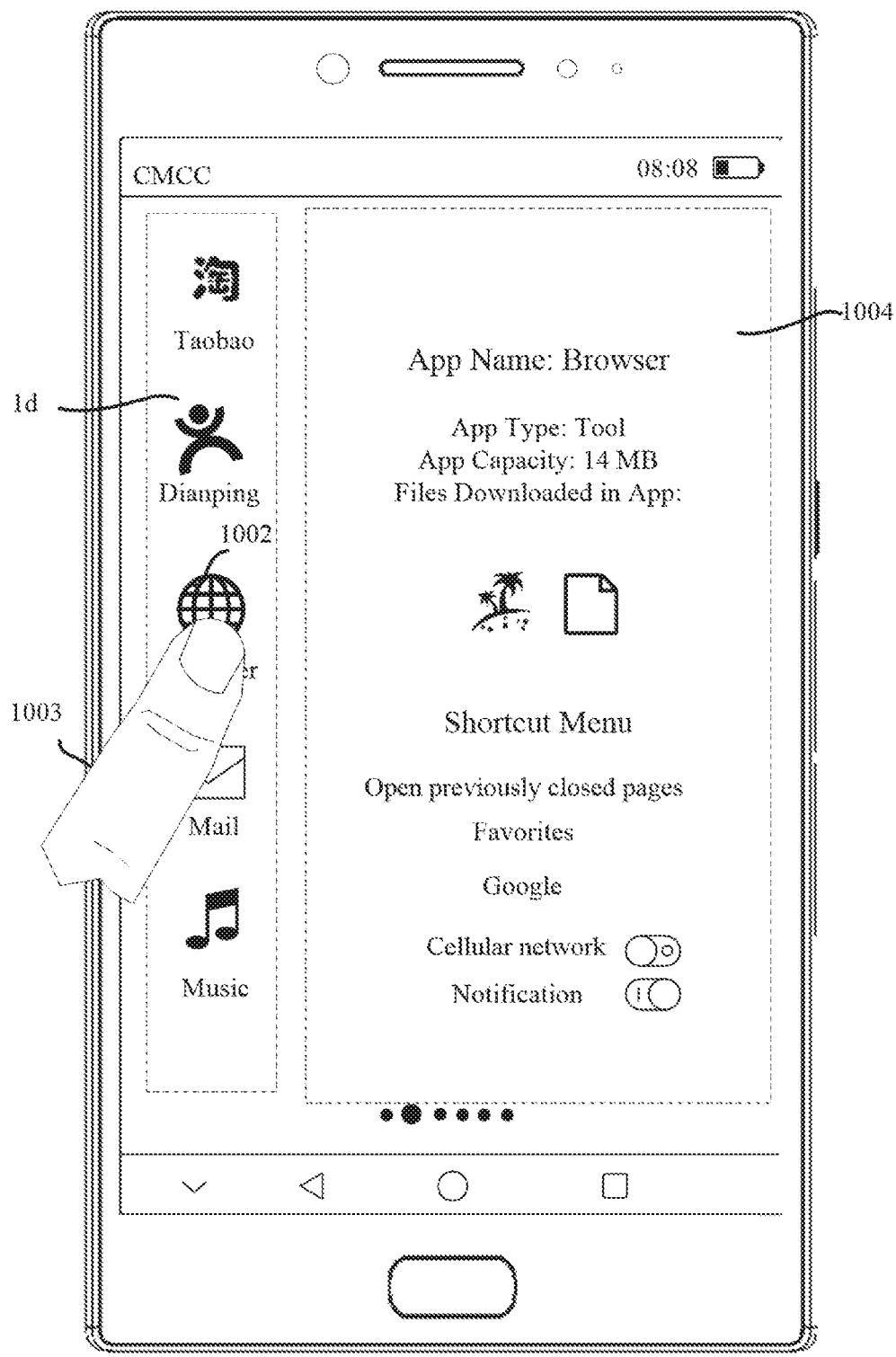

The foregoing embodiment provides descriptions by using an example of a half-screen switch. In other embodiments of this application, the electronic device may alternatively divide the first subscreen, the second subscreen, and the third subscreen based on a quantity of columns of icons displayed on the touchscreen. For example, in FIG. 2A to FIG. 2C, icons on a subscreen are displayed in four columns. In this case, after the one-hand mode is enabled, the electronic device may divide each subscreen into four areas. As shown in FIG. 10A, a first subscreen includes a first area 1*a*, a second area 1*b*, a third area 1*c*, and a fourth area 1*d*. A user may perform an upward-slide gesture or a downward-slide gesture in the area. In response to the gesture, icons in corresponding areas are slid or scrolled upwards/downwards correspondingly for display. It may be understood that for this embodiment, refer to the method in the foregoing embodiments, so that a user can find a target app and perform a one-hand operation on the app. In other embodiments of this application, after the user finds the target app, the electronic device detects a touch event (for example, tap) of the user in a position corresponding to the target app, related information of the target app may be displayed in another area on the touchscreen. The related information may specifically include at least one of the following: a shortcut menu of the app, an attribute of the app (for example, an app type, an app capacity, and usage statistics), a file (for example, an image or a video) in the app, an unread message of the app, or other information related to the app, as shown in FIG. 10B. Three areas: a first area 2*a*, a second area 2*b*, and a third area 2*c* of a second subscreen are originally displayed in an area 1004. After a thumb 1003 of a user taps a target app (browser) 1002 in the area 1*d*, the three areas of the second subscreen are no longer displayed, but related information of the app is displayed, so that the user performs a preview or an operation.

In other embodiments of this application, icons are usually displayed on a subscreen of the touchscreen in a form of four rows and four columns, or five rows and four columns, or six rows and four columns, or the like. The electronic device may divide the subscreen into a first area and a second area. The first area may include one column of icons, and the second area may include three columns of icons; or the first area may include three columns of icons, and the second area may include one column of icons. In this case, the technical solutions in the foregoing embodiment may also be implemented.

With reference to the foregoing embodiments and the accompanying drawings, an embodiment of this application further provides a graphical user interface. The graphical user interface is stored in an electronic device. The electronic device may include a touchscreen, a memory, and one or more processors. The touchscreen is configured to display the graphical user interface. The memory is configured to store the graphical user interface. The one or more processors are configured to execute one or more computer programs stored in the memory. The graphical user interface may specifically include:

a first GUI displayed on the touchscreen, where the first GUI is specifically a first subscreen of a home screen (Home screen), the home screen includes at least two subscreens, a size of each subscreen may be the same as a size of a display area (a display screen) of the touchscreen, and the two subscreens may be named first subscreen and second subscreen; for example, as shown in FIG. A2 and FIG. 2B, the home screen may include two subscreens, each subscreen includes different control elements (for example, an app icon, a folder, and a widget), and generally, only one subscreen can be displayed on the touchscreen at a time point; in another case, for example, when the subscreens are edited (for example, a subscreen is deleted or set as a home page, or a widget is added to a subscreen), a plurality of subscreens may be all zoomed out a same proportion and displayed simultaneously, so that a user edits the subscreens; and the first subscreen may include a first area and a second area, the second subscreen may also include a first area and a second area, the second area of the first subscreen may have a same size as the first area of the second subscreen, and in addition, the first area of the first subscreen may also have the same size as the first area of the second subscreen;

a detected first gesture corresponding to the first area of the first subscreen;

a second GUI displayed on the touchscreen in response to the first gesture, where the second GUI includes the second area of the first subscreen and the first area of the second subscreen, for example, as shown in FIG. 6A and FIG. 6B and recorded in the foregoing related embodiments;

a detected second gesture corresponding to the second area of the first subscreen; and a third GUI displayed on the touchscreen in response to the second gesture, where the third GUI includes the second area of the first subscreen and the first area of the second subscreen, and a control element (for example, an app icon, a widget, and a control element) layout in the second area of the first subscreen is changed.

In a possible implementation, the graphical user interface may further include: a detected touch event of the user on an application icon in the second area of the first subscreen, an application that is corresponding to the application icon and that is started by the electronic device in response to the touch event, and a graphical user interface, displayed on the touchscreen, of the application. Because the control element layout in the second area of the first subscreen is changed, the user can operate (for example, tap or heavily press) an application icon in this area very conveniently particularly when the user holds the electronic device by using one hand.

The graphical user interface of the application is displayed in the first area of the second subscreen, so that the user can preview a main screen of the application, and then the user determines whether the graphical user interface of the application needs to be displayed in a zoom-in mode or displayed on the entire touchscreen in a full-screen mode.

In another possible implementation, the graphical user interface of the application may be a preview screen of the application, as shown in FIG. 6F. The preview screen may include a shortcut menu of the application, so that the user taps the shortcut menu to quickly perform an operation. For example, the shortcut menu may be a menu indicating whether the application is allowed to use a cellular network, for example, a control element 614 in FIG. 6F.

In another possible implementation, the graphical user interface may further include a detected third gesture of the user on the touchscreen. In response to the third gesture, a control element in the second area of the first subscreen is moved out of the touchscreen to skip displaying the control element, a preview screen of the application is moved to an original display position of the second area of the first subscreen, and a control element in the first area of the second subscreen is displayed. This is more beneficial to an operation performed by the user on the preview screen, and in particular, on a shortcut menu on the preview screen, thereby improving user experience.

Figure 9A:
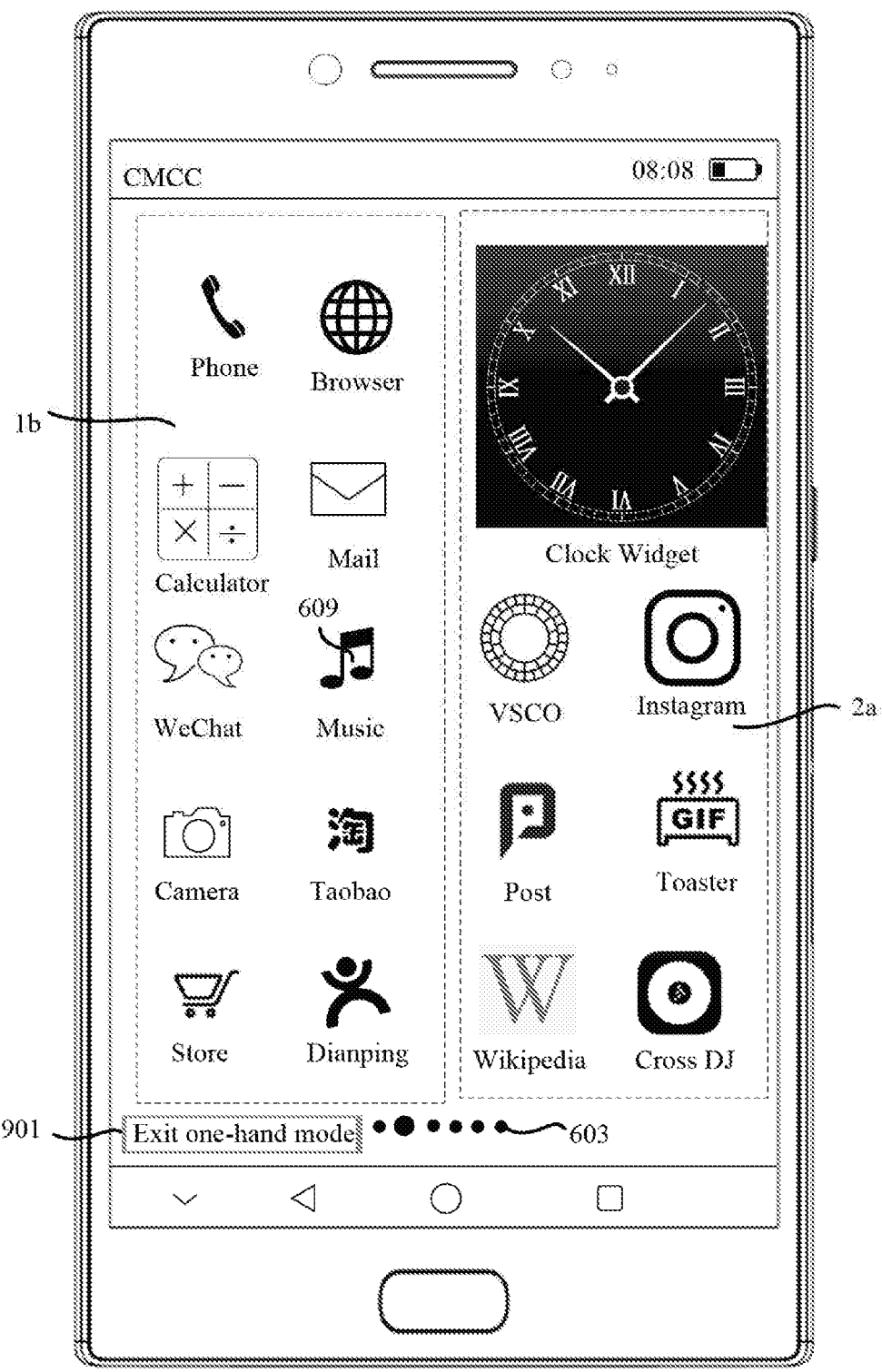
FIG. 9A and FIG. 9B are schematic diagrams of some graphical user interfaces displayed on an electronic device according to some other embodiments of this application.

In another possible implementation, a control element used to exit a one-hand operation function is further displayed on the touchscreen, as shown by a control element 901 in FIG. 9A. In this way, the user can exit the one-hand operation function at any time in an operation process.

The graphical user interface may further include the first GUI displayed on the touchscreen in response to a touch event of the user on the touchscreen after the third GUI is displayed on the touchscreen, where the third GUI is no longer displayed.

Figure 7B:
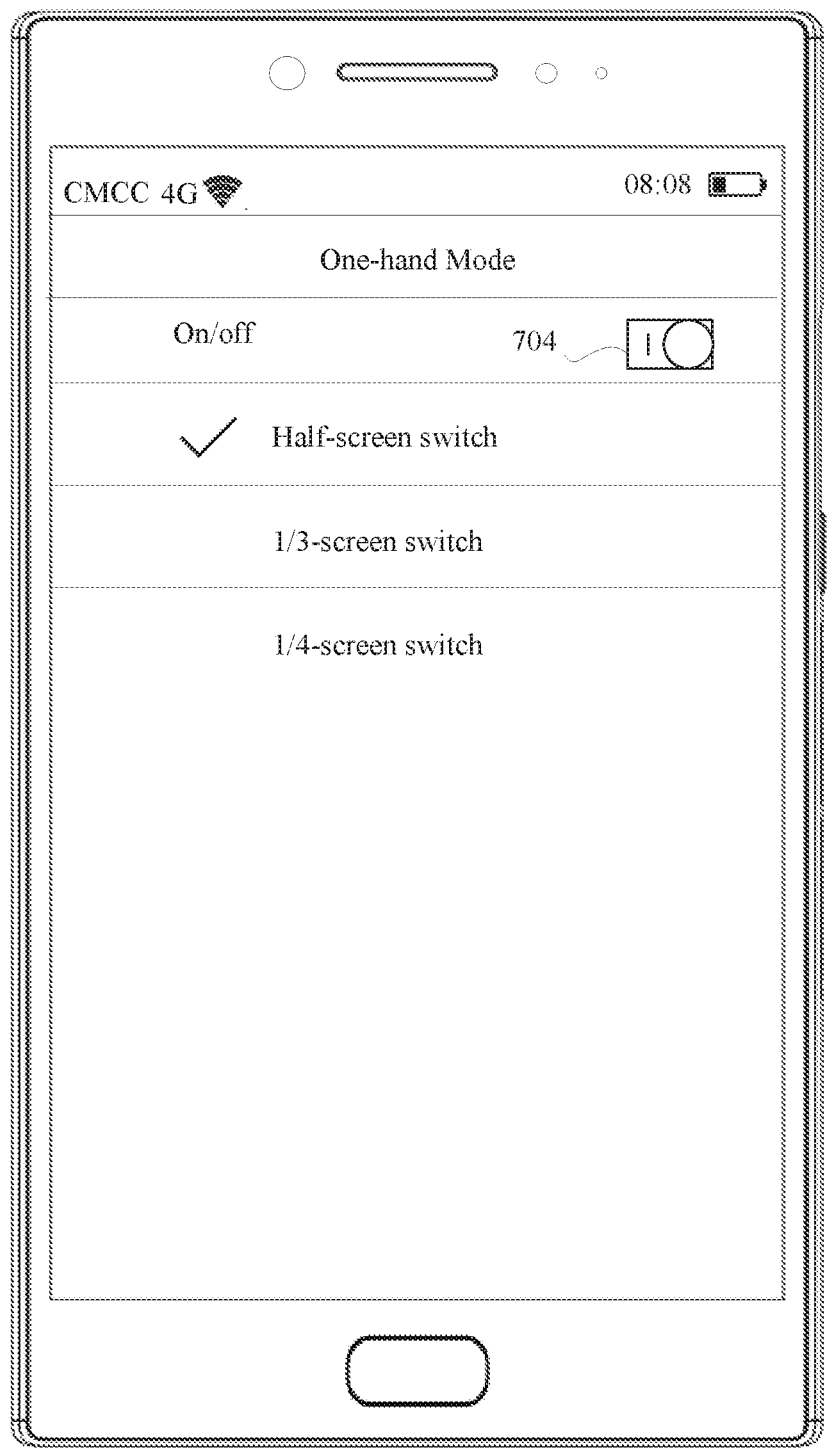

In some embodiments of this application, a user may set a one-hand mode in a settings screen to implement the specific technical solutions of the foregoing embodiments. After enabling the one-hand mode, the user may perform a one-hand operation on the electronic device. For example, the electronic device detects a touch event of the user on a settings app icon in FIG. 2C; and in response to the touch event, the electronic device opens a settings menu GUI, as shown in FIG. 7A. A series of submenus are displayed in the GUI. A virtual button 703 indicates that a function in a Wi-Fi submenu is enabled, a submenu 701 is a one-hand mode, and a virtual button 702 indicates that the one-hand mode is disabled. After the user touches the virtual button 702, in response to the touch, the electronic device enables the one-hand mode. As shown in FIG. 7B, a control element 704 indicates that the one-hand mode is enabled. In addition, the user may select a specific manner in a settings screen to perform a one-hand operation. The self-defining manner makes a one-hand operation more flexible, and also further improves user experience.

In other embodiments of this application, the electronic device may dynamically set, according to operation habits of a user, some setting parameters (for example, a half-screen switch or a ⅓-screen switch) that are in a one-hand mode. For example, the electronic device may perform deep self-learning based on a size of the touchscreen, an icon layout (for example, five rows and four columns) in each subscreen, a touch event of a user, a speed and a direction of a slide gesture, and/or the like, to output some parameters that are suitable for the user in the one-hand mode, for example, a specific manner in which a subscreen is switched each time. In this way, the user does not need to perform manual setting. Therefore, this manner improves an intelligent interaction capability of an electronic device with a user, and also further improves user experience.

In other embodiments of this application, a one-hand mode may be enabled/disabled by using a gesture. For example, the electronic device detects a touch gesture in any position on the touchscreen, and further identifies the gesture to determine whether the gesture is enabling/disabling a one-hand mode. If the gesture is enabling/disabling the one-hand mode, the electronic device enables/disables the one-hand mode. In other embodiments of this application, the one-hand mode may be enabled/disabled by using a physical button of the electronic device. For example, a user can successively press a home button twice within a predetermined time to exit the one-hand mode.

Figure 9B:
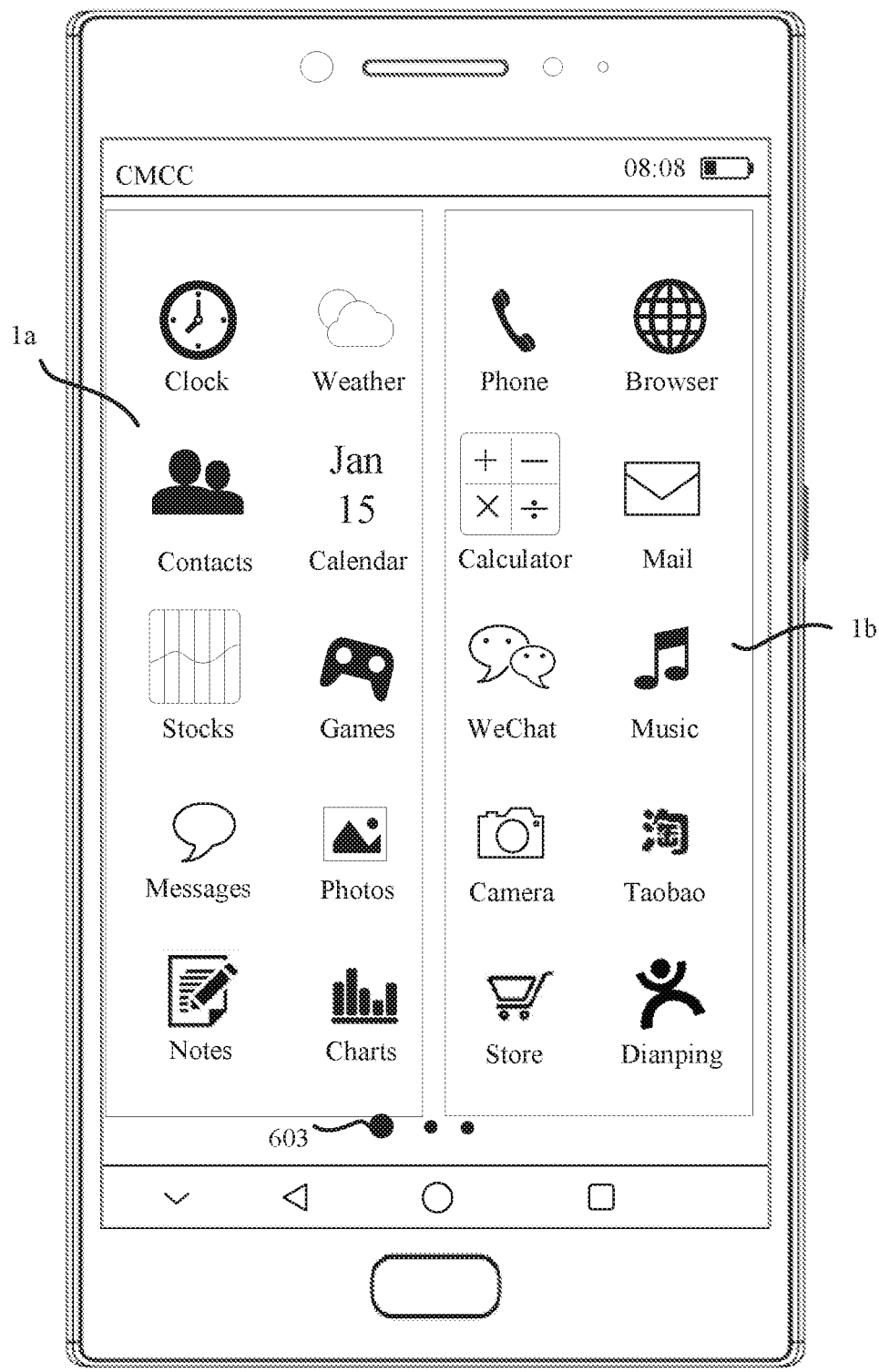

In other embodiments of this application, after the one-hand mode is enabled, in a process of performing a one-hand operation by a user, a control element may be displayed on the touchscreen. The control element may be used to disable/exit the one-hand mode, and a function of the control element is equivalent to disabling the one-hand mode in FIG. 7A. For example, as shown in FIG. 9A, a user enables a one-hand mode, and the user is holding the electronic device by using a left hand. An area 1*b* of a first subscreen and an area 2*a* of a second subscreen are displayed on a touchscreen. Because the current user performs an operation by using the left hand, the control element 901 is displayed on a lower left corner of the touchscreen, so that the user can perform a one-hand operation. The control element 901 indicates that the user can tap the control element to exit the one-hand mode. After the one-hand mode is exited, a home screen displayed on the touchscreen is restored to a normal status, to be specific, subscreens displayed on the touchscreen are the first subscreen (1*a*+1*b*), the second subscreen (2*a*+2*b*), and a third subscreen (3*a*+3*b*), and a subscreen (2*b*+3*a*), a subscreen 3*a*+3*b*), and the like are no longer displayed. As shown in FIG. 9B, after the one-hand mode is exited, one of home screens, to be specific, the first subscreen, is displayed on the touchscreen. In addition, a home screen indicator 603 is changed from six points in FIG. 9A to three points in FIG. 9B. This indicates that in the one-hand mode, six different subscreens: the subscreen (1*a*+1*b*), a subscreen (1*b*+2*a*), the subscreen (2*a*+2*b*), the subscreen (2*b*+3*a*), the subscreen (3*a*+3*b*), and a subscreen (3*b*+1*a*) may be displayed on the touchscreen by using a user gesture, but after the one-hand mode is exited, only three subscreens: the first subscreen (1*a*+1*b*), the second subscreen (2*a*+2*b*), and the third subscreen (3*a*+3*b*) can be displayed. It may be understood that a control element in the home screen remains unchanged regardless of whether the one-hand mode is enabled or exited. In other embodiments of this application, when the user holds the electronic device by using a right hand, the control element 901 may be displayed on a lower right corner of the touchscreen, so that the user can perform a one-hand operation by using the right hand.

Figure 11:
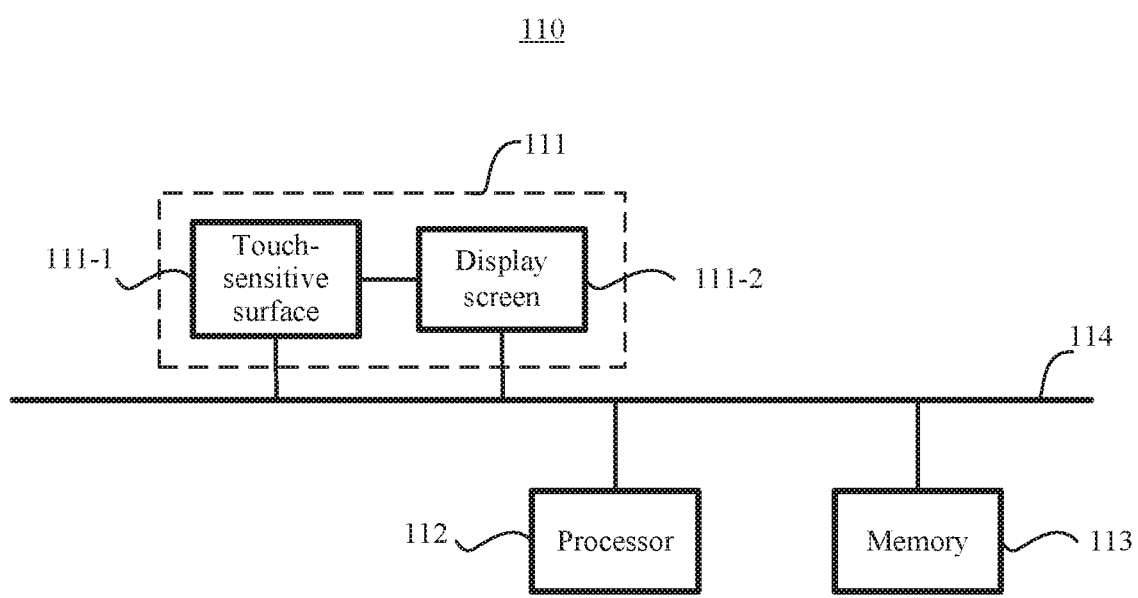
FIG. 11 is a schematic structural diagram of an electronic device according to some embodiments.

As shown in FIG. 11, an embodiment of this application discloses an electronic device 110. The electronic device 110 may include a touchscreen 111, a processor 112, and a memory 113, and further include one or more communications buses 114 connecting the foregoing components. The electronic device 110 in this embodiment of this application may be configured to execute technical solutions of the methods and the accompanying drawings in the foregoing embodiments.

In other embodiments of this application, an electronic device is disclosed. The electronic device may include a touchscreen, one or more processors, a memory, a plurality of applications, and one or more programs. The touchscreen includes a touch-sensitive surface (for example, a touch panel) and a display, the one or more programs are stored in the memory, the one or more programs include an instruction, and when the instruction is executed by the electronic device, the electronic device performs the following steps:

displaying a first subscreen of a home screen on the touchscreen, where the home screen includes at least two subscreens, for example, the first subscreen and a second subscreen, and the first subscreen includes a first area and a second area; detecting a first gesture of a user on the touchscreen; and in response to the first gesture, displaying, on the touchscreen, the second area of the first subscreen and a first area of the second subscreen of the home screen, where the first area of the first subscreen has a same size as the first area of the second subscreen. In the foregoing technical solution, different areas of a subscreen are switched, instead of switching one subscreen in the prior art. In this way, a user operates a control element (for example, an app icon, a widget, or a button) on a subscreen more flexibly and conveniently, processing efficiency of an electronic device is improved, and user experience is also improved.

In other embodiments of this application, when the instruction is executed by the electronic device, the electronic device may perform the following steps: detecting a second gesture of the user on the touchscreen; and in response to the second gesture, displaying the second area of the first subscreen and the first area of the second subscreen on the touchscreen. A control element layout in the second area of the first subscreen is changed. A control element in the second area of the first subscreen after the layout change is more easily operated by the user. Therefore, user experience is improved. In addition, although the control element layout in the second area of the first subscreen is changed, a control element layout in the first area of the second subscreen may remain unchanged, so that visual interference to the user can be avoided. Certainly, the control element layout in the first area of the second subscreen may alternatively be changed based on the second gesture.

In other embodiments of this application, when the instruction is executed by the electronic device, the electronic device may perform the following steps: detecting a touch event of the user on an application icon in the second area of the first subscreen; and in response to the touch event, starting, by the electronic device, an application corresponding to the application icon and displaying a graphical user interface of the application on the touchscreen. Because the control element layout in the second area of the first subscreen is changed, the user can operate (for example, tap or heavily press) an application icon in this area very conveniently particularly when the user holds the electronic device by using one hand.

In another possible implementation, the graphical user interface of the application corresponding to the application icon is displayed in the first area of the second subscreen, so that the user can preview a main screen of the application, and then the user determines whether the graphical user interface of the application needs to be displayed in a zoom-in mode or displayed on the entire touchscreen in a full-screen mode.

In another possible implementation, the graphical user interface of the application may be a preview screen of the application, and the preview screen may include a shortcut menu of the application, so that the user taps the shortcut menu to quickly perform an operation. For example, the shortcut menu may be a menu indicating whether the application is allowed to use a cellular network.

In another possible implementation, both the first gesture and the second gesture may be slide gestures, but directions of the first gesture and the second gesture are different.

In other embodiments of this application, when the instruction is executed by the electronic device, the electronic device may perform the following steps: detecting, by the electronic device, a third gesture of the user on the touchscreen; and in response to the third gesture, moving a control element in the second area of the first subscreen out of the touchscreen to skip displaying the control element, moving a preview screen of the application to an original display position of the second area of the first subscreen, and displaying a control element in the first area of the second subscreen. This is more beneficial to an operation performed by the user on the preview screen, and in particular, on a shortcut menu on the preview screen, thereby improving user experience.

In other embodiments of this application, when the instruction is executed by the electronic device, the electronic device may perform the following step: before the first subscreen is displayed on the touchscreen, receiving, by the electronic device, user input to enable a one-hand operation function. The user input may be specifically that a user taps a virtual button in a settings menu; may be that a finger of a user touches and holds a blank on the home screen or touches and holds an icon for a time longer than a predetermined time; may be a gesture of drawing a predetermined track in any position on the touchscreen; or may be another case. In this way, the user can flexibly use the foregoing function, thereby simplifying operation steps.

In other embodiments of this application, when the instruction is executed by the electronic device, the electronic device may perform the following step: displaying, on the touchscreen, a control element used to exit the one-hand operation function. In this way, the user can exit the one-hand operation function at any time in an operation process.

In another possible implementation, there are five rows and four columns of icons on the first subscreen, there are five rows and two columns of icons in the first area of the first subscreen, and there are five rows and two columns of icons in the second area of the first subscreen; or there are five rows and four columns of icons on the first subscreen, there are five rows and three columns of icons in the first area of the first subscreen, and there are five rows and one column of icons in the second area of the first subscreen.

In another possible implementation, the second area of the first subscreen may have a same size as the first area of the second subscreen. The two areas have the same size, and therefore, visual consistency is ensured, and user experience is further improved.

Figure 12:
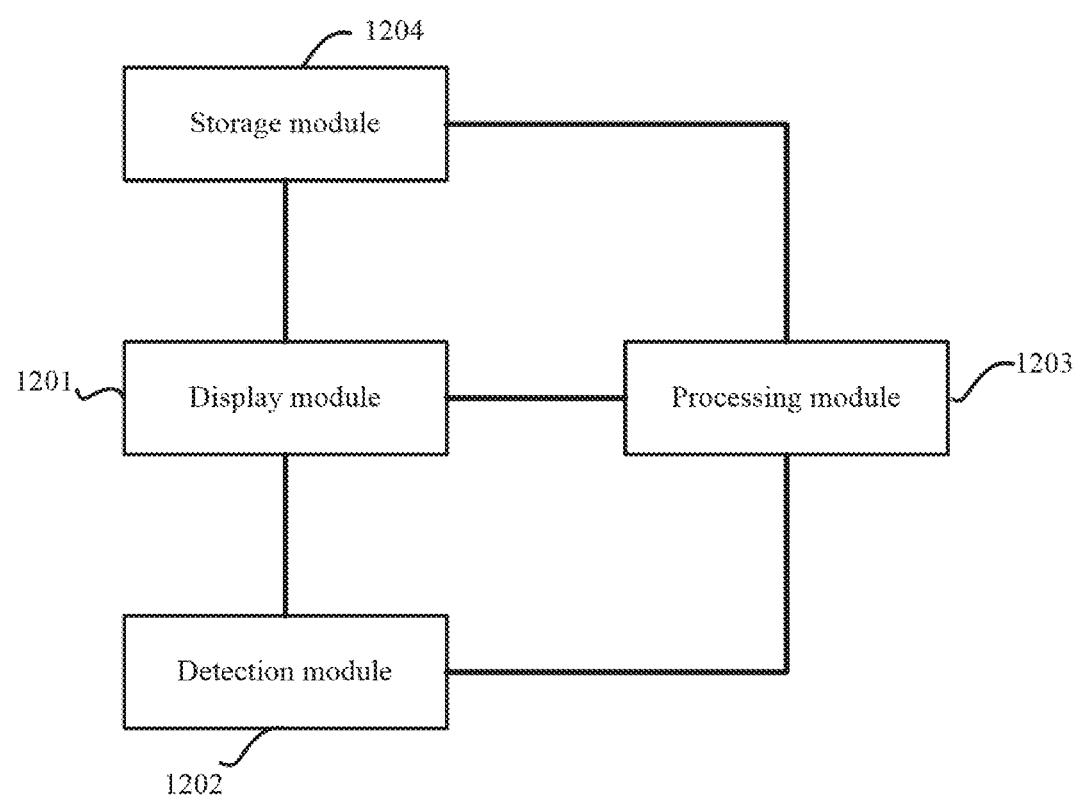
FIG. 12 is a schematic structural diagram of an electronic device according to some other embodiments.

As shown in FIG. 12, an embodiment of this application provides an electronic device. The electronic device may include a display module 1201, a detection module 1202, a processing module 1203, and a storage module 1204. The technical solutions in the foregoing embodiments may be implemented in this electronic device. Specifically, the display module 1201 is configured to display a first subscreen of a home screen, where the first subscreen includes a first area and a second area; the detection module 1202 is configured to detect a first gesture of a user on the display module 1201; and in response to the first gesture, the display module 1201 displays the second area of the first subscreen and a first area of a second subscreen of the home screen. The first area of the first subscreen has a same size as the first area of the second subscreen.

In other embodiments of this application, the detection module 1202 is further configured to: detect a second gesture of the user on the display module 1201; and in response to the second gesture, the display module 1202 displays the second area of the first subscreen and the first area of the second subscreen. A control element layout in the second area of the first subscreen is changed.

In other embodiments of this application, the detection module 1202 is further configured to detect a touch event of the user on an app icon in the second area of the first subscreen; and in response to the touch event, the processing module 1203 starts an app corresponding to the app icon and displays a graphical user interface of the app on the display model 1201. The graphical user interface may be a main screen of the app. In other embodiments of this application, the detection module 1202 is further configured to detect a touch event of the user on an app icon in the second area of the first subscreen; and in response to the touch event, the processing module 1203 starts an app corresponding to the app icon and displays a graphical user interface of the app in the first area of the second subscreen. The graphical user interface may be a main screen of the app or a preview screen of the app. The preview screen of the app may include a shortcut menu of the app, and the shortcut menu is used to quickly perform an operation on the app.

In other embodiments of this application, the display module 1201 is further configured to display a control element used to exit a one-hand operation function, as shown by a control element 901 in FIG. 9A.

All graphical user interfaces displayed on the display module 1201 may be stored in the storage module 1204, to facilitate invoking by the display module 1201.

For example, the display module may be a display screen with a touch-sensitive surface, the storage module may be a non-volatile memory, and the processing module may be a central processing unit or the like.

It may be understood that both the first gesture and the second gesture may act on a left side of the touchscreen, or may act on a right side of the touchscreen, to adapt to an operation performed by a user by using one hand (a left hand or a right hand). A leftward, rightward, upward, or downward gesture in the foregoing embodiments is intended only to describe a touch trend of a finger of the user on the touchscreen in the embodiments, to be specific, when detecting a directional gesture action of the user on the touchscreen, the electronic device can determine that the gesture is a leftward, rightward, upward, or downward gesture. In addition, determining a direction of a gesture is an existing technology in the art. Details are not described herein. In addition, no limitation is imposed on a specific gesture in the embodiments of this application. According to the context, the term "when" used in the foregoing embodiments may be interpreted as a meaning of "if", "after" "in response to determining", or "in response to detecting". Similarly, depending on the context, phrases "when determining" or "if detecting (a stated condition or event)" may be explained as "if determining", "in response to determining", "when detecting (the staled condition or event)", or "in response to detecting (the stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on the computer, all or some of the procedures or functions according to the embodiments of this application are generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are provided with reference to the specific embodiments. However, the foregoing example discussion is not intended to be detailed, and is not intended to limit this application to a disclosed precise form. Based on the foregoing teaching content, many modification forms and variation forms are possible. The embodiments are selected and described to fully illustrate the principles of this application and practical application of the principles, so that other persons skilled in the art can make full use of this application and various embodiments that have various modifications applicable to conceived specific usage.

What is claimed is:

1. An electronic device, comprising:
   a touchscreen;
   a processor coupled to the touchscreen; and
   a memory coupled to the processor and configured to store instructions that, when executed by the processor, cause the electronic device to:
      display a first subscreen of a home screen on the touchscreen, wherein the first subscreen comprises a first area and a second area, and wherein the home screen further comprises a second subscreen;
      detect a first gesture of a user on the touchscreen;
      display, on the touchscreen, both a third area of the second subscreen and the second area in response to the first gesture, wherein the first area has a same size as the third area, and wherein the second area is displayed with a first control element layout;
      detect a second gesture of the user on the second area;
      change a control element layout corresponding to the second area from the first control element layout to a second control element layout based on the second gesture;
      display, on the touchscreen, both the second area with the second control element layout and the third area in response to the second gesture;
      detect a touch input of the user on an application icon located in the second area;
      display, in the third area and in response to the touch input, a graphical user interface of an application corresponding to the application icon;
      detect a third gesture of the user on the second area; and
      in response to the third gesture:
         skip displaying a first control element in the second area on the touchscreen;
         move the graphical user interface to an original display position of the second area; and
         display a second control element in the third area in response to the third gesture.

2. The electronic device of claim 1, wherein the instructions further cause the electronic device to display, on the touchscreen, a third control element configured to exit a one-hand operation function.

3. The electronic device of claim 1, wherein the graphical user interface comprises a shortcut menu for performing a quick operation on the application.

4. The electronic device of claim 1, wherein the first subscreen further comprises five rows and four columns of icons, wherein the first area comprises five rows and two columns of icons, and wherein the second area comprises five rows and two columns of icons.

5. The electronic device of claim 1, wherein before displaying the first subscreen, the instructions further cause the electronic device to receive a user input to enable a one-hand operation function.

6. The electronic device of claim 1, wherein the graphical user interface is a preview screen of the application, and wherein the preview screen comprises an attribute and a shortcut menu of the application.

7. The electronic device of claim 1, wherein the first gesture and the second gesture are slide gestures, and wherein a first direction of the first gesture is different than a second direction of the second gesture.

8. The electronic device of claim 1, wherein the second area is a same size as the third area.

9. The electronic device of claim 1, wherein the control element layout in the second area is changed while a control element layout in the third area is unchanged.

10. The electronic device of claim 1, wherein the first area and the third area comprise different icons of applications.

11. A computer program product comprising computer-executable instructions for storage on a non-transitory computer-readable storage medium that, when executed by a processor, cause an electronic device to:
   display a first subscreen of a home screen on a touchscreen of the electronic device, wherein the first subscreen comprises a first area and a second area, and wherein the home screen further comprises a second subscreen;
   detect a first gesture of a user on the touchscreen;
   display, on the touchscreen, a third area of the second subscreen and the second area in response to the first gesture, wherein the first area is a same size as the third area, and wherein the second area is displayed with a first control element layout;
   detect a second gesture of the user on the second area;
   change a control element layout corresponding to the second area from the first control element layout to a second control element layout based on the second gesture;
   display, on the touchscreen, both the second area with the second control element layout and the third area in response to the second gesture;
   detect a touch input of the user on an application icon in the second area;
   display a graphical user interface of an application corresponding to the application icon in the third area in response to the touch input;
   detect a third gesture of the user on the second area; and
   in response to the third gesture:
      skip displaying a first control element in the second area on the touchscreen;
      move the graphical user interface to an original display position of the second area; and
      display a second control element in the third area in response to the third gesture.

12. The computer program product of claim 11, wherein the computer-executable instructions further cause the electronic device to display, on the touchscreen, a third control element configured to exit a one-hand operation function.

13. The computer program product of claim 11, wherein the graphical user interface comprises a shortcut menu for performing a quick operation on the application.

14. The computer program product of claim 11, wherein the first subscreen further comprises five rows and four columns of icons, wherein the first area comprises five rows and two columns of icons, and wherein the second area comprises five rows and two columns of icons.

15. The computer program product of claim 11, wherein before displaying the first subscreen, the computer-executable instructions further cause the electronic device to receive a user input to enable a one-hand operation function.

16. The computer program product of claim 11, wherein the graphical user interface is a preview screen of the application, and wherein the preview screen comprises an attribute and a shortcut menu of the application.

17. The computer program product of claim 11, wherein the first gesture and the second gesture are slide gestures, and wherein a first direction of the first gesture is different than a second direction of the second gesture.

18. The computer program product of claim 11, wherein the second area is a same size as the third area.

19. The computer program product of claim 11, wherein the control element layout in the second area is changed while a control element layout in the first area is unchanged.

20. The computer program product of claim 11, wherein the first area and the third area comprise different icons of applications.

* * * * *